(12) United States Patent
Isozaki et al.

(10) Patent No.: US 6,470,142 B1
(45) Date of Patent: Oct. 22, 2002

(54) DATA RECORDING APPARATUS, DATA RECORDING METHOD, DATA RECORDING AND REPRODUCING APPARATUS, DATA RECORDING AND REPRODUCING METHOD, DATA REPRODUCING APPARATUS, DATA REPRODUCING METHOD, DATA RECORD MEDIUM, DIGITAL DATA REPRODUCING APPARATUS, DIGITAL DATA REPRODUCING METHOD, SYNCHRONIZATION DETECTING APPARATUS, AND SYNCHRONIZATION DETECTING METHOD

(75) Inventors: Masaaki Isozaki; Yoshio Oyone, both of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/435,967

(22) Filed: Nov. 8, 1999

(30) Foreign Application Priority Data

Nov. 9, 1998 (JP) .......................................... 10-317597
Nov. 10, 1998 (JP) .......................................... 10-319623

(51) Int. Cl.$^7$ .............................................. H04N 5/926
(52) U.S. Cl. ........................ 386/124; 375/366; 375/368
(58) Field of Search .......................... 386/46, 40, 124, 386/48, 125–126, 112; 375/365, 366, 368; 360/32, 48, 51

(56) References Cited

U.S. PATENT DOCUMENTS

| | | | | |
|---|---|---|---|---|
| 5,400,369 A | * | 3/1995 | Ikemura | 375/368 |
| 5,592,518 A | * | 1/1997 | Davis et al. | 375/368 |
| 5,862,143 A | * | 1/1999 | Suh | 375/366 |
| 6,154,866 A | * | 11/2000 | Kawahara et al. | 386/124 |
| 6,263,469 B1 | * | 7/2001 | Jang | 386/126 |
| 6,343,182 B1 | * | 1/2002 | Kim et al. | 386/126 |

FOREIGN PATENT DOCUMENTS

| | | |
|---|---|---|
| EP | 0 649 136 | 4/1995 |
| EP | 0 851 689 | 7/1998 |

\* cited by examiner

Primary Examiner—Vincent Boccio
(74) Attorney, Agent, or Firm—Frommer Lawrence & Haug LLP; William S. Frommer; Gordon Kessler

(57) ABSTRACT

A data recording and reproducing apparatus for recording and reproducing video signals in a plurality of formats with different rates to/from a record medium is disclosed. In the data recording and reproducing apparatus, a video signal in a selected format is converted into video data packets and audio data packets whose lengths are optimally designated corresponding to the selected format. With a video data packet and an audio data packet, a video sync block and an audio sync block whose lengths are different are formed, respectively. The video sync block and the audio sync block are encoded with respective error correction codes. The resultant data is recorded as record data to a record medium.

Corresponding to the data rate of the video signal, at least one data packet is placed in one video sync block.

A synchronization detecting apparatus automatically and accurately detects sync blocks with different lengths from a data sequence of record data reproduced from a record medium. The synchronization detecting apparatus separates the detected sync blocks into video sync blocks and audio sync blocks. The video sync blocks and the audio sync blocks are decoded with respective error correction codes. As a result, video data and audio data are restored.

9 Claims, 37 Drawing Sheets

Fig. 3

[50Hz]    980 SAMPLES/FIELD

| | 1 | 2 | 3 | 4 | | 54 | |
|---|---|---|---|---|---|---|---|
| 0 | AUX0 | 6 | 24 | 42 | ...... | 942 | |
| 2 | AUX6 | 12 | 30 | 48 | ...... | 948 | |
| 4 | 0 | 18 | 36 | 54 | ...... | 954 | |
| 6 | AUX4 | 10 | 28 | 46 | ...... | 946 | |
| 8 | AUX10 | 16 | 34 | 52 | ...... | 952 | DATA |
| 10 | 4 | 22 | 40 | 58 | ...... | 958 | |
| 12 | AUX2 | 8 | 26 | 44 | ...... | 944 | |
| 14 | AUX8 | 14 | 32 | 50 | ...... | 950 | |
| 16 | 2 | 20 | 38 | 56 | ...... | 956 | |
| 18 | PV0 | PV0 | PV0 | PV0 | ...... | PV0 | |
| 20 | PV1 | PV1 | PV1 | PV1 | ...... | PV1 | |
| 22 | PV2 | PV2 | PV2 | PV2 | ...... | PV2 | |
| 24 | PV3 | PV3 | PV3 | PV3 | ...... | PV3 | |
| 26 | PV4 | PV4 | PV4 | PV4 | ...... | PV4 | PARITY |
| 28 | PV5 | PV5 | PV5 | PV5 | ...... | PV5 | |
| 30 | PV6 | PV6 | PV6 | PV6 | ...... | PV6 | |
| 32 | PV7 | PV7 | PV7 | PV7 | ...... | PV7 | |
| 34 | PV8 | PV8 | PV8 | PV8 | ...... | PV8 | |

| | 1 | 2 | 3 | 4 | | 54 | |
|---|---|---|---|---|---|---|---|
| 1 | AUX3 | 9 | 27 | 45 | ...... | 945 | |
| 3 | AUX9 | 15 | 33 | 51 | ...... | 951 | |
| 5 | 3 | 21 | 39 | 57 | ...... | 957 | |
| 7 | AUX1 | 7 | 25 | 43 | ...... | 943 | |
| 9 | AUX7 | 13 | 31 | 49 | ...... | 949 | DATA |
| 11 | 1 | 19 | 37 | 55 | ...... | 955 | |
| 13 | AUX5 | 11 | 29 | 47 | ...... | 947 | |
| 15 | AUX11 | 17 | 35 | 53 | ...... | 953 | |
| 17 | 5 | 23 | 41 | 59 | ...... | 959 | |
| 19 | PV0 | PV0 | PV0 | PV0 | ...... | PV0 | |
| 21 | PV1 | PV1 | PV1 | PV1 | ...... | PV1 | |
| 23 | PV2 | PV2 | PV2 | PV2 | ...... | PV2 | |
| 25 | PV3 | PV3 | PV3 | PV3 | ...... | PV3 | |
| 27 | PV4 | PV4 | PV4 | PV4 | ...... | PV4 | PARITY |
| 29 | PV5 | PV5 | PV5 | PV5 | ...... | PV5 | |
| 31 | PV6 | PV6 | PV6 | PV6 | ...... | PV6 | |
| 33 | PV7 | PV7 | PV7 | PV7 | ...... | PV7 | |
| 35 | PV8 | PV8 | PV8 | PV8 | ...... | PV8 | |

Fig. 6

[59.94Hz] ← 800 OR 801 SAMPLES/FIELD →

| | 1 | 2 | 3 | 4 | ... | 36 | |
|---|---|---|---|---|---|---|---|
| 0 | AUX0 | XXX | XXX | 9 | ...... | 777 | DATA |
| 3 | AUX3 | XXX | XXX | 12 | ...... | 780 | |
| 6 | XXX | XXX | XXX | 15 | ...... | 783 | |
| 9 | XXX | XXX | XXX | 18 | ...... | 786 | |
| 12 | XXX | XXX | XXX | 21 | ...... | 789 | |
| 15 | XXX | XXX | 0 | 24 | ...... | 792 | |
| 18 | XXX | XXX | 3 | 27 | ...... | 795 | |
| 21 | XXX | XXX | 6 | 30 | ...... | 798 | |
| 24 | PV0 | PV0 | PV0 | PV0 | ...... | PV0 | PARITY |
| 27 | PV1 | PV1 | PV1 | PV1 | ...... | PV1 | |
| 30 | PV2 | PV2 | PV2 | PV2 | ...... | PV2 | |
| 33 | PV3 | PV3 | PV3 | PV3 | ...... | PV3 | |
| 36 | PV4 | PV4 | PV4 | PV4 | ...... | PV4 | |
| 39 | PV5 | PV5 | PV5 | PV5 | ...... | PV5 | |
| 42 | PV6 | PV6 | PV6 | PV6 | ...... | PV6 | |
| 45 | PV7 | PV7 | PV7 | PV7 | ...... | PV7 | |
| 1 | AUX1 | XXX | XXX | 10 | ...... | 778 | DATA |
| 4 | AUX4 | XXX | XXX | 13 | ...... | 781 | |
| 7 | XXX | XXX | XXX | 16 | ...... | 784 | |
| 10 | XXX | XXX | XXX | 19 | ...... | 787 | |
| 13 | XXX | XXX | XXX | 22 | ...... | 790 | |
| 16 | XXX | XXX | 1 | 25 | ...... | 793 | |
| 19 | XXX | XXX | 4 | 28 | ...... | 796 | |
| 22 | XXX | XXX | 7 | 31 | ...... | 799 | |
| 25 | PV0 | PV0 | PV0 | PV0 | ...... | PV0 | PARITY |
| 28 | PV1 | PV1 | PV1 | PV1 | ...... | PV1 | |
| 31 | PV2 | PV2 | PV2 | PV2 | ...... | PV2 | |
| 34 | PV3 | PV3 | PV3 | PV3 | ...... | PV3 | |
| 37 | PV4 | PV4 | PV4 | PV4 | ...... | PV4 | |
| 40 | PV5 | PV5 | PV5 | PV5 | ...... | PV5 | |
| 43 | PV6 | PV6 | PV6 | PV6 | ...... | PV6 | |
| 46 | PV7 | PV7 | PV7 | PV7 | ...... | PV7 | |
| 2 | AUX2 | XXX | XXX | 11 | ...... | 779 | DATA |
| 5 | AUX5 | XXX | XXX | 14 | ...... | 782 | |
| 8 | XXX | XXX | XXX | 17 | ...... | 785 | |
| 11 | XXX | XXX | XXX | 20 | ...... | 788 | |
| 14 | XXX | XXX | XXX | 23 | ...... | 791 | |
| 17 | XXX | XXX | 2 | 26 | ...... | 794 | |
| 20 | XXX | XXX | 5 | 29 | ...... | 797 | |
| 23 | XXX | XXX | 8 | 32 | ...... | 800 | |
| 26 | PV0 | PV0 | PV0 | PV0 | ...... | PV0 | PARITY |
| 29 | PV1 | PV1 | PV1 | PV1 | ...... | PV1 | |
| 32 | PV2 | PV2 | PV2 | PV2 | ...... | PV2 | |
| 35 | PV3 | PV3 | PV3 | PV3 | ...... | PV3 | |
| 38 | PV4 | PV4 | PV4 | PV4 | ...... | PV4 | |
| 41 | PV5 | PV5 | PV5 | PV5 | ...... | PV5 | |
| 44 | PV6 | PV6 | PV6 | PV6 | ...... | PV6 | |
| 47 | PV7 | PV7 | PV7 | PV7 | ...... | PV7 | |

Fig. 7

| PICTURE FRAME | SCAN MODE | FRAME FREQUENCY | VIDEO RATE | NUMBER OF TRACKS PER DATA EDIT UNIT |
|---|---|---|---|---|
| 720 × 480 | INTERLACE | 29.97Hz | 27Mbps | 4 |
| 720 × 576 | INTERLACE | 25Hz | 24Mbps | 4 |
| 720 × 480 | INTERLACE | 29.97Hz | 50Mbps | 8 |
| 720 × 576 | INTERLACE | 25Hz | 50Mbps | 8 |
| 720 × 480 | PROGRESSIVE | 29.97Hz | 27Mbps | 4 |
| 720 × 576 | PROGRESSIVE | 25Hz | 24Mbps | 4 |
| 720 × 480 | PROGRESSIVE | 23.976Hz | 20Mbps | 4 |
| 720 × 480 | PROGRESSIVE | 59.94Hz | 51Mbps | 4 |
| 720 × 576 | PROGRESSIVE | 50Hz | 42Mbps | 4 |
| 720 × 480 | PROGRESSIVE | 29.97Hz | 50Mbps | 8 |
| 720 × 576 | PROGRESSIVE | 25Hz | 50Mbps | 8 |
| 720 × 480 | PROGRESSIVE | 23.976Hz | 36Mbps | 8 |
| 720 × 480 | PROGRESSIVE | 59.94Hz | 91Mbps | 6 |
| 720 × 576 | PROGRESSIVE | 50Hz | 75Mbps | 6 |

Fig. 15

| Edit freq line | scan rate | 6 59.9Hz | 5 50Hz | 3 29.97Hz | 2 25Hz | 0 23.976Hz | Audio | Sequence | Track | Head | ECC |
|---|---|---|---|---|---|---|---|---|---|---|---|
| 1 | 0 | ... | ... | 480i(27M)(720×480) | 576i(24M)(720×576) | ... | 16bit 4ch | Frame | 4 | 4 | SD1 |
| 1 | 0 | ... | ... | 480i(50M)(720×480) | 576i(50M)(720×576) | ... | 16bit 8ch | Frame | 8 | 4 | SD2 |
| 1 | 0 | *480i(224M)(720×240) | *576i(220M)(720×288) | ... | ... | ... | 24bit 8ch | Field | 12 | 8 | HL2 |
| 1 | 1 | ... | ... | 480p(27M)(720×480) | 576p(24M)(720×576) | 480p(20M)(720×480) | 16bit 4ch | Pframe | 4 | 4 | SD1 |
| 1 | 1 | 480p(51M)(720×480) | 576p(42M)(720×576) | ... | ... | ... | 16bit 8ch | Pframe | 4 | 4 | SD3 |
| 1 | 1 | ... | ... | 480p(50M)(720×480) | 576p(50M)(720×576) | 480p(43M)(720×480) | 16bit 8ch | Pframe | 8 | 4 | SD2 |
| 1 | 1 | 480p(91M)(720×480) | 576p(75M)(720×576) | ... | ... | ... | 16bit 8ch | Pframe | 6 | 4 | SD4 |
| 1 | 3 | *480p(447M)(720×480) | *576p(440M)(720×576) | ... | ... | ... | 24bit 8ch | Pframe | 24 | 8 | HL3 |
| 2 | 1 | ... | ... | 720p(124M)(1280×720) | 720p(103M)(1280×720) | 720p(99M)(1280×720) | 24bit 8ch | Pframe | 12 | 8 | HL1 |
| 2 | 1 | 720p(247M)(1280×720) | 720p(206M)(1280×720) | ... | ... | ... | 24bit 8ch | Pframe | 12 | 8 | HL2 |
| 3 | 0 | 1080i(272M)(1920×544) | 1080i(227M)(1920×544) | ... | ... | ... | 24bit 8ch | Field | 12 | 8 | HL2 |
| 3 | 0 | 1080i(560M)(1920×544) | 1080i(467M)(1920×544) | ... | ... | ... | 24bit 8ch | Field | 24 | 8 | HL3 |
| 3 | 1 | ... | ... | 1080p(280M)(1920×1088) | 1080p(238M)(1920×1088) | 1080p(224M)(1920×1088) | 24bit 8ch | Pframe | 12 | 8 | HL1 |
| 3 | 1 | 1080p(577M)(1920×1088) | 1080p(481M)(1920×1088) | ... | ... | ... | 24bit 8ch | Pframe | 24 | 8 | HL3 |
| 3 | 2 | ... | ... | ... | ... | 2048p(223M)(2048×2048) | 24bit 8ch | Pframe | 24 | 8 | HL4 |

*: NOT-COMPRESSED

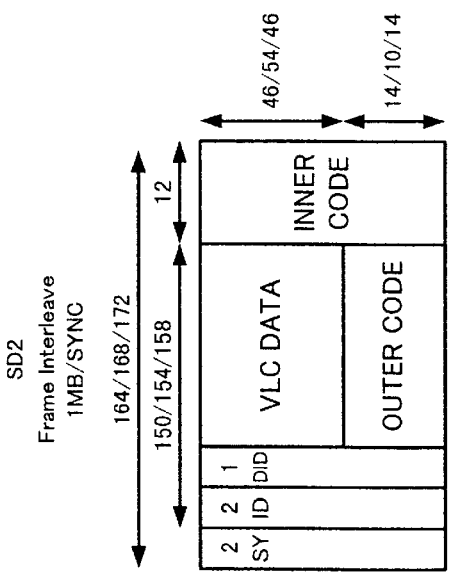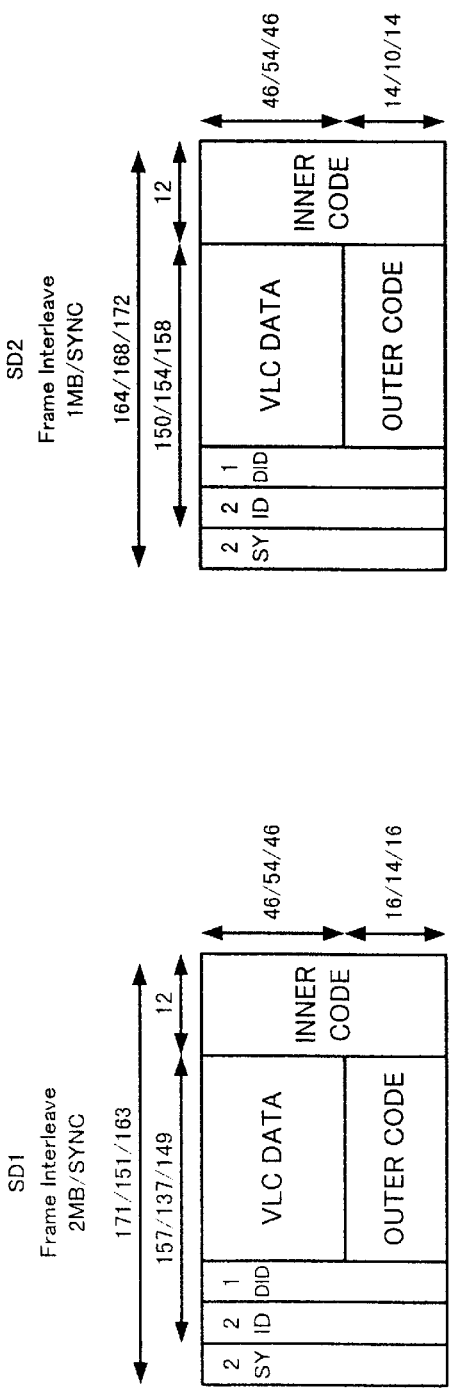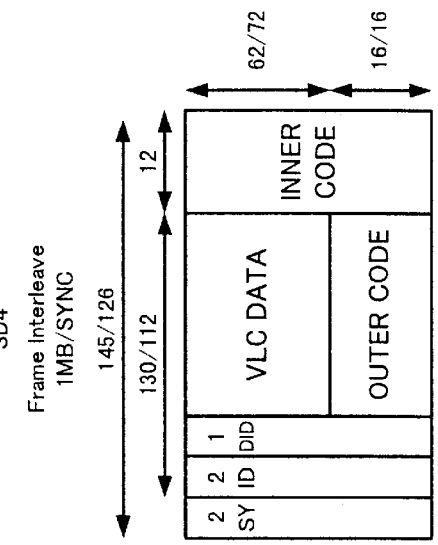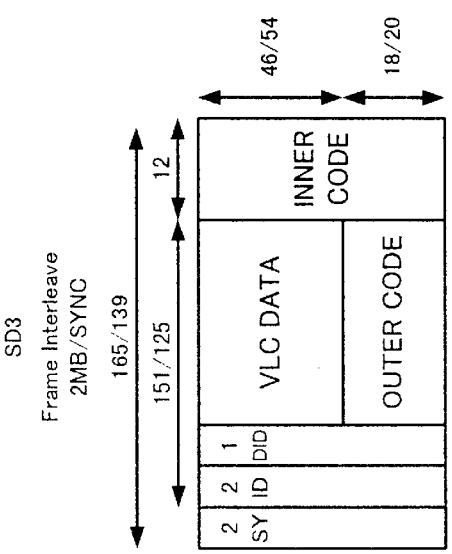

[23.976x2Hz] 1001 SAMPLES/FIELD
[50Hz] 960 SAMPLES/FIELD
[59.94Hz] 800 OR 801 SAMPLES/FIELD

Fig. 18A:

| | 1 | 2 | 3 | 4 | 51 | 61 | 63 | |
|---|---|---|---|---|---|---|---|---|
| 0 | AUX0 | 10 | 26 | 42 | ··· 794 ··· | 954 ··· | 986 | DATA |
| 2 | AUX1 | 12 | 28 | 44 | ··· 796 ··· | 956 ··· | 988 | |
| 4 | AUX2 | 14 | 30 | 46 | ··· 798 ··· | 958 ··· | 990 | |
| 6 | 0 | 16 | 32 | 48 | ··· 800 ··· | (958) ··· | 992 | |
| 8 | 2 | 18 | 34 | 50 | ··· (800) ··· | (958) ··· | 994 | |
| 10 | 4 | 20 | 36 | 52 | ··· (800) ··· | (958) ··· | 996 | |
| 12 | 6 | 22 | 38 | 54 | ··· (800) ··· | (958) ··· | 998 | |
| 14 | 8 | 24 | 40 | 56 | ··· (800) ··· | (958) ··· | 1000 | |
| 16 | PV0 | PV0 | PV0 | PV0 | ··· PV0 ··· | PV0 ··· | PV0 | PARITY |
| 18 | PV1 | PV1 | PV1 | PV1 | ··· PV1 ··· | PV0 ··· | PV0 | |
| 20 | PV2 | PV2 | PV2 | PV2 | ··· PV2 ··· | PV1 ··· | PV1 | |
| 22 | PV3 | PV3 | PV3 | PV3 | ··· PV3 ··· | PV2 ··· | PV2 | |
| 24 | PV4 | PV4 | PV4 | PV4 | ··· PV4 ··· | PV3 ··· | PV3 | |
| 26 | PV5 | PV5 | PV5 | PV5 | ··· PV5 ··· | PV4 ··· | PV4 | |
| 28 | PV6 | PV6 | PV6 | PV6 | ··· PV6 ··· | PV5 ··· | PV5 | |
| 30 | PV7 | PV7 | PV7 | PV7 | ··· PV7 ··· | PV6 ··· | PV6 | |
| 32 | PV8 | PV8 | PV8 | PV8 | ··· PV8 ··· | PV7 ··· | PV7 | |
| 34 | PV9 | PV9 | PV9 | PV9 | ··· PV9 ··· | PV8 ··· | PV8 | |

Fig. 18B:

| | 1 | 2 | 3 | 4 | 51 | 61 | 63 | |
|---|---|---|---|---|---|---|---|---|
| 1 | AUX0 | 11 | 27 | 43 | ··· 795 ··· | 955 ··· | 987 | DATA |
| 3 | AUX1 | 13 | 29 | 45 | ··· 797 ··· | 957 ··· | 989 | |
| 5 | AUX2 | 15 | 31 | 47 | ··· 799 ··· | 959 ··· | 991 | |
| 7 | 1 | 17 | 33 | 49 | ··· (799) ··· | (959) ··· | 993 | |
| 9 | 3 | 19 | 35 | 51 | ··· (799) ··· | (959) ··· | 995 | |
| 11 | 5 | 21 | 37 | 53 | ··· (799) ··· | (959) ··· | 997 | |
| 13 | 7 | 23 | 39 | 55 | ··· (799) ··· | (959) ··· | 999 | |
| 15 | 9 | 25 | 41 | 57 | ··· (799) ··· | (959) ··· | (999) | |
| 17 | PV0 | PV0 | PV0 | PV0 | ··· PV0 ··· | PV0 ··· | PV0 | PARITY |
| 19 | PV1 | PV1 | PV1 | PV1 | ··· PV1 ··· | PV1 ··· | PV1 | |
| 21 | PV2 | PV2 | PV2 | PV2 | ··· PV2 ··· | PV2 ··· | PV2 | |
| 23 | PV3 | PV3 | PV3 | PV3 | ··· PV3 ··· | PV3 ··· | PV3 | |
| 25 | PV4 | PV4 | PV4 | PV4 | ··· PV4 ··· | PV4 ··· | PV4 | |
| 27 | PV5 | PV5 | PV5 | PV5 | ··· PV5 ··· | PV5 ··· | PV5 | |
| 29 | PV6 | PV6 | PV6 | PV6 | ··· PV6 ··· | PV6 ··· | PV6 | |
| 31 | PV7 | PV7 | PV7 | PV7 | ··· PV7 ··· | PV7 ··· | PV7 | |
| 33 | PV8 | PV8 | PV8 | PV8 | ··· PV8 ··· | PV8 ··· | PV8 | |
| 35 | PV9 | PV9 | PV9 | PV9 | ··· PV9 ··· | PV9 ··· | PV9 | |

Fig. 20A  Fig. 20B  Fig. 20C

| MSB | ID0 | ID1 |
|---|---|---|
| 7 | SYNC ID7 | Upper/Lower |
| 6 | SYNC ID6 | (Reserved) |
| 5 | SYNC ID5 | SEG NB3 |
| 4 | SYNC ID4 | SEG NB2 |
| 3 | SYNC ID3 | SEG NB1 |
| 2 | SYNC ID2 | SEG NB0 |
| 1 | SYNC ID1 | TRACK |
| 0 | SYNC ID0 | VIDEO/AUDIO |

LSB

| DID(VIDEO) |
|---|
| (Reserved) |
| (Reserved) |
| (Reserved) |
| (Reserved) |
| PAYLOAD MD1 |
| PAYLOAD MD0 |
| 2MB/1MB |
| Vouter |

| DID(AUDIO) |
|---|
| (Reserved) |
| (Reserved) |
| (Reserved) |
| (Reserved) |
| DATA/AUDIO |
| 5F Seg2 |
| 5F Seg1 |
| 5F Seg0 |

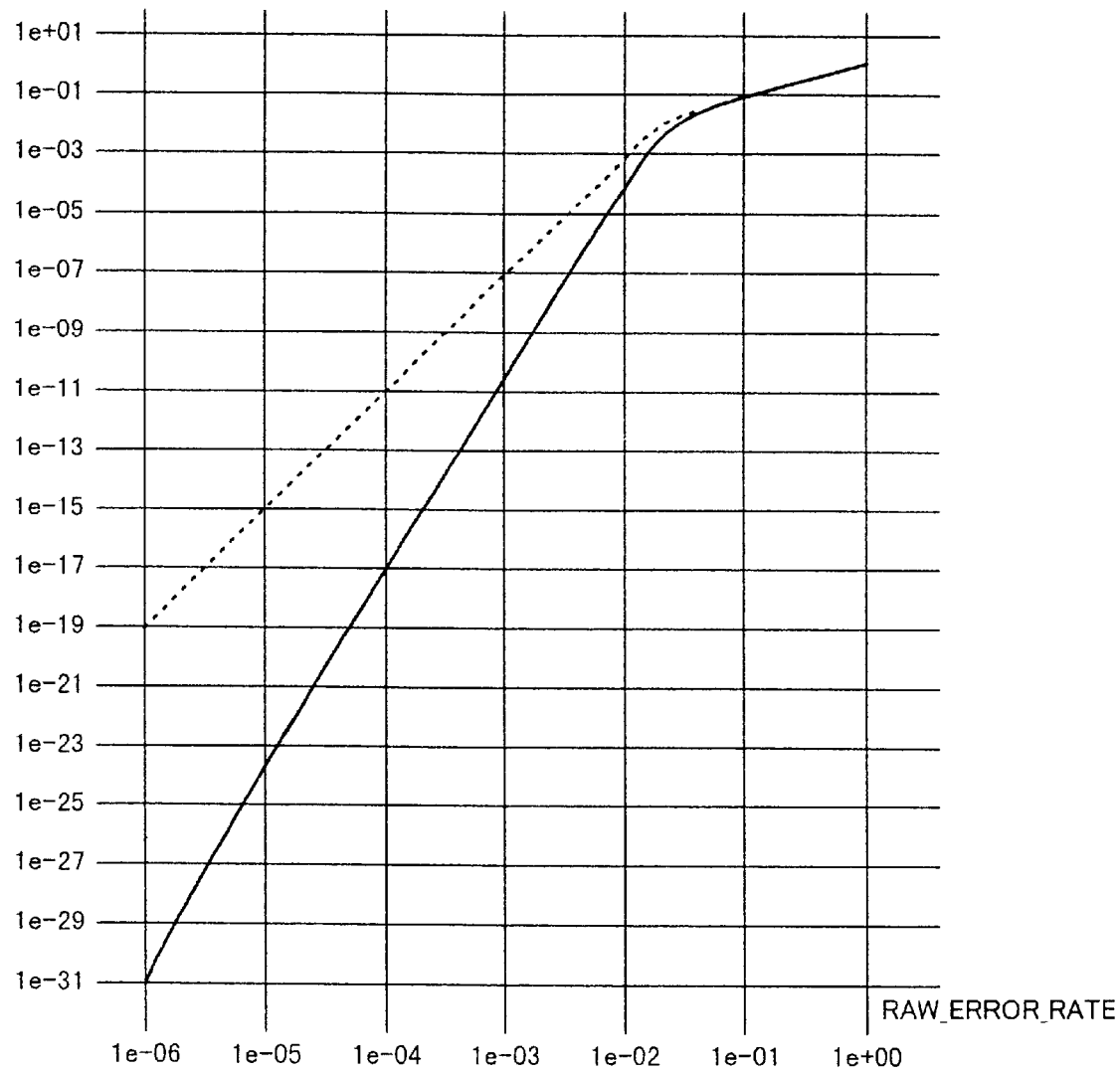

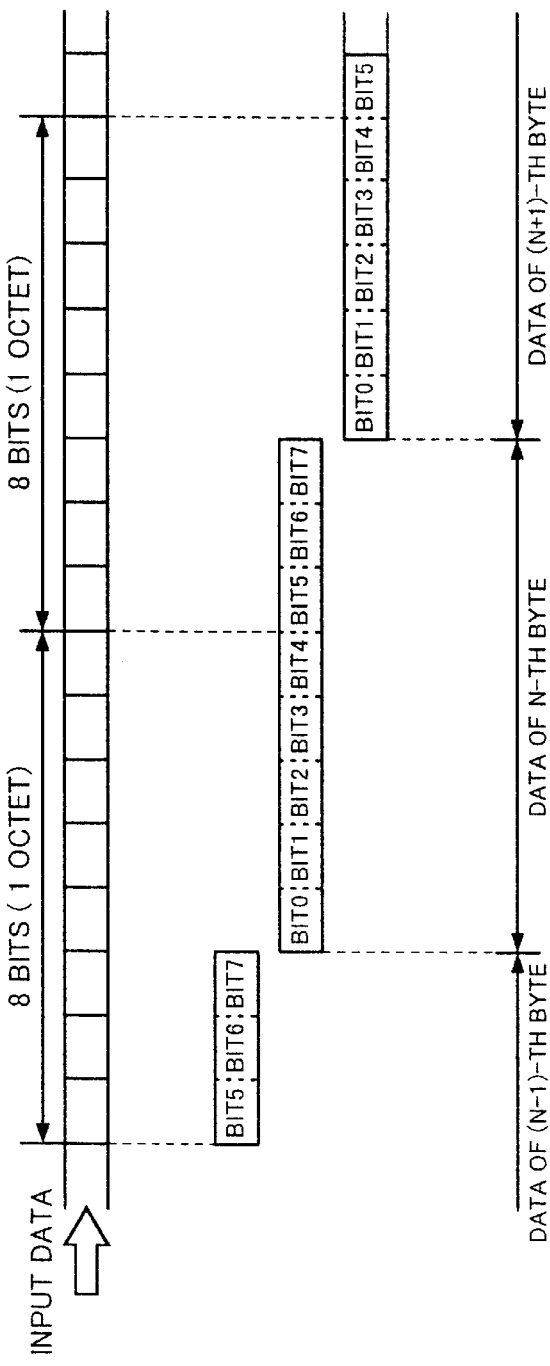

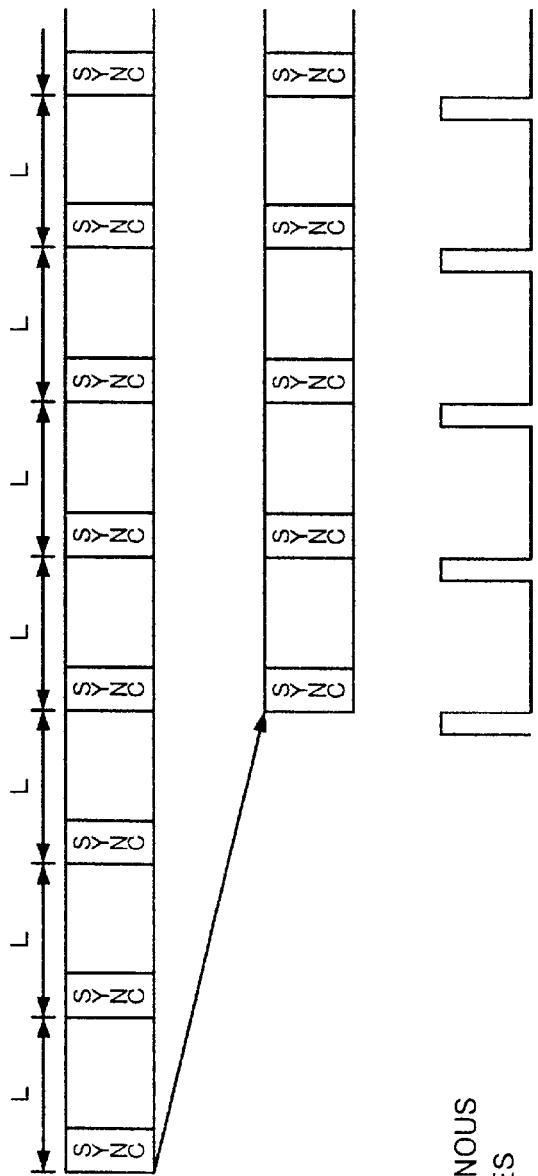

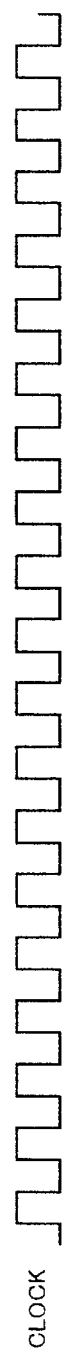
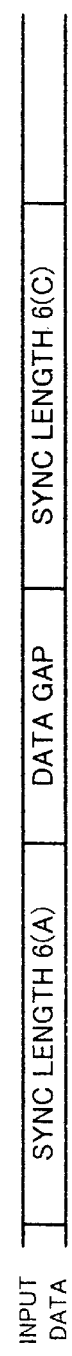
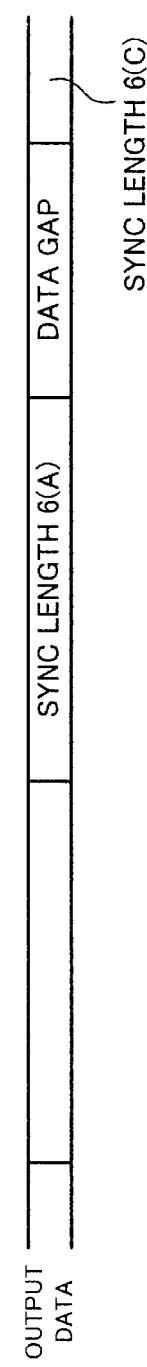
Fig. 40A CLOCK
Fig. 40B INPUT DATA
Fig. 40C COUNTER
Fig. 40D SYNCHRONOUS PULSE
Fig. 40E OUTPUT DATA

DATA RECORDING APPARATUS, DATA RECORDING METHOD, DATA RECORDING AND REPRODUCING APPARATUS, DATA RECORDING AND REPRODUCING METHOD, DATA REPRODUCING APPARATUS, DATA REPRODUCING METHOD, DATA RECORD MEDIUM, DIGITAL DATA REPRODUCING APPARATUS, DIGITAL DATA REPRODUCING METHOD, SYNCHRONIZATION DETECTING APPARATUS, AND SYNCHRONIZATION DETECTING METHOD

BACKGROUND OF THE INVENTION

1. Field of the Invention

The present invention relates to a data recording apparatus, a data recording method, a data recording and reproducing apparatus, a data recording and reproducing method, a data reproducing apparatus, a data reproducing method, a data record medium, a digital data reproducing apparatus, a digital data reproducing method, a synchronization detecting apparatus, and a synchronization detecting method that are used for recording and/or reproducing a digital video signal and a digital audio signal.

2. Description of the Related Art

A data recording and reproducing apparatus that records a digital video signal and a digital audio signal to a record medium and that reproduces a digital video signal and a digital audio signal therefrom is known. A typical example of such an apparatus is a digital VTR (Video Tape Recorder). In a record processing portion of a digital video signal recording apparatus, digital video data and digital audio data are placed packets with a fixed length. ID information is added to each packet. The packetized data is encoded with an error correction code. A synchronous pattern and ID information are added to packetized data, an error correction code parity, and so forth so as to form a sync block. A plurality of sync blocks are grouped as a sector corresponding to each data type. Each sector as serial data is recorded on a magnetic tape by a rotating head. The length of each sync block in the same sector is the same. The sync blocks are successively assigned unique ID numbers. The ID information has the same value. A product code is used as an error correction code. In other words, a two-dimensional array of data symbols is encoded with an outer code in the vertical direction and an inner code in the horizontal direction. Thus, each symbol is dually encoded. One minimum data encoding/decoding unit of the product code is referred to as ECC block.

On the reproducing side, the start position of each sync block is detected with a synchronous signal. Packets in each sync block are rearranged corresponding to ID numbers and ID information. Since a unique synchronous pattern is added at the start position of each sync block, using the bit sequence of the synchronous pattern, the pattern occurrence interval, successive ID numbers in the same sector, and the same ID information, the phase of a synchronous block can be detected. In other words, when the conditions that the bit sequence of a synchronous pattern matches a fixed pattern, that the same pattern is detected at a position delayed by the block length, and that the block ID is proper are satisfied, the phase of the synchronous block is detected. In the format of such a conventional digital VTR, to easily perform the synchronization detecting process, the length of each synchronous block is fixed (to one type) regardless of the data type.

To record and reproduce video data, a compression encoding process is performed. When video data corresponding to MPEG (Moving Picture Experts Group) standard is compression-compressed, coefficient data generated by DCT (Discrete Cosine Transform) process is encoded with a variable length code. When the amount of data that is recorded per track or every a predetermined number of tracks is fixed, the data amount of the variable length code that is generated in a predetermined time period is limited to a predetermined value. Variable length code encoded data (namely, variable length data) is packed in data areas of a plurality of sync blocks corresponding to a predetermined time period.

The data amount of a digital audio signal is not so large in comparison with that of a digital video signal. To prevent the audio quality from deteriorating in the compressing process and to prevent a complicated process because the data access unit of an MPEG audio signal does not match a video frame and a video signal and an audio signal are switched, non-compressed audio data (linear PCM) is recorded and/or reproduced.

There are as many as 18 types of digital television broadcasting formats in the United States. In such an environment, a digital VTR that can record and reproduce video data in a plurality of formats is desired. When the length of each sync block is fixed to one type regardless of data types as with the conventional digital VTR, although synchronization is easily detected, it is difficult to record data in various formats. Next, this point will be described.

Next, an example of the conventional digital VTR will be described. The VTR records video data and audio data on a tape in a tape format as shown in FIG. 1A. As shown in FIG. 1A, data of six tracks is recorded per frame. One segment is composed of two tracks with different azimuths. In other words, six tracks are composed of three segments. A pair of tracks that compose one segment are assigned track numbers [0] and [1] corresponding to the azimuths. Video sectors are formed on both edges of each track. Video data is recorded on the video sectors. An audio sector is formed between the two video sectors. Audio data is recorded on the audio sector.

In the track format shown in FIG. 1A, audio data of four channels can be handled. Referring to FIG. 1A, A1 to A4 represent sectors of channels 1 to 4 of audio data, respectively. The video data is shuffled (interleaved) and recorded on sectors on the upper side and the lower side. A system area (sys) is formed at a predetermined position of each video sector on the lower side. In FIG. 1A, SAT1 (Tr) and SAT2 (Tm) are areas in which a servo lock signal is recorded. In addition, gaps (Vg1 Sg1, Ag, Sg2, Sg3, and Vg2) with predetermined sizes are formed between individual record areas.

As shown in FIG. 1B, data recorded on the tape is composed of a plurality of blocks that are equally divided (these blocks are referred to as sync blocks). FIG. 1C shows an outlined structure of one sync block. One sync block is composed of an ID (that identifies the current sync block), a DID (that represents the contents of data that follows), a data packet, and an error correction inner code parity. Data is recorded and reproduced as sync blocks (the minimum data recording/reproducing unit is one sync block). For example, a video sector is composed of many sync blocks that are arranged.

One sync block is composed of a synchronous signal, an ID, a data packet, and an inner code parity. Now, one sync block is denoted by sync block: sync pattern+sync id+data packet+inner parity.

Design condition: The length of one data packet of video data is the same as the length of one data packet of audio data.

Next, as an example of the recording process of video data, the following video data and conditions are considered.

Video data (4:2:2)

Design conditions: Data compression ratio=2 or more (the data amount after data compressing process is 1/2 or less of the data amount before data compressing process).

10 DCT blocks are packed to two sync blocks.

6 tracks per field.

-[525 lines/60 fields] format video signal-
Amount of video data per field:

$$512 \times 720 \times (8+4+4) \text{ bits}/8/2 = 368640 \text{ bytes}$$

Number of DCT blocks per field:

$$512 \times 720/8/8 = 5760$$

$$10 \text{ blocks}/2 \text{ syncs} \rightarrow 1152 \text{ sync blocks}$$

$$\text{Length of data packet} > 368640 \times (1/2)/1152 = 160 \quad (1)$$

-[625 lines/60 fields] format video signal-
Amount of video data per field:

$$608 \times 720 \times (8+4+4) \text{ bits } /8/2 = 437760 \text{ bytes}$$

Number of DCT blocks per field:

$$608 \times 720/8/8 = 6840$$

$$10 \text{ blocks}/2 \text{ syncs} \rightarrow 1368 \text{ sync blocks}$$

$$\text{Length of data packet} > 437760 \times (1/2)/1368 = 160 \quad (2)$$

An example of the recording process for audio data is as follows:

-Audio data (24 bits, 48 kHz sampled)-

Design condition: Non-compression

AUX data: 6 bytes per field

Number of samples per field in [525/60] format:

$$48 \text{ k}/59.94 \text{ Hz} \times 24 \text{ bits}/8 = 2402.4 \text{ bytes}$$

(5 field sequence)
AUX data of 12 bytes→2415 bytes (total data amount)
Number of samples per field in [625/50] format:

$$48 \text{ k}/50 \text{ Hz} \times 24 \text{ bits}/8 = 2880 \text{ bytes}$$

AUX data of 12 bytes→2892 bytes (total data amount)

To determine the optimum sync block length of audio data, the products of data packet lengths (162 and 163) and the numbers of sync blocks are obtained as follows.

|      | 15   | 16   | 17   | 18   |
|------|------|------|------|------|
| 161: | 2415 | 2576 | 2737 | 2898 |
| 162: | 2430 | 2592 | 2754 | 2916 |

Now, it is defined that the video compression rate is the ratio of the data amount of video data that has been compressed and the data amount of original video data. The data packet length is selected so that the video compression rate becomes 2 or more. The data packet length of which the excessive record area of audio data in both the [525] format and [625] format is 161. However, since each audio sample is composed of 24 bites (3 bytes), the data packet length should be a multiple of 3. Thus, the data packet length should be 162. Consequently, in the digital VTR format, the data amounts are defined as follows.

[525/60] format video data: 162×1152=186624 bytes audio data: 162'15=2430 bytes

[625/50] format video data: 162×1368=221616 bytes audio data: 162×18=2916 bytes

Error correction outer code parity data is added to each of video data and audio data. The number of outer code parities added to video data is 10% thereof. The number of outer code parities added to audio data is 100% thereof. (In other words, the number of audio symbols is the same as the number of parities.) Since the circuit scale largely depends on the number of parities, the maximum number of parities is limited to 14. In addition, the number of tracks per field is 6. Thus, the sum of the number of data blocks and the number of outer code parities should be divided by 6. In the case of video data, two ECC blocks are formed on one track.

-[525/60] format video data- $$1152=(96 \times 2) \times 6 \rightarrow \text{Number of outer code parities}=10$$

2 ECC blocks per track

Number of data blocks per track+number of outer code parities= (96+10)×2=212

-[625/50] format video data- $$1368=(114 \times 2) \times 6 \rightarrow \text{Number of outer code parities}=12$$

2 ECC blocks per track

Number of data blocks per track+number of outer code parities= (114+10)×2=248

In the case of audio data, one ECC block is formed in one field.

-[525/60] format audio data- $$15=(5 \times 3) \rightarrow \text{Number of outer code parities}=5$$

3 ECC blocks per field

Number of data blocks per track+number of outer code parities= (15+15)/6=5

Number of bytes in unnecessary record area per CH=21 bytes/ field

-[625/50] format audio data- $$18=(9 \times 2) \rightarrow \text{Number of outer code parities}=9$$

2 ECC blocks per field

Number of data blocks per track+number of outer code parities= (18+18)/6=6

Number of bytes in unnecessary record area per CH=30 bytes/ field

An ID (2 bytes), a block synchronous signal (sync pattern) (2 bytes), and an inner code parity (14 bytes) are added to each data packet and thereby a sync block (180 bytes each) is formed as record data. Thus, video data and audio data are recorded as sync blocks on a tape. The decoder detects the beginning of each sync block with the synchronous signal, corrects an error thereof with an inner code, separates each sync block into a video sync block or an audio sync block with a video/audio data identification flag recorded in the ID, corrects an error of each of a video sync block and an audio sync block with an outer code, and decodes the video sync block and audio sync block to video data and audio data.

Each sync block of video data and each sync block of audio data are structured so that the length of the former is the same as that of the latter. Thus, the beginning of each sync block can be easily detected. FIGS. 2A and 2B show ECC block structures of a conventional digital VTR. FIG. 2C shows the structure of one sync block. FIG. 2A shows the structure of a video ECC block. FIG. 2B shows the structure of an audio ECC block. As shown in FIG. 2C, the length of each video sync block is 180 bytes. The length of each audio sync block is 180 bytes. Thus, the length of each video sync block is the same as the length of each audio sync block. In the [625/50] format and [525/60] format, one video ECC block (FIG. 2A) is structured in such conditions that the number of blocks per frame is 12, that the number of heads is 4, and that the number of tracks per frame is 6. In the [625/50] format, one audio ECC block (FIG. 2B) is structured in such conditions that the number of blocks per frame is 1, that the number of heads is 4, and that the number of tracks per frame is 6. In the [525/60] format, one audio ECC block is structured in such conditions that the number of blocks per frame is 1, that the number of heads is 4, and that the number of tracks per frame is 6.

FIGS. 3 and 4 show the relation between an audio ECC block and audio samples. FIG. 3 shows the arrangement of samples in the case that the field frequency is 50 Hz. FIG. 4 shows the arrangement of samples in the case that the field frequency is 59.94 Hz. In FIGS. 3 and 4, audio sample numbers starts from the beginning of the current field. AUX is system data that represents the contents of audio data. The arrangement of samples and the structure of one ECC block in the [525/60] format (FIG. 3) are different from those in the [625/50] format (FIG. 4). Thus, the audio encoder and the audio decoder each require a circuit that changes a process corresponding to a selected mode.

Next, a multi-rate format will be considered. In the format that the video rate of the conventional VTR format is decreased by 3, in formulas (1) and (2), when ½ is substituted with ⅓, the length of each data packet becomes 107. On the other hand, when the length of each audio data packet is the same as the length of each video data packet, since the length of each video data packet should be a multiple of the number of audio samples (3 bytes), the length of each video data packet becomes 108.

The data amount of audio data per field is 2415 bytes in the [525/60] format and 2892 bytes in the [625/50] format. Thus, in the [525/60] format, the data amount of audio data per field becomes 108×3=2484 bytes. In the [625/50] format, the data amount of audio data per field becomes 108×27=2916 bytes.

Combinations of the data packet length (108=bytes) and the number of sync blocks (the product thereof represents the total data amount) are for example:

|      | 22   | 23   | 24   | 25   | 26   | 27   | 28   |
|------|------|------|------|------|------|------|------|
| 108: | 2376 | 2484 | 2592 | 2700 | 2808 | 2916 | 3024 |

Next, the structure of each ECC block will be considered. In the case of video data, two ECC blocks are formed per track.

-[525/60] format video data-

1152=(96×3)×4→Number of outer code parities=10

3 ECC blocks per track

Number of data blocks per track+number of outer code parities= (96+10)×3=318

-[625/50] format video data-

1368=(114×3)×4→Number of outer code parities=12

3 ECC blocks per track

Number of data blocks per track+number of outer code parities= (114+12)×3=378

In the case of audio data, it is assumed that one ECC block is formed in one field. In this case, the number of tracks per field is 4.

-[525/60] format audio data-

23=23×1→Number of outer code parities=23

1 ECC block per field

Number of data blocks per track+Number of outer code parities= (23+23)/4=11.5

-[625/50] format audio data-

27=(9×3)→Number of outer code parities=9

3 ECC blocks per field

Number of data blocks per track+Number of outer code parities= (27+27)/4=13.5

In this case, in the NTSC system, the number of outer code parities is too large. Moreover, in both the cases, the number of blocks per track is not an integer. In other words, an ECC block cannot be formed. Thus, in the [525/60] format, 108×24=2592 bytes is selected; and in the [625/50] format, 108×28=3024 bytes is selected.

-[525/60] format audio data-

24=(8×3)→Number of outer code parities=8

3 ECC blocks per field

Number of data blocks per track+Number of outer code parities= (24+24)/4=12

Number of bytes in unnecessary record area per CH=183 bytes/field

-[625/50] format audio data-

28=(7×4)→Number of outer code parities=7

4 ECC blocks per field

Number of data blocks per track+Number of outer code parities=
(28+28)/4=14

Number of bytes in unnecessary record area per CH=136 bytes/
field

In this example, in the [525/60] format, a loss record area of 138 bytes×4 ch per field (equivalent to 0.35 M bps) takes place. Thus, the record efficiency deteriorates. The loss area is proportional to the number of audio channels.

FIG. 5A shows the structure of a video ECC block whose video rate is changed from 1/2 to 1/3. FIG. 5B shows the structure of an audio ECC block whose audio rate is changed from 1/2 to 1/3. FIG. 5C shows the structure of a sync block in the case that the length of one video sync block is the same as the length of one audio sync block. In the [625/50] format and [525/60] format, one video ECC block (see FIG. 5A) is structured in such conditions that the number of blocks per field is 18, that the number of heads is 4, and that the number of tracks per field is 4. In the [625/50] format, one audio ECC block (see FIG. 5B) is structured in such conditions that the number of blocks per field is 4, that the number of heads is 4, and that the number of tracks per field is 4. In the [525/60] format, one audio ECC block is structured in such conditions that the number of blocks per field is 3, that the number of heads is 4, and that the number of tracks per field is 4.

FIG. 6 shows the relation between an audio ECC block and audio samples. FIG. 6 shows the arrangement of samples with a field frequency of 50 Hz. The arrangement of samples shown in FIG. 6 is largely different from that of original samples shown in FIGS. 3 and 4. The multi-rate type VTR should also record and reproduce the original format data, it should process data of all different arrangements. Thus, the multi-rate type VTR requires signal processing circuits corresponding to all formats of various video data rates and various frame frequencies. Thus, the circuit scale of the multi-rate type VTR becomes large (because of a rise of the IC cost).

Actually, as shown in FIG. 7, 14 formats are considered as combinations of video data rates (25 M bps to 600 M bps), video scan modes (interlace and progressive), and frame frequencies (59.94 Hz, 50 Hz, 29.97 Hz, 25 Hz, and 23.976 Hz). In FIG. 7, an NTSC picture frame is composed of 720×480 and a PAL picture frame is composed of 720×576. The interlace mode and progressive mode as video scan modes are denoted by i and p, respectively.

It is necessary to define the lengths of sync blocks for all the formats shown in FIG. 7. The length of each sync block closely relates to the frame frequency, the data amount of video data, the data amount of audio data, and so forth. Thus, when the length of each video sync block is the same as the length of each audio sync block, it is very difficult to select the length (data packet length) that is optimum and common in all the formats. In addition, since the structure of audio data is largely affected by the video rate, circuits corresponding to all video rates should be disposed. If the processes performed by the multi-rate type encoder and decoder are different in the individual formats, the circuit scale becomes huge. Thus, the IC cost rises.

In the conventional digital VTR, one packet of variable length data is placed in one sync block. Thus, in the multi-rate format, the packet rate is proportional to the bit rate. However, since a sync pattern, an ID, and so forth that are added to each sync block have fixed lengths, the size of these data becomes large in the entire size of one sync block. In other words, the redundance of data becomes high.

In addition, since the synchronization detecting circuit of the conventional VTR reproducing system has only one synchronous pattern detecting portion, if input data has a plurality of types of sync blocks with different lengths, the circuit cannot correctly detect a sync pattern.

OBJECTS AND SUMMARY OF THE INVENTION

Therefore, an object of the present invention is to provide a data recording apparatus, a data recording method, a data recording and reproducing apparatus, a data recording and reproducing method, and a data record medium that allow video data and audio data to be recorded and reproduced in a plurality of formats in the structure of which the length of each video sync block is different from the length of each audio sync block.

Another object of the present invention is to provide a data recording apparatus, a data recording method, a data recording and reproducing apparatus, a data recording and reproducing method, and a data record medium that allow a plurality of types of data with different data rates to be recorded and reproduced without an increase of redundancy of data.

A further object of the present invention is to provide a synchronization detecting apparatus, a synchronization detecting method, a digital data reproducing apparatus, and a digital data reproducing method that allow a plurality of types of sync blocks with different lengths to be automatically detected from a reproduced data sequence.

A first aspect of the present invention is a data recording apparatus for recording video data and audio data to a record medium, the video data having a plurality of types of data rates, the audio data having a plurality of types of data amounts as data edit units, the apparatus comprising a first error correction code encoding means for separating the video data into first data packets, forming first error correction code blocks with the first data packets, and performing an error correction code encoding process for each of the first error correction code blocks, a second error correction code encoding means for separating the audio data into second data packets, forming second error correction code blocks with the second data packets, and performing an error correction code encoding process for each of the second error correction code blocks, a means for adding a synchronous signal to each of the first data packets and the second data packets and forming first sync blocks and second sync blocks, respectively, and a recording means for recording data composed of the first sync blocks and the second sync blocks to the record medium, wherein the length of each of the first sync blocks is different from the length of each of the second sync blocks.

A second aspect of the present invention is a data recording apparatus for recording video data and audio data to a record medium, the video data having a plurality of types of data rates, the audio data having a plurality of types of data amounts as data edit units, the apparatus comprising a first error correction code encoding means for separating the video data into first data packets, forming first error correction code blocks with the first data packets, and performing an error correction code encoding process for each of the first error correction code blocks, a second error correction code encoding means for separating the audio data into second data packets, forming second error correction code blocks with the second data packets, and performing an error correction code encoding process for each of the second error correction code blocks, a means for adding a synchronous signal to each of the first data packets and the second data packets and forming first sync blocks and second sync blocks, respectively, and a recording means for recording data composed of the first sync blocks and the second sync blocks to the record medium, wherein at least one first data packet is placed in each of the first sync blocks, the number of first data packets placed in each of the first sync blocks being an integer number and depending on the data rate of the video data.

A third aspect of the present invention is a data recording and reproducing apparatus for recording video data and audio data to a record medium and reproducing video data and audio data from a record medium, the video data having a plurality of types of data rates, the audio data having a plurality of types of data amounts as data edit units, the apparatus comprising a first error correction code encoding means for separating the video data into first data packets, forming first error correction code blocks with the first data packets, and performing an error correction code encoding process for each of the first error correction code blocks, a second error correction code encoding means for separating the audio data into second data packets, forming second error correction code blocks with the second data packets, and performing an error correction code encoding process for each of the second error correction code blocks, a means for adding a synchronous signal to each of the first data packets and the second data packets and forming first sync blocks and second sync blocks, respectively, a recording means for recording data composed of the first sync blocks and the second sync blocks to the record medium, a reproducing means for reproducing data composed of the first sync blocks and the second sync blocks from the record medium, a synchronization detecting means for detecting the synchronous signal from the reproduced data and separating the reproduced data into the first sync blocks and the second sync blocks having different lengths corresponding to the detected synchronous signal, a first error correction code decoding means for decoding data of the separated first sync blocks for each of the first error correction code blocks with an error correction code and generating reproduced video data, and a second error correction code decoding means for decoding data of the separated second sync blocks for each of the second error correction code blocks with an error correction code and generating reproduced audio data, wherein the length of each of the first sync blocks is different from the length of each of the second sync blocks.

A fourth aspect of the present invention is a data recording and reproducing apparatus for recording video data and audio data to a record medium and reproducing video data and audio data from a record medium, the video data having a plurality of types of data rates, the audio data having a plurality of types of data amounts as data edit units, the apparatus comprising a first error correction code encoding means for separating the video data into first data packets, forming first error correction code blocks with the first data packets, and performing an error correction code encoding process for each of the first error correction code blocks, a second error correction code encoding means for separating the audio data into second data packets, forming second error correction code blocks with the second data packets, and performing an error correction code encoding process for each of the second error correction code blocks, a means for adding a synchronous signal to each of the first data packets and the second data packets and forming first sync blocks and second sync blocks, respectively, a recording means for recording data composed of the first sync blocks and the second sync blocks to the record medium, a reproducing means for reproducing data composed of the first sync blocks and the second sync blocks from the record medium, a synchronization detecting means for detecting the synchronous signal from the reproduced data and separating the reproduced data into the first sync blocks and the second sync blocks having different lengths corresponding to the detected synchronous signal, a first error correction code decoding means for decoding data of the separated first sync blocks for each of the first error correction code blocks with an error correction code and generating reproduced video data, and a second error correction code decoding means for decoding data of the separated second sync blocks for each of the second error correction code blocks with an error correction code and generating reproduced audio data, wherein at least one first data packet is placed in each of the first sync blocks, the number of first data packets placed in each of the first sync blocks being an integer number and depending on the data rate of the video data.

A fifth aspect of the present invention is a data reproducing apparatus for reproducing video data and audio data from a record medium, the video data stored in the record medium being one selected from a plurality of types of data rates, the audio data stored in the record medium being one selected from a plurality of types of data amounts as data edit units, the video data being separated into first data packets, first error correction code blocks being formed with the first data packets, an error correction code encoding process being performed for each of the first error correction code blocks, the audio data being separated into second data packets, second error correction code blocks being formed with the second data packets, an error correction code encoding process being performed for each of the second error correction code blocks, a synchronous signal being added to each of the first data packets and the second data packets and thereby first sync blocks and second sync blocks being formed, the apparatus comprising a reproducing means for reproducing data composed of the first sync blocks and the second sync blocks from the record medium, a synchronization detecting means for detecting the synchronous signal from the reproduced data and separating the reproduced data into the first sync blocks and the second sync blocks corresponding to the detected synchronous signal, a first error correction code decoding means for decoding data of the separated first sync blocks for each of the first error correction code blocks with an error correction code and forming the video data with the decoded first data packets, and a second error correction code decoding means for decoding data of the separated second sync blocks for each of the second error correction code blocks with an error correction code and forming the audio data with the decoded second data packets.

A sixth aspect of the present invention is a data record medium on which video data and audio data are recorded, the video data stored in the record medium being one selected from a plurality of types of data rates, the audio data stored in the record medium being one selected from a plurality of types of data amounts as data edit units, the record medium having a video data record area and an audio data record area, data composed of first sync blocks being recorded in the video data record area, data composed of second sync blocks being recorded in the audio data record area, the length of each of the first sync blocks being different from the length of each of the second sync blocks.

A seventh aspect of the present invention is a data record medium on which video data and audio data are recorded, the video data stored in the record medium being one selected from a plurality of types of data rates, the audio data stored in the record medium being one selected from a plurality of types of data amounts as data edit units, the record medium having a video data record area and an audio data record area, data composed of first sync blocks being recorded in the video data record area, data composed of second sync blocks being recorded in the audio data record area, wherein at least one first data packet is placed in each of the first sync blocks, the number of first data packets placed in each of the first sync blocks being an integer number and depending on the data rate of the video data.

An eighth aspect of the present invention is a data recording method for recording video data and audio data to a record medium, the video data having a plurality of types of data rates, the audio data having a plurality of types of data amounts as data edit units, the method comprising the steps of separating the video data into first data packets, forming first error correction code blocks with the first data packets, and performing an error correction code encoding process for each of the first error correction code blocks, separating the audio data into second data packets, forming second error correction code blocks with the second data packets, and performing an error correction code encoding process for each of the second error correction code blocks, adding a synchronous signal to each of the first data packets and the second data packets and forming first sync blocks and second sync blocks, respectively, and recording data composed of the first sync blocks and the second sync blocks to the record medium, wherein the length of each of the first sync blocks is different from the length of each of the second sync blocks.

A ninth aspect of the present invention is a data recording method for recording video data and audio data to a record medium, the video data having a plurality of types of data rates, the audio data having a plurality of types of data amounts as data edit units, the method comprising the steps of separating the video data into first data packets, forming first error correction code blocks with the first data packets, and performing an error correction code encoding process for each of the first error correction code blocks, separating the audio data into second data packets, forming second error correction code blocks with the second data packets, and performing an error correction code encoding process for each of the second error correction code blocks, adding a synchronous signal to each of the first data packets and the second data packets and forming first sync blocks and second sync blocks, respectively, and recording data composed of the first sync blocks and the second sync blocks to the record medium, wherein at least one first data packet is placed in each of the first sync blocks, the number of first data packets placed in each of the first sync blocks being an integer number and depending on the data rate of the video data.

A tenth aspect of the present invention is a data recording and reproducing method for recording video data and audio data to a record medium and reproducing video data and audio data from a record medium, the video data having a plurality of types of data rates, the audio data having a plurality of types of data amounts as data edit units, the method comprising the steps of separating the video data into first data packets, forming first error correction code blocks with the first data packets, and performing an error correction code encoding process for each of the first error correction code blocks, separating the audio data into second data packets, forming second error correction code blocks with the second data packets, and performing an error correction code encoding process for each of the second error correction code blocks, adding a synchronous signal to each of the first data packets and the second data packets and forming first sync blocks and second sync blocks, respectively, recording data composed of the first sync blocks and the second sync blocks to the record medium, reproducing data composed of the first sync blocks and the second sync blocks from the record medium, detecting the synchronous signal from the reproduced data and separating the reproduced data into the first sync blocks and the second sync blocks having different lengths corresponding to the detected synchronous signal, decoding data of the separated first sync blocks for each of the first error correction code blocks with an error correction code and generating reproduced video data, and decoding data of the separated second sync blocks for each of the second error correction code blocks with an error correction code and generating reproduced audio data, wherein the length of each of the first sync blocks is different from the length of each of the second sync blocks.

An eleventh aspect of the present invention is a data recording and reproducing method for recording video data and audio data to a record medium and reproducing video data and audio data from a record medium, the video data having a plurality of types of data rates, the audio data having a plurality of types of data amounts as data edit units, the method comprising the steps of separating the video data into first data packets, forming first error correction code blocks with the first data packets, and performing an error correction code encoding process for each of the first error correction code blocks, separating the audio data into second data packets, forming second error correction code blocks with the second data packets, and performing an error correction code encoding process for each of the second-error correction code blocks, adding a synchronous signal to each of the first data packets and the second data packets and forming first sync blocks and second sync blocks, respectively, recording data composed of the first sync blocks and the second sync blocks to the record medium, reproducing data composed of the first sync blocks and the second sync blocks from the record medium, detecting the synchronous signal from the reproduced data and separating the reproduced data into the first sync blocks and the second sync blocks having different lengths corresponding to the detected synchronous signal, decoding data of the separated first sync blocks for each of the first error correction code blocks with an error correction code and generating reproduced video data, and decoding data of the separated second sync blocks for each of the second error correction code blocks with an error correction code and generating reproduced audio data, wherein at least one first data packet is placed in each of the first sync blocks, the number of first data packets placed in each of the first sync blocks being an integer number and depending on the data rate of the video data.

A twelfth aspect of the present invention is a data reproducing method for reproducing video data and audio data from a record medium, the video data stored in the record medium being one selected from a plurality of types of data rates, the audio data stored in the record medium being one selected from a plurality of types of data amounts as data edit units, the video data being separated into first data packets, first error correction code blocks being formed with the first data packets, an error correction code encoding process being performed for each of the first error correction code blocks, the audio data being separated into second data packets, second error correction code blocks being formed with the second data packets, an error correction code encoding process being performed for each of the second error correction code blocks, a synchronous signal being added to each of the first data packets and the second data packets and thereby first sync blocks and second sync blocks being formed, the method comprising the steps of reproducing data composed of the first sync blocks and the second sync blocks from the record medium, detecting the synchronous signal from the reproduced data and separating the reproduced data into the first sync blocks and the second sync blocks corresponding to the detected synchronous signal, decoding data of the separated first sync blocks for each of the first error correction code blocks with an error correction code and forming the video data with the decoded first data packets, and decoding data of the separated second sync blocks for each of the second error correction code blocks with an error correction code and forming the audio data with the decoded second data packets.

A thirteenth aspect of the present invention is a digital data reproducing apparatus for reproducing data blocks from a record medium, the data blocks having at least two data lengths, the data blocks each having a synchronous pattern for detecting synchronization, comprising a synchronous pattern detecting means for detecting a synchronous pattern of the synchronous signal from the reproduced data, a first memory means for successively storing the reproduced data as data blocks with a predetermined data length and outputting stored data as data blocks with the predetermined data length in the order of order data blocks, the first memory means having a first data length, a first comparing means for determining whether or not both data that is input to the first memory means and data that is output therefrom match the synchronous pattern corresponding to the detected result of the synchronous pattern detecting means, a second memory means for inputting the reproduced data that is the same as the reproduced data that is input to the first memory means, storing the reproduced data as data blocks with the predetermined data length, and outputting stored data as data blocks with the predetermined data length in the order of older data blocks, the second memory means having a second data length K, the second data length K being smaller than the first data length L, the second data length K not being any integer times the first data length L, a second comparing means for determining whether both data that is input to the second memory means and data that is output therefrom match the synchronous pattern corresponding to the detected result of the synchronous pattern detecting means, and an output means for outputting the reproduced data as data blocks with a data length corresponding to the first comparing means or the second comparing means that has detected a match of the synchronous pattern.

A fourteenth aspect of the present invention is a synchronization detecting apparatus for detecting a synchronous pattern from each of data blocks with at least two data lengths, the data blocks each having a synchronous pattern for detecting synchronization, the apparatus comprising a synchronous pattern detecting means for detecting a synchronous pattern from input data, a first memory means for successively storing the input data as data blocks with a predetermined data length and outputting stored data as data blocks with the predetermined data length in the order of order data blocks, the first memory means having a first data length, a first comparing means for determining whether or not both data that is input to the first memory means and data that is output therefrom match the synchronous pattern corresponding to the detected result of the synchronous pattern detecting means, a second memory means for inputting the input data that is the same as the input data of the first memory means, storing the input data as data blocks with the predetermined data length, and outputting stored data as data blocks with the predetermined data length in the order of older data blocks, the second memory means having a second data length K, the second data length K being smaller than the first data length L, the second data length K not being any integer times the first data length L, and a second comparing means for determining whether both data that is input to the second memory means and data that is output therefrom match the synchronous pattern corresponding to the detected result of the synchronous pattern detecting means, wherein when a match of the synchronous pattern is detected in one of the first comparing means and the second comparing means, it is supposed that a synchronous pattern has been detected.

A fifteenth aspect of the present invention is a synchronization detecting method for detecting synchronization of each of data blocks with at least two data lengths, the data blocks each having a synchronous pattern for detecting synchronization, the method comprising the steps of (a) successively storing input data as data blocks with a predetermined data length to a first memory and outputting data as data blocks with the predetermined data length from the first memory in the order of older data blocks, the first memory having a first data length, (b) inputting the input data to a second memory, storing the input data as data blocks with the predetermined data length, and outputting stored data as data blocks with the predetermined data length in the order of older data blocks, the input data being the same as the input data of the first memory, the second memory having a second data length K, the second data length K being smaller than the first data length L, the second data length K not being any integer times the first data length L, (c) detecting a synchronous pattern from the input data, (d) determining whether or not both the data that is input to the first memory and the data that is output therefrom match the synchronous pattern corresponding to the detected result at step (c), and (e) determining whether or not both the data that is input to the second memory and the data that is output therefrom match the synchronous pattern corresponding to the detected result at step (c), wherein when a match of the synchronous pattern is detected at one of step (d) and step (e), it is supposed that the synchronization is detected.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 3 is a schematic diagram showing the arrangement of audio samples of the conventional digital VTR;

FIG. 6 is a schematic diagram showing the arrangement of audio samples of the modified ECC blocks of the conventional digital VTR;

FIG. 7 is a schematic diagram showing examples of a plurality of formats;

FIG. 15 is a table showing formats used in a recording process and a reproducing process;

FIGS. 16A, 16B, 16C, and 16D are schematic diagrams showing a plurality of types of ECC blocks of video data;

FIGS. 18A and 18B are schematic diagrams showing the arrangements of audio samples of ECC blocks;

FIGS. 20A, 20B, and 20C are schematic diagrams showing the contents of an ID and an DID added to each sync block;

FIG. 28 is a graph for explaining an error correcting capability of an error correction code;

FIGS. 30A, 30B, and 30C are schematic diagrams for explaining a bit shift operation of input data;

FIGS. 31A, 31B, and 31C are schematic diagrams for explaining input data and synchronous pulses;

FIGS. 40A, 40B, 40C, 40D, and 40E are timing charts showing an example of data that is output from an output controlling circuit.

DETAILED DESCRIPTION OF THE PREFERRED EMBODIMENTS

Figure 1A:
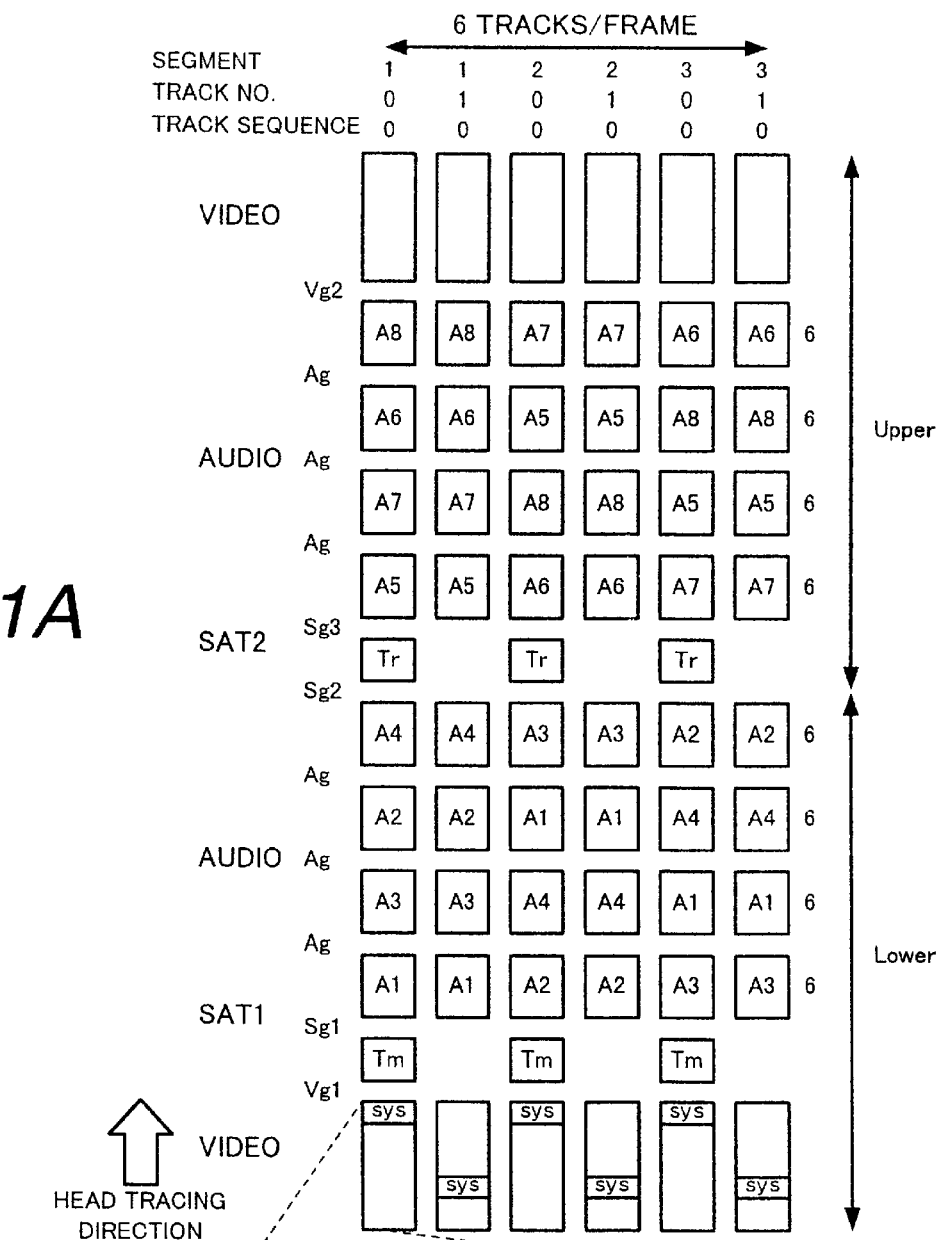
FIGS. 1A, 1B, and 1C are schematic diagram showing a tape format of a conventional digital VTR.
Figure 1B:
Figure 1C:
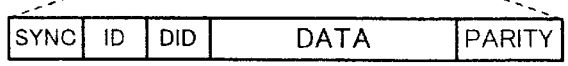
Figure 2A:
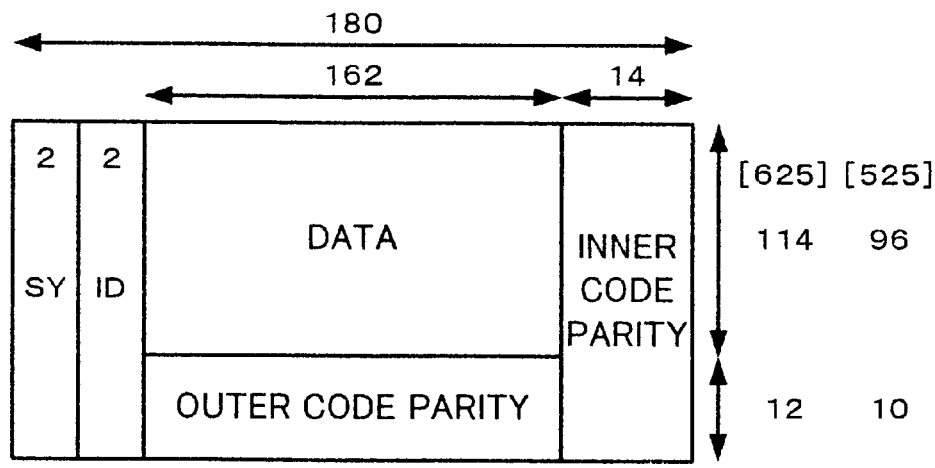
FIGS. 2A, 2B, and 2C are schematic diagrams showing the structures of ECC blocks of the conventional digital VTR.
Figure 2B:
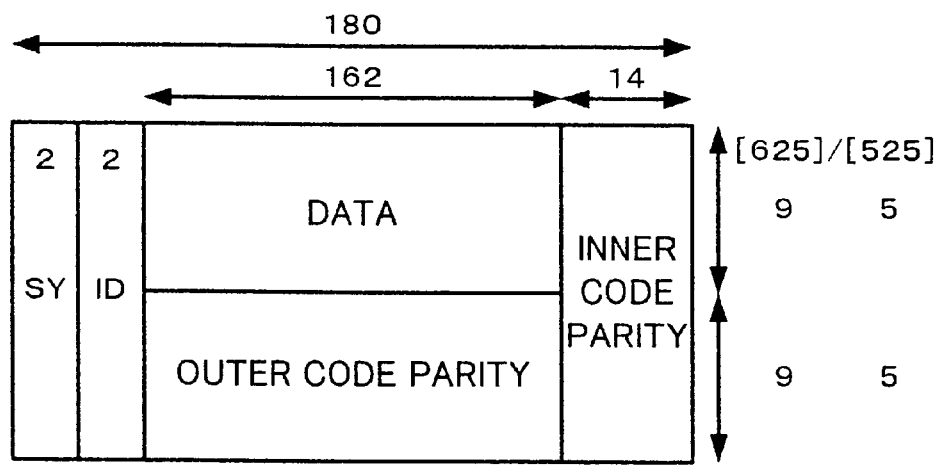
Figure 2C:
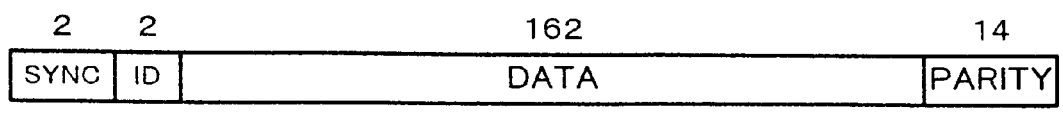
Figure 4:
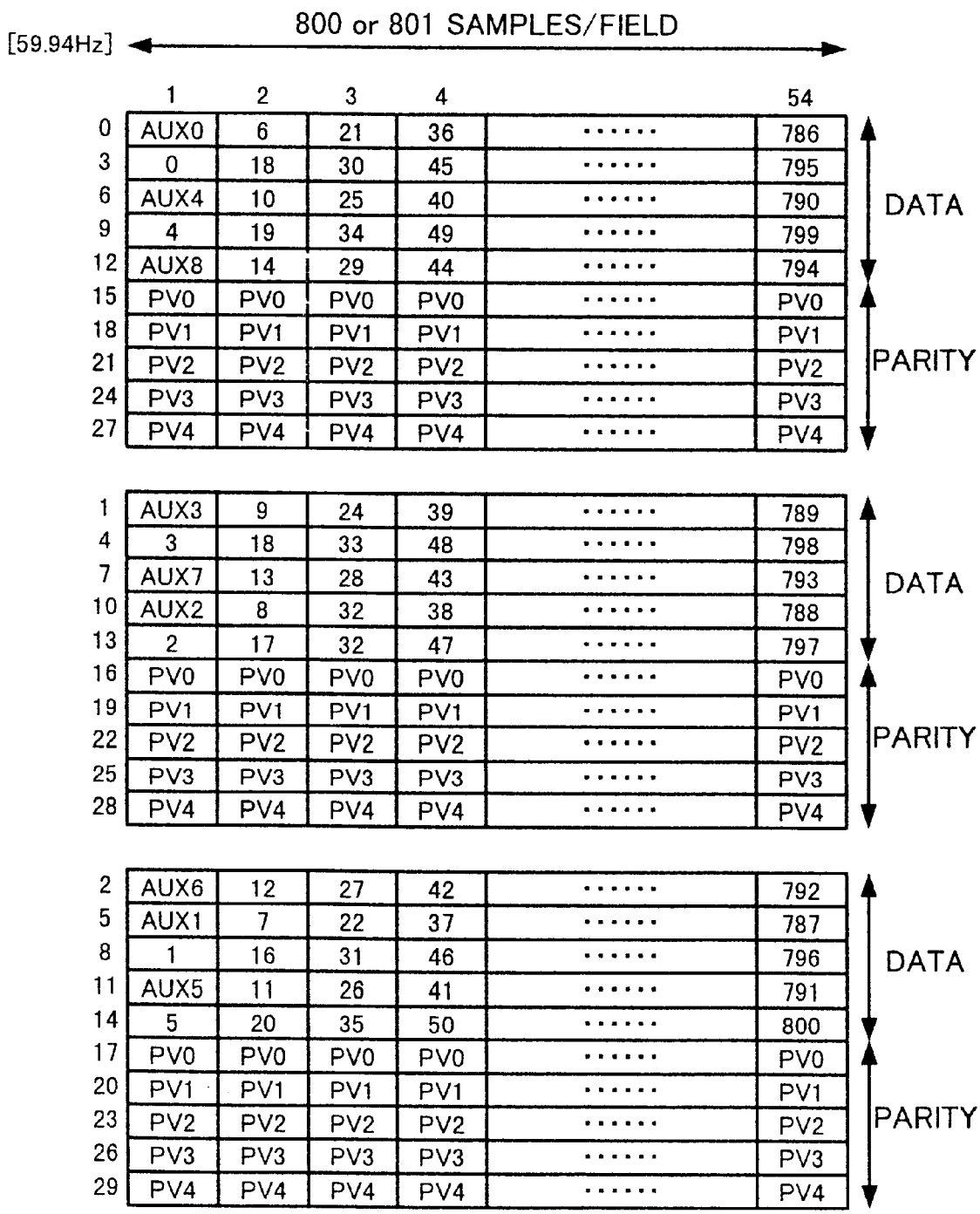
FIG. 4 is a schematic diagram showing the arrangement of audio samples of the conventional digital VTR.
Figure 5A:
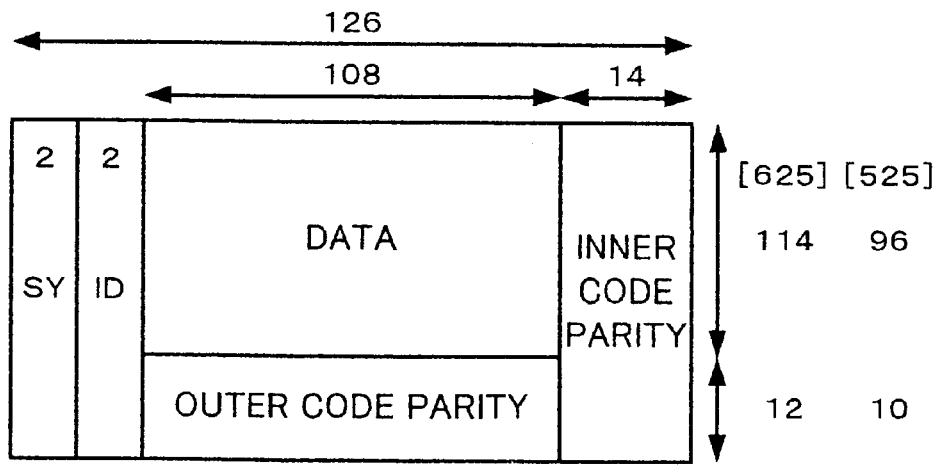
FIGS. 5A, 5B, and 5C are schematic diagrams showing the structures of modified ECC blocks of the conventional digital VTR.
Figure 5B:
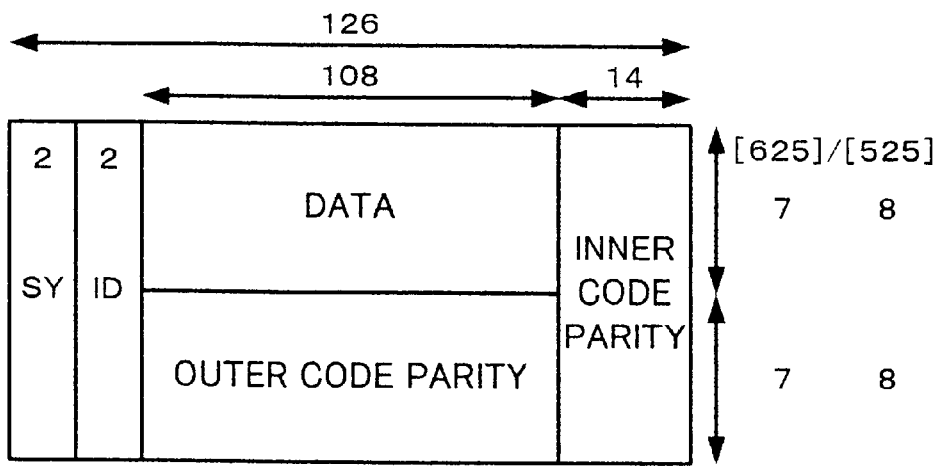
Figure 5C:
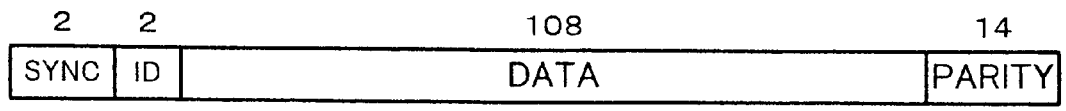

Next, a digital VTR according to an embodiment of the present invention will be described. The digital VTR can record and reproduce video signals in a plurality of formats so that it can be properly used in the environment of a broadcasting station. For example, the digital VTR can record and reproduce data in the formats shown in FIG. 7.

According to the embodiment, a video signal that is compressed and a video signal that is not compressed can be recorded and reproduced. As the compressing method, for example, MPEG2 standard is used. The MPEG2 standard is a combination of a motion compensation predictive encoding process and a DCT compression encoding process. The data structure of the MPEG2 standard is a hierarchical structure having a block layer (lowest layer), a macro block layer, a slice layer, a picture layer, a GOP (Group Of Picture) layer, and a sequence layer (highest layer).

The block layer is composed of DCT blocks. The DCT process is performed for each DCT block. The macro block layer is composed of a plurality of DCT blocks. The slice layer is composed of a header portion and any number of macro blocks that are placed on one line, not on two lines. The picture layer is composed of a header portion and a plurality of slices. One picture is equivalent to one screen. The GOP layer is composed of a header portion, an I picture (as an intra-frame coded picture), a P picture (as a predictively coded picture), and a B picture (as a bidirectionally predictively coded picture).

When an I picture is encoded, only the information thereof is used. Thus, the I picture is decoded with the information thereof. A P picture uses an I picture or a P picture that has been decoded as a predictive picture that is a reference picture for obtaining the difference. The difference between the P picture and the motion-compensated predictive picture is encoded. Alternatively, the P picture is encoded. One of these methods is selected whichever effective for each macro block. A B picture uses three types of pictures as predictive pictures that are an I picture or a P picture that has been decoded before the B picture, an I picture or a P picture that has been decoded after the B picture, and an interpolated picture created by these two pictures. The difference between the B picture and each of the three types of pictures that have been motion-compensated is encoded. Alternatively, the B picture is intra-encoded. One of these methods is selected whichever effective for each macro block.

Thus, there are four types of macro blocks that are an intra frame coded macro block, a forward inter frame predictive macro block (a future macro block is predicted with a past macro block), a backward inter frame predictive macro block (a past macro block is predicted with a future macro block), and a bidirectional macro block (the current macro block is predicted in both forward and backward directions).

All macro blocks of an I picture are intra frame coded macro blocks. A P picture contains intra frame coded macro blocks and forward inter frame predictive macro blocks. A B picture contains all the four types of macro blocks.

Each GOP contains at least one I picture. In other words, each GOP may not contain a P picture and/or a B picture. The sequence layer (which is the highest layer) is composed of a header portion and a plurality of GOPs.

In the MPEG format, a slice is one variable length code sequence. The variable length code sequence is a sequence of which the boundary of data cannot be detected unless a variable length code is decoded.

At the beginning of each of the sequence layer, the GOP layer, the picture layer, the slice layer, and the macro block layer, an identification code having a predetermined bit pattern as a byte is placed. The identification code is referred to as start code. The header portion of each layer contains a header, extension data, or user data. The header of the sequence layer contains the size of a picture (the number of pixels in the vertical direction and the horizontal direction). The header of the GOP layer contains a time code and the number of pictures of the current GOP.

Each of the macro blocks contained in the slice layer is a set of a plurality of DCT blocks. An encoded sequence of DCT blocks is composed in such a manner that a sequence of quantized DCT coefficients is encoded as sets of the number of 0 coefficients and a non-0 coefficient. An identification code arranged as a byte is not added to each macro block and each DCT block of each macro block.

A macro block is an element of which a picture is divided by 16 pixels×16 lines as a matrix. A slice is composed of macro blocks that are horizontally connected. The last macro block of the first slice of two successive slices and the top macro block of the second slice thereof are successive. Macro blocks that overlap between two successive slices are prohibited. The number of macro blocks depends on the size of a picture.

To prevent a signal from deteriorating in a decoding process or an encoding process, it is preferred that encoded data is edited. At this point, a P picture requires a picture that is chronologically preceded by the P picture. On the other hand, a B picture requires a picture that is chronologically preceded by the B picture and a picture that is chronologically followed by the B picture. Thus, data cannot be edited frame by frame. From this point of view, according to the embodiment of the present invention, one GOP is composed of one I picture.

A record area of record data for one frame is predetermined. In the MPEG2 standard, since a variable length code encoding process is used, the data amount for one frame is controlled so that data generated in one frame period is recorded in the predetermined record area. In addition, according to the embodiment, one slice is composed of one macro block. In addition, one macro block is placed in a fixed area having a predetermined length so that data can be properly recorded to a magnetic tape.

In the MPEG standard, one slice is composed of one slice (16 lines). The variable length code encoding process starts with the left edge of the screen and ends with the left edge thereof. When an MPEG elementary stream is recorded on a tape by a VTR, a reproduced portion concentrates on the left side of the screen in a high speed reproducing mode. Thus, the screen cannot be equally updated. In addition, since the arrangement of data on the tape cannot be predicted, when a tape pattern is traced at predetermined intervals, the screen cannot be equally updated. Moreover, when an error takes place at one position of the screen, it propagates to the right edge of the screen. Until the next slice header is detected, a correct picture cannot be displayed. Thus, one slice is composed of one macro block.

Figure 8:
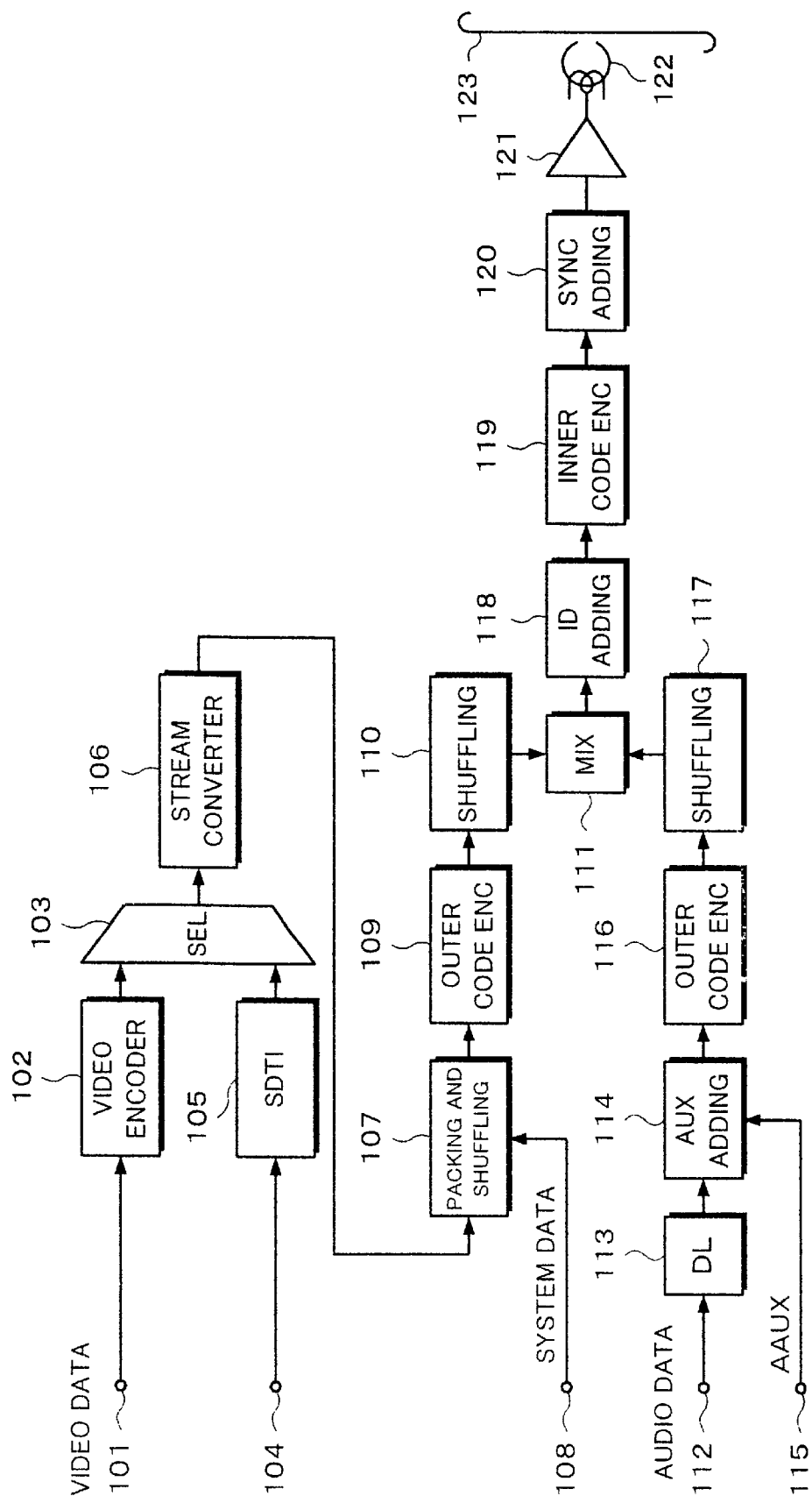
FIG. 8 is a block diagram showing the structure of a recording side according to an embodiment of the present invention.

FIG. 8 shows an example of the structure of a recording side of the recording and reproducing apparatus according to the embodiment of the present invention. When data is recorded, a digital video signal is input from a terminal 101 through a receiving portion of a predetermined interface—for example—SDI (Serial Data Interface). The SDI is an interface defined by SMPTE. With the SDI, a (4:2:2) component digital video signal, a digital audio video signal, and additional data are sent. The input video signal is sent to a video encoder 102. The video encoder 102 performs a DCT (Discrete Cosine Transform) process for the video signal so as to convert the video signal into coefficient data and encode the coefficient data to variable length code (VLC) data. The variable length code data supplied from the video encoder 102 is an elementary stream corresponding to the MPEG2 standard. The variable length code data is sent to one input terminal of a selector 103.

Data in the SDTI (Serial Data Transform Interface) format is input through an input terminal 104. This signal is synchronously detected by an SDTI receiving portion 105. The signal is temporarily stored in a buffer. In the buffer, an elementary stream is extracted from the signal. The extracted elementary stream is sent to the other input terminal of the selector 103.

According to the embodiment, to transmit for example an MPEG ES, an SDTI (Serial Data Transport Interface)—CP (Content Packet) is used. The ES is composed of (4:2:2) components. The ES is a stream composed of all I pictures. In addition, the ES has a relation of 1 GOP=1 picture. In the SDTI-CP format, an MPEG ES is separated to an access unit. The MPEG ES is packetized as packets corresponding to frames. The SDTI-CP has a sufficient transmission band (27 MHz or 36 MHz as a clock rate; 270 Mbps or 360 Mbps as a stream bit rate). An ES can be transmitted as bursts in one frame interval. Between SAV and EAV of one frame period, system data, video stream, audio stream, and AUX data are placed. Data is not equally placed in one frame period. Instead, data is placed as bursts at the beginning for a predetermined period of one frame. At the boundary of a frame, an SDTI-CP (video data and audio data) can be switched as a stream. When the SDTI-CP is contents that use an SMPTE time code as a clock reference, the SDTI-CP causes audio data to synchronize with video data. In addition, the format of the SDTI-CP allows it to co-exist with an SDI.

As with the case that a TS (Transport Stream) is transmitted, in the interface using the SDTI-CP, it is not necessary to supply the SDTI-CP to a VBV (Video Buffer Verifier) buffer and TBs (Transport Buffers). Thus, the delay can be reduced. In addition, since the SDTI-CP is transmitted at very high speed, the delay can be further reduced. Consequently, in the environment where a synchronous signal for controlling the entire broadcasting station is available, it is effective to use an SDTI-CP.

An elementary stream that is selected by the selector 103 is sent to a stream converter 106. The stream converter 106 arranges DCT coefficients of a plurality of DCT blocks corresponding to individual frequency components and rearranges the resultant frequency components. When one slice of the elementary stream is composed of one stripe, the stream converter 106 causes one slice to be composed of one macro block. In addition, the stream converter 106 limits the maximum length of the variable length data of one macro block to a predetermined value (by setting high order DCT coefficients to 0). The rearranged elementary stream is sent to a packing and shuffling portion 107.

Since video data in the elementary stream has been encoded with a variable length code, the lengths of macro blocks are different. The packing and shuffling portion 107 packs each macro block in a fixed area. At this point, an overflow portion that is not packed in the fixed area is successively packed in a blank area against the size of the fixed area. System data containing video format, shuffling pattern version, and so forth is supplied from an input terminal 108 to the packing and shuffling portion 107. As with picture data, the packing and shuffling portion 107 performs the recording process for the system data. The system data is recorded as video AUX. The packing and shuffling portion 107 rearranges macro blocks of one frame that have taken in the scanning order and shuffles the macro blocks that are recorded on the magnetic tape. The shuffling process allows the update ratio of data that is partly reproduced in a variable speed reproducing mode to be improved.

Video data and system data (in the following description, unless noted, video data means both video data and system data) are supplied from the packing and shuffling portion 107 to an outer code encoder 109. The outer code encoder 109 uses a product code as an error correction code for the video data and the audio data. With the product code, a two-dimensional matrix of video data or audio data is encoded with an outer code in the vertical direction and with an inner code in the horizontal direction. Thus, data symbols are encoded two times. As the outer code and the inner code, Reed-Solomon code can be used.

Output data of the outer code encoder 109 is supplied to a shuffling portion 110. The shuffling portion 110 shuffles sync blocks of a plurality of error correction blocks. Thus, an error can be prevented from concentrating on a particular error correction block. The shuffling process performed by the shuffling portion 110 may be referred to as interleaving process. Output data of the shuffling portion 110 is supplied to a mixing portion 111. The mixing portion 111 mixes the output data of the shuffling portion 110 with audio data. As will be described later, the mixing portion 111 is composed of a main memory.

Audio data is received from an input terminal 112. According to the embodiment of the present invention, a non-compressed digital audio signal is handled. The digital audio signal is separated by an SDI receiving portion (not shown) of the input side or an SDTI receiving portion 105. Alternatively, the digital audio signal is input through an audio interface. The input digital audio signal is supplied to an AUX adding portion 114 through a delaying portion 113. The delaying portion 113 matches the phase of the audio signal with the phase of the video signal. Audio AUX received from an input terminal 115 is auxiliary data having information in association with audio data such as sampling frequency thereof. The AUX adding portion 114 adds the audio AUX to audio data. The audio AUX is treated in the same manner as audio data.

Audio data and AUX data (in the following description, unless noted, audio data means both audio data and AUX data) are supplied to an outer code encoder 116. The outer code encoder 116 encodes audio data with an outer code. Output data of the outer code encoder 116 is supplied to a shuffling portion 117. The shuffling portion 117 shuffles the output data of the outer code encoder 116. The shuffling portion 117 shuffles audio data for each sync block or for each channel.

Output data of the shuffling portion 117 is supplied to the mixing portion 111. The mixing portion 111 mixes the video data and the audio data as data of one channel. Output data of the mixing portion 111 is supplied to an ID adding portion 118. The ID adding portion 118 adds an ID having information that represents a sync block number to the output data of the mixing portion 111. Output data of the ID adding portion 118 is supplied to an inner code encoder 119. The inner code encoder 119 encodes the output data of the ID adding portion 118 with an inner code. Output data of the inner code encoder 119 is supplied to a synchronization adding portion 120. The synchronization adding portion 120 adds a synchronous signal to each sync block. Thus, sync blocks are structured as successive record data. The record data is supplied to a rotating head 122 through a recording amplifier 121 and recorded on a magnetic tape 123. Actually, the rotating head 122 is composed of a plurality of magnetic heads with different azimuths and a rotating drum on which the magnetic heads are disposed.

When necessary, a scramble process may be performed for record data. In addition, when data is recorded, it may be digital-modulated. Moreover, partial response class 4 and Viterbi encoding process may be used.

Figure 9:
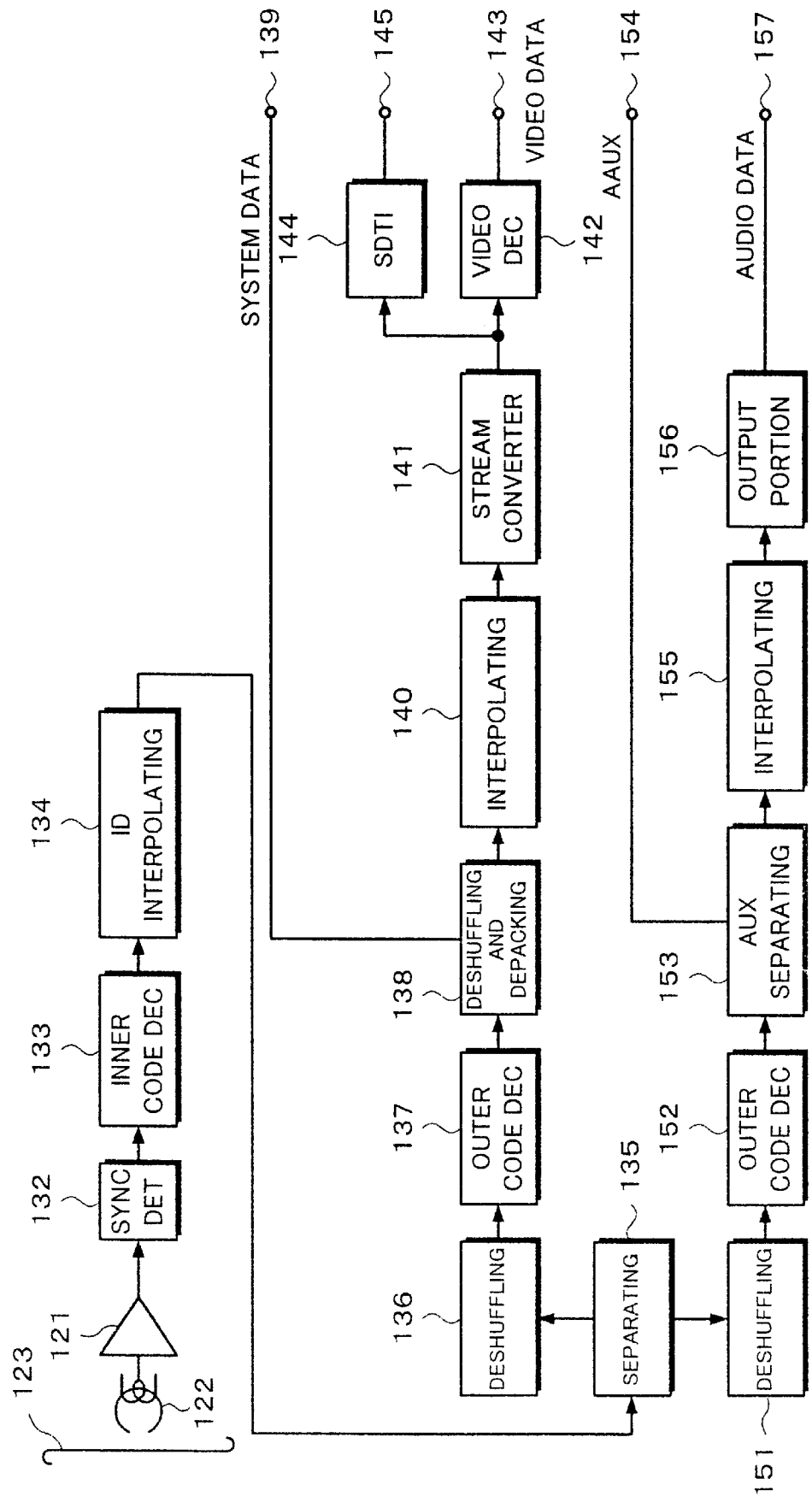
FIG. 9 is a block diagram showing the structure of a reproducing side according to the embodiment of the present invention.

FIG. 9 shows an example of the structure of a reproducing side according to the embodiment of the present invention. A signal reproduced from a magnetic tape 123 by a rotating head 122 is supplied to a synchronization detecting portion 132 through a reproducing amplifier 131. An equalizing process and a waveform trimming process are performed for the reproduction signal. When necessary, a digital demodulating process and Viterbi decoding process are performed. The synchronization detecting portion 132 detects a synchronous signal at the beginning of a sync block and extracts the sync block.

Output data of the synchronization detecting portion 132 is supplied to an inner code encoder 133. The inner code encoder 133 corrects an error of the output data of the synchronization detecting portion 132 with an inner code. Output data of the inner code encoder 133 is supplied to an ID compensating portion 134. The ID interpolating portion 134 interpolates an ID (for example, a sync block number) of a sync block of which an error has been detected with an inner block. Output data of the ID interpolating portion 134 is supplied to a separating portion 135. The separating portion 135 separates the output data of the ID interpolating portion 134 into video data and audio data. As described above, the video data contains DCT coefficient data generated in the MPEG intra-encoding process and system data. Likewise, the audio data contains PCM (Pulse Code Modulation) data and AUX data.

A deshuffling portion 136 deshuffles video data received from the separating portion 135. The deshuffling portion 136 restores shuffled sync blocks shuffled by the shuffling portion 110 on the recording side to original sync blocks. Output data of the deshuffling portion 136 is supplied to an outer code decoder 137. The outer code decoder 137 corrects an error of output data of the deshuffling portion 136 with an outer code. When an error of the data cannot be corrected, an error flag is placed thereto.

Output data of the outer code decoder 137 is supplied to a deshuffling and depacking portion 138. The deshuffling and depacking portion 138 deshuffles macro blocks that have been shuffled by the packing and shuffling portion on the recording side. In addition, the deshuffling and depacking portion 138 performs a depacking process for data that has been packed on the recording side. In other words, the deshuffling and depacking portion 138 restores fixed length macro blocks to original variable length codes. Moreover, the deshuffling and depacking portion 138 separates system data from the output data of the outer code decoder 137. The system data is obtained from an output terminal 139.

Output data of the deshuffling and depacking portion 138 is supplied to an interpolating portion 140. The interpolating portion 140 corrects data that has an error flag. When a macro block has an error, DCT coefficients of frequency components of the rest of the macro block cannot be restored. In this case, data having an error is substituted with an EOB (End Of Block). DCT coefficients of frequency components after the EOB are set to zero. Likewise, in the high speed reproducing mode, only DCT coefficients corresponding to the length of a sync block are restored. DCT coefficients after the sync block are substituted with zero data. When a header (a sequence header, a GOP header, a picture header, user data, or the like) at the beginning of video data has an error, the interpolating portion 140 restores the header.

Since DCT coefficients of a plurality of DCT blocks are arranged in the order from DC components and from the lowest frequency component to the highest frequency component, even if DCT coefficients after a particular position are ignored, DCT coefficients of DC components and low frequency components can be placed in each of DCT blocks that compose a macro block.

Output data of the interpolating portion 140 is supplied to a stream converter 141. The stream converter 141 performs an inverse process of the process of the stream converter 106 on the recording side. In other words, the stream converter 141 rearranges DCT coefficients arranged in the order of frequency components in DCT blocks to DCT coefficients in the order of DCT blocks. Thus, the reproduction signal is converted into an elementary stream corresponding to the MEPG2 standard.

An input signal and an output signal of the stream converter 141 have sufficient transmission rates (band widths) corresponding to the maximum length of macro blocks. When the length of macro blocks is not limited, it is preferred to secure a band width that is three times larger than the pixel rate.

Output data of the stream converter 141 is supplied to a video decoder 142. The video decoder 142 decodes an elementary stream and outputs video data. In other words, the video decoder 142 performs a dequantizing process and an inverse DCT process. Decoded video data is obtained from an output terminal 143. As an interface to the outside of the apparatus, for example SDI is used. In addition, the stream converter 141 also supplies an elementary stream to an SDTI transmitting portion 144. System data, reproduction audio data, and AUX data are also supplied to the SDTI transmitting portion 144 through-relevant paths (not shown). The SDTI transmitting portion 144 converts these signals into an SDTI format stream. The stream is supplied from the SDTI transmitting portion 144 to the outside of the apparatus through an output terminal 145.

Audio data separated by the separating portion 135 is supplied to a deshuffling portion 151. The deshuffling portion 151 performs an inverse process of the shuffling portion 117 on the recording side. Output data of the deshuffling portion 117 is supplied to an outer code decoder 152. The outer code decoder 152 corrects an error of the output signal of the deshuffling portion 117 with an outer code. The outer code decoder 152 outputs audio data whose error has been corrected. When an error of the audio data cannot be corrected, an error flag is set thereto.

Output data of the outer code decoder 152 is supplied to an AUX separating portion 153. The AUX separating portion 153 separates audio AUX from the output data of the outer code decoder 152. The separated audio AUX is obtained from an output terminal 154. The separated audio data is supplied to an interpolating portion 155. The interpolating portion 155 interpolates a sample having an error. As an interpolating method, a mean value interpolating method of which a particular sample is interpolated with the mean value of a correct sample followed by the particular sample and a correct sample preceded by the particular sample can be used. Alternatively, a preceding value holding method of which the preceding correct sample value is held can be used. Output data of the interpolating portion 155 is supplied to an output portion 156. The output portion 156 performs a mute process, a delay amount adjusting process, and so forth. In the mute process, an audio signal having an error that cannot be compensated is prohibited from being output. In the delay amount adjusting process, the phase of the audio signal is matched with the phase of the video signal. The output portion 156 supplies the reproduction audio signal to an output terminal 157.

The reproducing side according to the embodiment of the present invention also has a timing generating portion, a system controller (that is a microcomputer), and so forth (they are not shown in FIGS. 8 and 9). The timing generating portion generates a timing signal in synchronization with input data. The system controller controls the entire operations of the recording and reproducing apparatus.

Figure 10A:
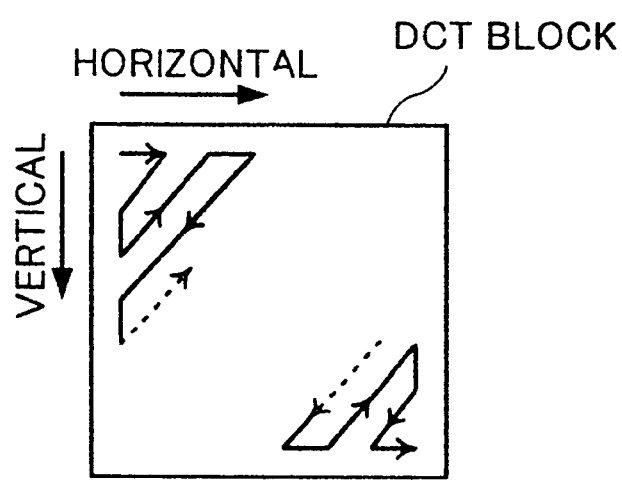
FIGS. 10A and 10B are schematic diagrams for explaining an output method of a video encoder and a variable length code encoding process.
Figure 10B:
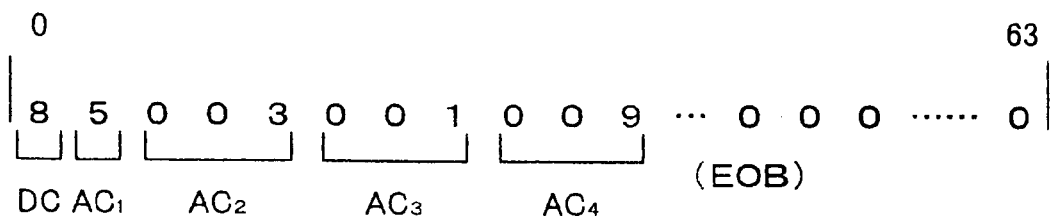

FIG. 10A shows the order of DCT coefficients of video data that are output from a DCT circuit of an MPEG encoder. DCT coefficients are output in the order from a DC component at the upper left position of a DCT block to higher horizontal/vertical frequency components in zigzag scanning method. Thus, as shown in FIG. 10B, a total of 64 DCT coefficients (8 pixels×8 lines) are obtained in the order of frequency components.

The DCT coefficients are encoded with a variable length code by a VLC portion of the MPEG encoder. In other words, the first coefficient is a DC component that is a fixed component. The next components (AC components) are assigned codes corresponding to zero-runs and levels that follow. Thus, since the variable-length code encoded output data against coefficient data of AC components are arranged in the order from the lowest frequency component (lowest order coefficient) to the highest frequency component (highest order coefficient) such as $AC_1, AC_2, AC_3, \ldots$. An elementary stream contains the DCT coefficients that have been encoded with a variable length code.

The stream converter 106 rearranges DCT coefficients of the received signal. In other words, the stream converter 106 rearranges DCT coefficients arranged in the order of frequency components in each DCT block into DCT coefficients in the order of frequency components of all DCT blocks of the macro block.

FIG. 11 shows DCT coefficients rearranged by the stream converter 106. In the case of a (4:2:2) component signal, one macro block is composed of four DCT blocks ($Y_1, Y_2, Y_3$, and $Y_4$) of a luminance signal Y, two DCT blocks ($Cb_1$ and $Cb_2$) of a chrominance signal Cb, and two DCT blocks ($Cr_1$ and $Cr_2$) of a chrominance signal Cr.

Figure 11A:
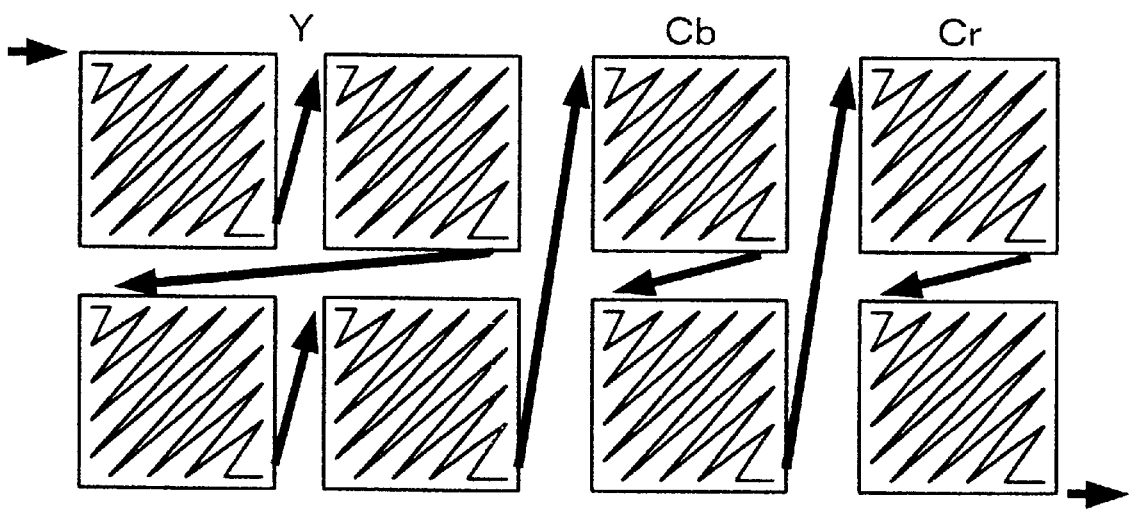
FIGS. 11A and 11B are schematic diagrams for explaining the rearrangement of output data of the video encoder.

As described above, the video encoder 102 zigzag-scans DCT coefficients in the order from a DC component to higher frequency components for each DCT block as shown in FIG. 11A corresponding to the MPEG2 standard. After the video encoder 102 has zigzag-scanned DCT coefficients for one DCT block, the video encoder 102 zigzag-scans DCT coefficients for the next DCT block so as to arrange the DCT coefficients.

In other words, DCT coefficients of each of the DCT blocks $Y_1$, $Y_2$, $Y_3$, and $Y_4$ and the DTC blocks $Cb_1$, $Cb_2$, $Cr_1$, and $Cr_2$ of the macro block are arranged in the order from the DC component to higher frequency components. The variable-length code encoding process is performed in such a manner that codes are designated to sets of runs and levels that follow (for example, DC, $AC_1$, $AC_2$, $AC_3$, ... ).

Figure 11B:
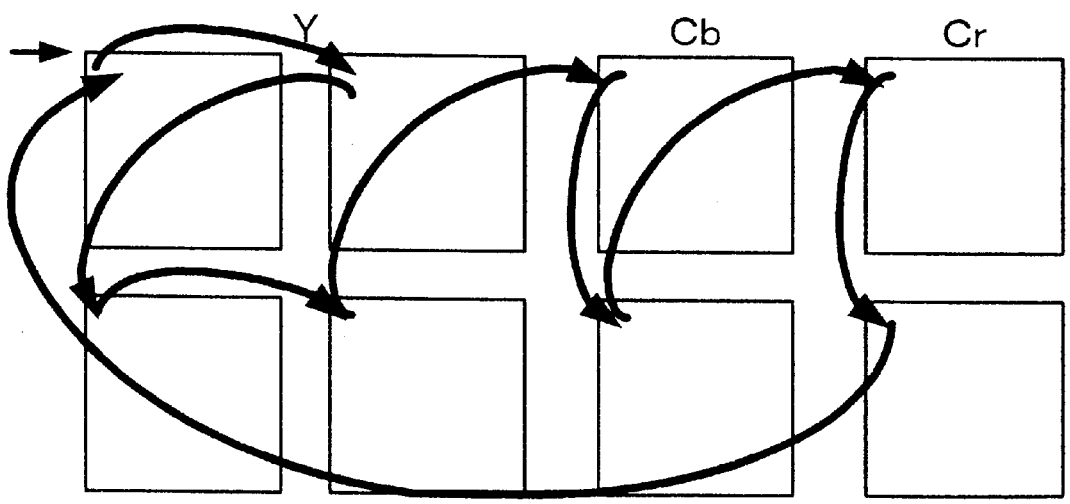

The stream converter 106 interpretes a variable length code of DCT coefficients, detects ends of individual coefficients, and arranges the coefficients corresponding to the individual frequency components of the DCT blocks of the macro block. FIG. 11B shows such a rearranging process. First of all, DC components of eight DCT blocks of the macro block are collected. Next, the lowest frequency AC coefficient components of the eight DCT blocks of the macro block are collected. Thereafter, the next lowest frequency AC coefficient components of the eight DCT blocks of the macro block are collected. In such a manner, coefficient data is rearranged for eight DCT blocks so that AC coefficients corresponding to individual orders are collected.

Rearranged coefficients are $DC(Y_1)$, $DC(Y_2)$, $DC(Y_3)$, $DC(Y_4)$, $DC(Cb_1)$, $DC(Cb_2)$, $DC(Cr_1)$, $DC(Cr_2)$, $AC1(Y_1)$, $AC1(Y_2)$, $AC1(Y_3)$, $AC1(Y_4)$, $AC1(Cb_1)$, $AC1(Cb_2)$, $AC1(Cr_1)$, $AC1(Cr_2)$, ... (where DC, AC1, AC2, ... represent variable length code symbols designated sets of runs and levels that follow) as shown in FIG. 10.

A converted elementary stream of which coefficient data has been rearranged by the stream converter 106 is supplied to the packing and shuffling portion 107. The length of data of a macro block of a converted elementary stream is the same as that of a macro block of a non-converted elementary stream. In the video encoder 102, even if the length of each GOP (one frame) is fixed by a bit-rate controlling operation, the length of each macro block is varied. The packing and shuffling portion 107 packs data of a macro block to a fixed area.

Figure 12A:
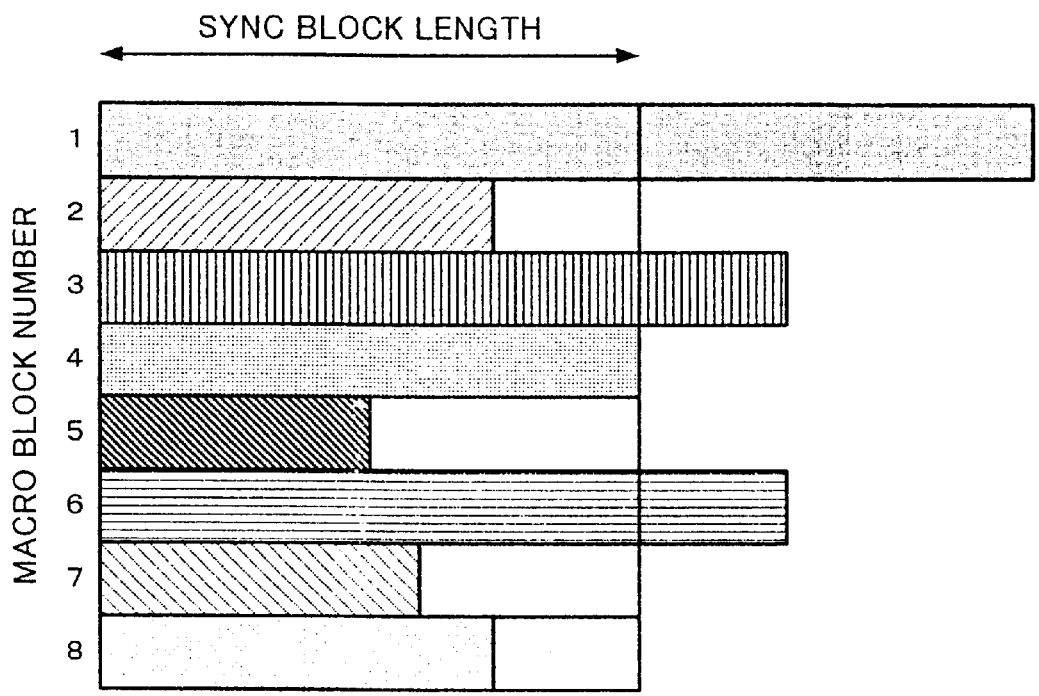
FIGS. 12A and 12B are schematic diagrams for explaining a process for packing the rearranged data to sync blocks.
Figure 12B:
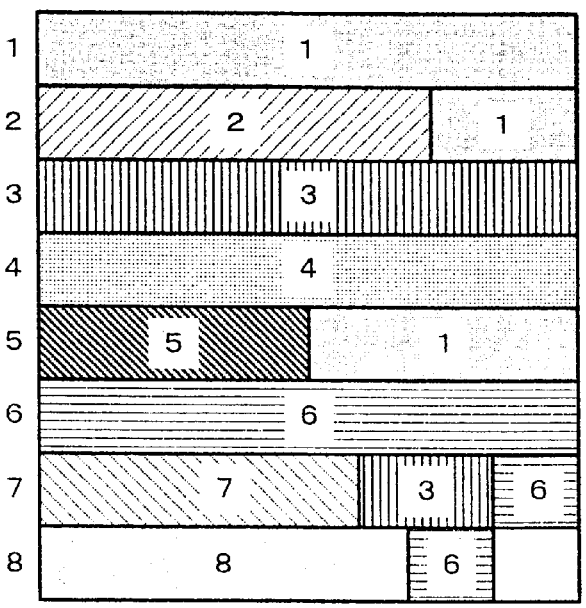

FIGS. 12A and 12B show a packing process for macro blocks performed by the packing and shuffling portion 107. Macro blocks are packed in a fixed area having a predetermined data length. The data length of the fixed area is matched with the length of one sync block that is the minimum unit of data that is recorded and reproduced. Thus, the shuffling process and the error correction code encoding process can be simplified. In FIGS. 12A and 12B, it is assumed that one frame contains eight macro blocks.

As shown in FIG. 12A, in the variable length code encoding process, the lengths of the individual macro blocks are different from each other. In this example, the length of each of data of macro block #1, data of macro block #3, data of macro block #6 is larger than the length of one sync block as the fixed area. On the other hand, the length of each of data of macro block #2, data of macro block #5, data of macro block #7, and data of macro block #8 is smaller than the length of one sync block. The length of data of macro block #4 is almost equal to the length of data of one sync block.

In the packing process, each macro block is packed in the fixed area with the length of one sync block. This is because the data amount generated in one frame period is controlled to a fixed amount. As shown in FIG. 12B, a macro block longer than one sync block is divided at the position corresponding to the length of one sync block. The overflow portion of the macro block against the length of one sync block is packed to the rear blank portions of the other macro blocks each of which is shorter than the length of one macro block.

In the example shown in FIG. 12B, the overflow portion of macro block #1 against the length of one sync block is packed to the rear blank portion of macro block #2. When the length of macro block #2 and the overflow portion of macro block #1 exceeds the length of one sync block, the remaining overflow portion of macro block #1 is packed to the rear blank portion of macro block #5. Next, the overflow portion of macro block #3 is packed to the rear blank portion of macro block #7. In addition, the overflow portion of macro block #6 is packed to the rear blank portion of macro block #7. The further overflow portion of macro block #6 is packed to the rear blank portion of macro block #8. In such a manner, the individual macro blocks are packed to the fixed area with the length of one sync block.

The stream converter 106 can predetermine the length of each macro block. Thus, the packing portion 107 can detect the last end of data of each macro block without need to decode VLC data and check the contents thereof.

Figure 13:
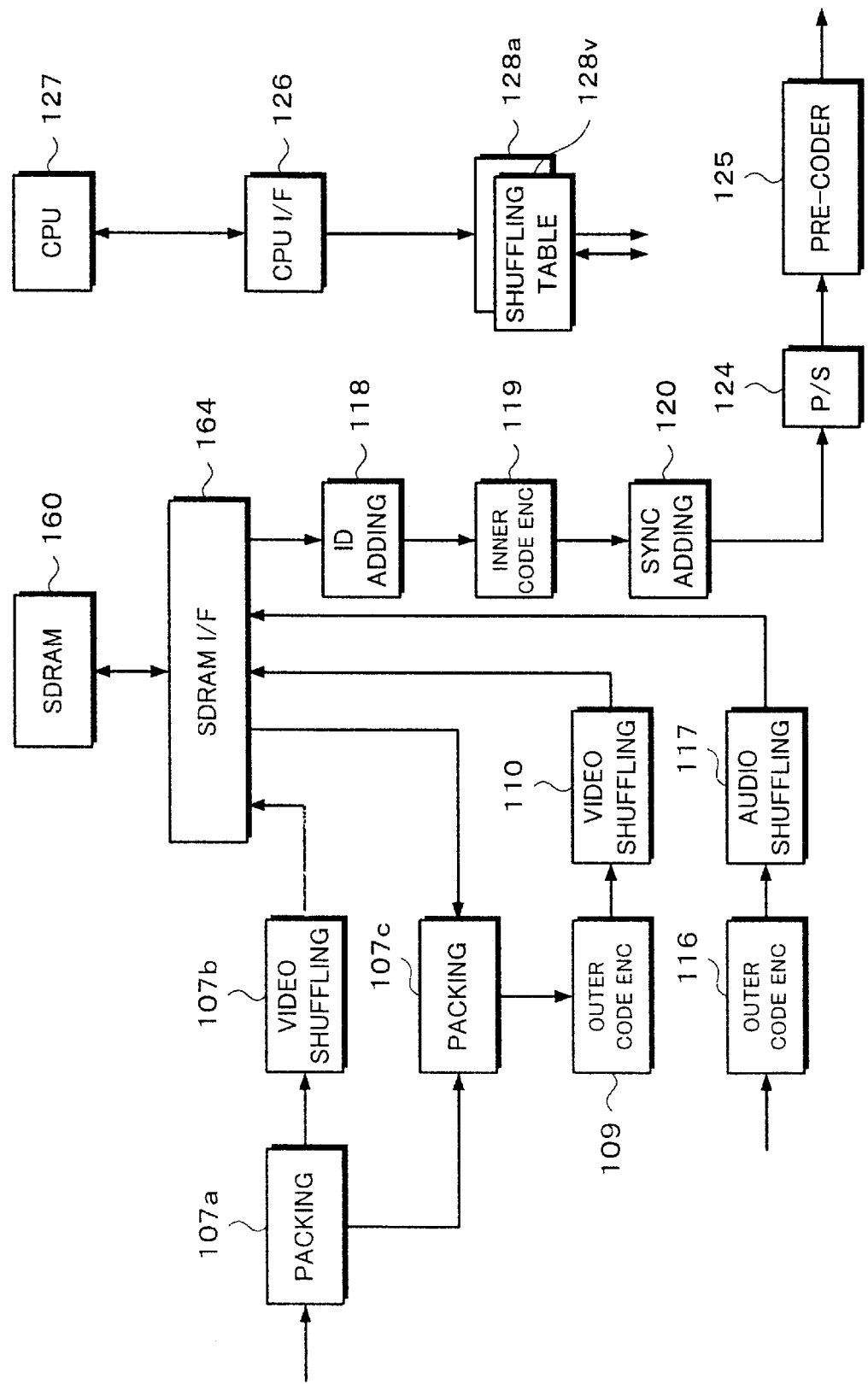
FIG. 13 is a block diagram showing a more practical structure of a record signal processing portion.

FIG. 13 shows a more practical example of the structure of the recording side according to the embodiment of the present invention. In FIG. 13, reference numeral 164 is an interface with an external main memory 160. The main memory 160 is composed of an SDRAM. The interface 164 coordinates a request issued from the recording side against the main memory 160 and performs a writing process and a reading process against the main memory 160. A packing and shuffling portion 107 is composed of a packing portion 107a, a video shuffling portion 107b, and a packing portion 107c.

Figure 14:
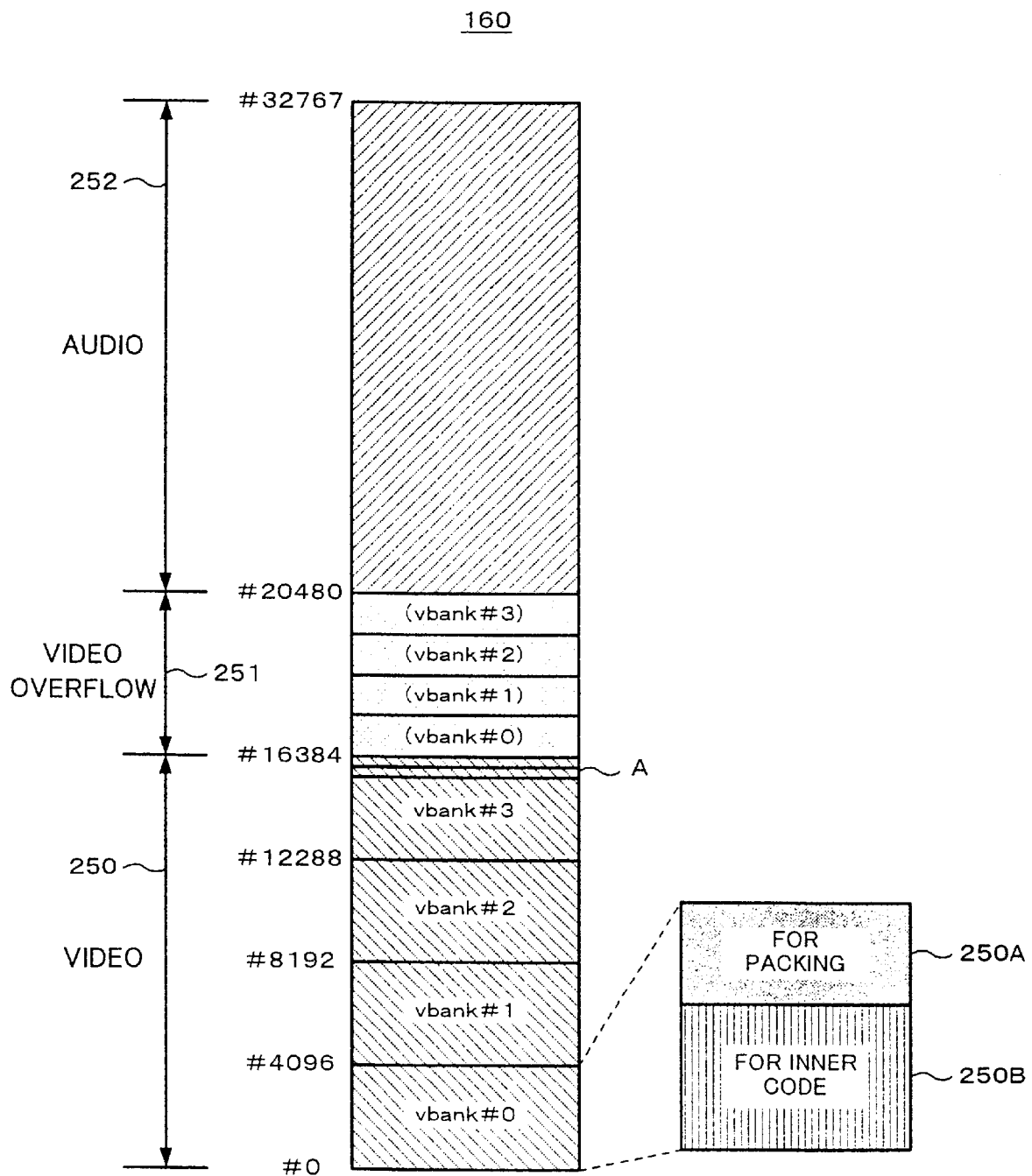
FIG. 14 is a schematic diagram showing a memory space of a memory for use in the embodiment of the present invention.

FIG. 14 shows an example of the address structure of the main memory 160. The main memory 160 is composed of an SDRAM having a storage capacity of for example 64 Mbits. The main memory 160 has a video area 250, an overflow area 251, and an audio area 252. The video area 250 is composed of four banks (vbank #0, vbank #1, vbank #2, and vbank #3). Each of four banks can store one equal-length unit of a digital video signal. One equal-length unit is a unit of which the amount of generated data is controlled to a near target value. One equal-length unit is for example one picture (I picture) of a video signal. In FIG. 14, portion A represents a data portion of one sync block of a video signal. Data amount placed in one sync block depends on the format for use. To handle a plurality of formats, the data size of one sync block exceeds the maximum size of bytes of the formats. Thus, as the data size of one sync block, the number of bytes suitable for the process is selected (for example, 256 bytes).

Each bank of the video area is divided into a packing area 250A and an output area 250B for an inner code encoder. The overflow area 251 is composed of four banks corresponding to the video area. The main memory 160 has an area 252 for processing audio data.

According to the embodiment of the present invention, with reference to the data length mark LT of each macro block, the packing portion 107a stores fixed length data and overflow data that exceeds the fixed length data to respective areas of the main memory 160. The fixed length data is data whose data length is smaller than the data area of one sync block. Hereinafter, the fixed length data is referred to as block length data. Block length data is stored in the packing processing area 250A of each bank. When the data length of a macro block is smaller than the block length, a blank takes place in the relevant area of the main memory 160. The video shuffling portion 107b controls write addresses of the main memory 160 so as to perform a shuffling process. The video shuffling portion 107b shuffles only block length data. The video shuffling portion 107b does not shuffle the overflow portion, but writes it to an allocated area of the main memory 160.

The packing portion 107c packs and reads the overflow portion to the memory for the outer code encoder 109. In other words, block length data is read from the main memory 160 to a memory of one ECC block for the outer code encoder 109. If the block length data has a blank portion, the overflow portion is packed to the blank portion. When data of one ECC block is read, the reading process is temporarily stopped. At this point, the outer code encoder 109 generates an outer code parity. The outer code parity is stored in the memory of the outer code encoder 109. When the outer code encoder 109 has processed one ECC block, the outer code encoder 109 rearranges data and outer code parity in the order for the inner code encoding process and then writes the resultant data to the output area 250B that is different from the packing processing area 250A. The video shuffling portion 110 controls addresses of the main memory 160 so as to shuffle data that has been encoded with outer code for each sync block.

The process for separating data into block length data and overflow data and writing the block length data to the first area 250A of the main memory 160 (first packing process), the process for packing and writing the overflow data to the memory for the outer code encoder 109 (second packing process), and the process for generating outer code parity and writing data and outer code parity to the second area 250B of the main memory 160 are performed for each ECC block. When the outer code encoder 109 has a memory having a size of one ECC block, the access frequency of the accessing operation to the main memory can be reduced.

After the process for a predetermined number of ECC blocks contained in one picture (for example, 32 ECC blocks) is completed (namely, the packing process and outer code encoding process for one picture are completed), data that is read from the area 250B of the main memory 160 is supplied to an ID adding portion 118, an inner code encoder 119, and a synchronization adding portion 120 through the interface 164. The ID adding portion 118, the inner code encoder 119, and the synchronization adding portion 120 perform respective processes. Output data of the synchronization adding portion 120 is supplied to a parallel-serial converting portion 124. The parallel-serial converting portion 124 converts the output data of the synchronization adding portion 120 into bit serial data. The bit serial data is supplied to a partial response class 4 pre-coder 125. Output data of the pre-coder 125 is digitally modulated when necessary. The output data of the pre-coder 125 is supplied to a rotating head through a recording amplifier 121.

A sync block that does not have effective data (this sync block is referred to as null sync) may be placed in an ECC block so that it has flexibility against the type of the format of a record video signal. The null sync is generated by the packing portion 107 a of the packing and shuffling block 107 and written to the main memory 160. Thus, since a null sync has a data record area, it can be used as a sync to which the overflow portion is recorded.

In the case of audio data, even numbered samples and odd numbered samples of audio data of one field compose different ECC blocks. Since an outer code sequence of an ECC block is composed of audio samples in the input order, whenever an audio sample of the outer code sequence is input, the outer code encoder 116 generates an outer code parity. The shuffling portion 117 controls addresses of the area 252 of the main memory 160 so as to shuffle output data of the outer code encoder 116 (for each channel or each sync block).

In addition, a CPU interface 126 is disposed. The CPU interface 126 receives data from an external CPU 127 that functions as a system controller and sets parameters to the inner blocks. To handle a plurality of formats, the CPU interface 126 can set many parameters such as sync block length and parity length.

As one of the parameters, "packing length data" is sent to the packing portions 107a and 107b. The packing portions 107a and 107b pack VLC data to respective fixed portions (with the length represented by "sync block length" shown in FIG. 12) corresponding to the "packing length data".

As one of the parameters, "pack amount data" is sent to the packing portion 107b. The packing portion 107b determines the amount of data to be packed per sync block corresponding to the "pack amount data" and supplies data for the determined "pack amount data" to the outer code encoder 109.

As one of the parameters, "video outer code parity number data" is sent to the outer code encoder 109. The outer code encoder 109 encodes video data with parities corresponding to the "video outer code parity data".

As one of the parameters, "audio outer code parity number data" is sent to the outer code encoder 109. The outer code encoder 109 encodes audio data with parities corresponding to the "audio outer code parity number data".

As ones of the parameters, "ID information" (each type of information shown in FIG. 19A) and "DID information" (each type of information shown in FIGS. 19B and 19C) are sent to the ID adding portion 118. The ID adding portion 118 adds the ID information and the DID information to each data sequence with the unit length read from the main memory 160.

As ones of the parameters, "video inner code parity number data" and "audio inner code parity number data" are sent to the inner code encoder 119. The inner code encoder 119 encodes video data and audio data with parities corresponding to the "video inner code parity number data" and the "audio inner code parity number data", respectively. As one of the parameters, "sync length data" is also sent to the inner code encoder 119. The unit length (sync length) of data that has been encoded with an inner code is limited corresponding to the "sync length data".

As one of the parameters, "shuffling table data" is stored in a video shuffling table (RAM) 128v and an audio shuffling table (RAM) 128a. The shuffling table 128v converts addresses for the video shuffling portions 107b and 110. The shuffling table 128 a converts addresses for the audio shuffling portion 117.

As described above, the stream converter 106 generates video data (video data) of which the same frequency components of coefficient data (a variable length code) of macro blocks have been combined (sorted). By issuing a read request to the SDTI receiving portion 105, the stream converter 106 reads a stream from the buffer of the SDTI receiving portion 105. Alternatively, the packing and shuffling portion 107 may issue such a read request.

The stream converter 106 also generates non-video data such as header information. The non-video data are headers defined in the MPEG syntax (they are a PES header, a sequence header, a GOP header, and a picture header) and ancillary data contained as user data of a picture header (the ancillary data is for example a closed caption, a teletext, VITC, etc). The non-video data is variable length data whose data amount varies corresponding to the picture format, the data amount of user data, and so forth. In addition, it is difficult to estimate the maximum length of non-video data per frame. In the case of a video elementary stream, it is also difficult to estimate the maximum length of the data per macro block. The MPEG syntax permits that the data amount per macro block exceeds that of original data. For example, all macro blocks of one frame may contain user data whose amount is larger than that of video data.

According to the embodiment of the present invention, since non-video data and video data are treated in the same manner, the stream converter 106 also supplies non-video data to the packing and shuffling portion 107. The packing and shuffling portion 107 packs non-video data along with video data. As with video data of one macro block, one fixed portion is assigned to non-video data. At the beginning of the fixed portion, a length mark is added. Thus, when the amount of generated data for one edit unit (for example, one frame period) is controlled, video data and non-video data are packed to fixed portions whose number is larger by 1 than the number of all macro blocks of one frame. According to the embodiment of the present invention, one GOP is composed of one I picture; one slice is composed of one macro block; and video data starts with slice 1. Thus, for convenience, non-video data is referred to as slice 0. Each slice of video data is referred to as slice X.

Extension and user data ( ) contains a video index (coded information placed in a particular line in a vertical blanking interval), video ancillary data, a closed caption, a teletext, VITC (a time code recorded in a vertical blanking interval), LTC (a time code recorded in the longitudinal direction of the tape), and so forth.

According to the above-described embodiment, video data and audio data can be recorded in various formats (multi-format). Next, functions of the multi-format according to the embodiment will be described. FIG. 15 shows a table of the functions of the multi-format. In FIG. 15, an "edit freq" represents a data edit unit (for example, a frame frequency). The value of the "edit freq" field is proportional to the frequency (for example, 23.976 Hz, 25 Hz, 29.9 Hz, 50 Hz, and 59.9 Hz). The frame period of the progressing scanning system is the same as the frame period of the interlace scanning system. The frame and field of the interlace scanning system are denoted by "Frame" and "Field", respectively. The frame of the progressive scanning system is denoted by "Pframe". In FIG. 15, video data is categorized corresponding to the number of lines, scanning system (interlace/progressive), and video rate.

The table shown in FIG. 15 has an "audio" field that represents the number of bits per sample (16 bits/24 bits) and the number of channels. In addition, the table has a "track" field, a "head" field, and an "ECC" field. The "track" field represents the number of tracks per data edit unit. The "head" field represents the number of rotating heads for use. The "ECC" field represents the mode (SD1 to SD4 or HL1 to HL4). The SD mode represents a mode in a standard level of the resolution. The HL mode represents a mode in a high level of the resolution. In the table, "*" represents data that is not compressed corresponding to for example MPEG standard or the like. As is clear from FIG. 15, the present invention can handle a variety of formats as combinations of SD/HL, compression/non-compression, and interlace/progressive scanning system. In the following description, mainly the SD mode will be considered.

FIGS. 16A, 16B, 16C, and 16D show ECC formats of video data. FIG. 16A shows the SD1 format. FIG. 16B shows the SD2 mode. FIG. 16C shows the SD3 format. FIG. 16D shows the SD4 mode. These figures show one ECC block each. In FIGS. 16A, 16B, 16C, and 16D, VLC data is received from the packing and shuffling portion 107. A sync pattern, an ID, and a DID are added to each line of the VLC data. An inner code parity is added to the VLC data. As a result, one sync block is formed. In other words, an outer code parity of a predetermined number of bytes is generated with a predetermined number of symbols (bytes) arranged in the vertical direction of the array of the VLC data. An inner code parity is generated with a predetermined number of bytes of an ID, an DID, and VLC data (or an outer code parity) in the horizontal direction of the outer code parity.

In the SD1 mode (shown in FIG. 16A), the sync block length varies corresponding to the frame frequency. For example, when the frame frequency is 29.97 Hz, the sync block length is 171. When the frame frequency is 25 Hz, the sync block length is 151. When the frame frequency is 23.976 Hz, the sync block length is 163. Likewise, the number of outer code parities and the number of inner code parities can be varied. In the SD2 mode (shown in FIG. 16B), likewise, the sync block length varies corresponding to the frame frequency. When the frame frequency is 29.97 Hz, the sync block length is 164. When the frame frequency is 25 Hz, the sync block length is 168. When the frame frequency is 23.976 Hz, the sync block length is 172. The number of outer code parities and the number of inner code parities can be varied. In the SD3 mode (shown in FIG. 16C), the sync block length varies corresponding to the frame frequency. When the frame frequency is 59.94 Hz, the sync block length is 165. When the frame frequency is 50 Hz, the sync block length is 139. Likewise, the number of outer code parities and the number of inner code parities can be varied. In the SD4 mode (shown in FIG. 16D), the sync block length varies corresponding to the frame frequency. When the frame frequency is 59.94 Hz, the sync block length is 145. When the frame frequency is 50 Hz, the sync block length is 126. Likewise, the number of outer code parities and the number of inner code parities can be varied. As a real error correction code, Reed Solomon code is used.

In the SD mode, the number of inner code parities can be selected from 10, 12, and 14. The number of video outer code parities can be selected from 10, 12, 13, 14, 16, 18, and 20. The number of audio outer code parities can be selected from 10 and 12.

FIGS. 17A, 17B, 17C, and 17D show examples of structures of ECC blocks of audio data. The sampling frequency of audio data is 48 kHz. One sample is composed of 16 bits or 24 bits. In the examples shown in FIGS. 17A, 17B, 17C, and 17D, one sample is composed of 16 bits. FIGS. 17A, 17B, 17C, and 17D show the number of bytes of the data unit of the error correction code encoding process. Two ECC blocks are composed of audio data for one field per channel. One ECC block contains even numbered audio samples or odd numbered audio samples and audio AUX.

Figure 17A:
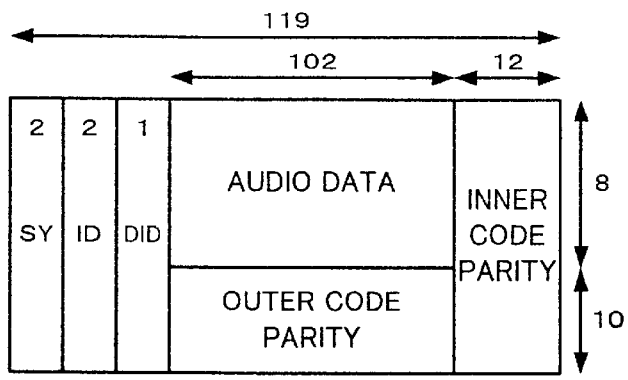
FIGS. 17A, 17B, 17C, and 17D are schematic diagrams showing a plurality of types of ECC blocks of audio data.
Figure 17B:
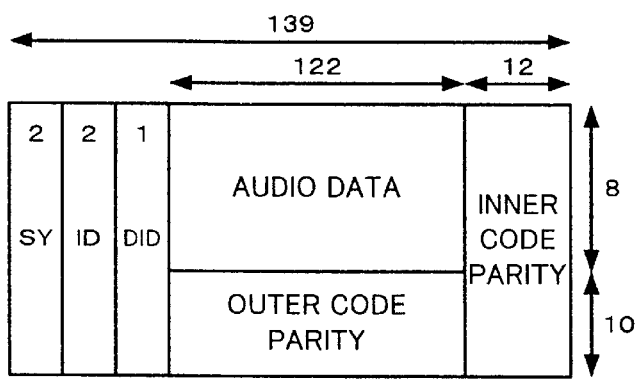
Figure 17C:
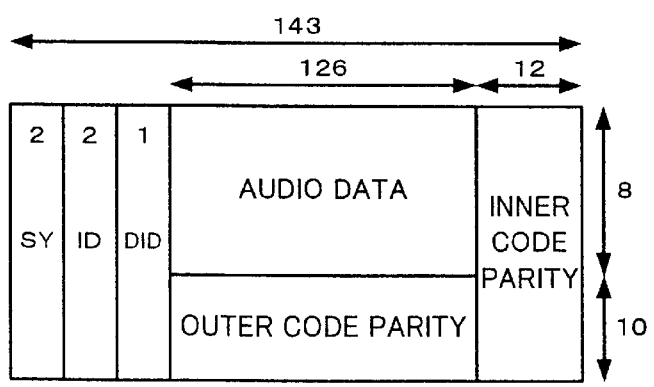
Figure 17D:
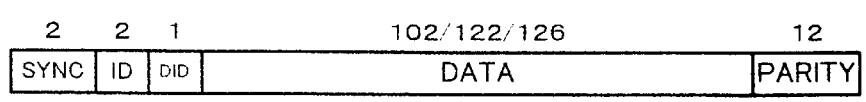

FIG. 17A shows the structure of an ECC block in the case that the interlace frame frequency is 29.97 Hz or the progressive frame frequency is 59.94 Hz. FIG. 17B shows the structure of an ECC block in the case that the interlace frame frequency is 25 Hz or the progressive frame frequency is 50 Hz. FIG. 17C shows the structure of an ECC block in the case that the progressive frame frequency is 23.976 Hz. A synchronous pattern, an ID, and a DID are added to one line of the ECC code. As a result, an audio sync block shown in FIG. 17D is formed. The audio data packet lengths (102, 122, and 125 that vary corresponding to the frame frequencies) are different from the above-described video data packet lengths.

FIGS. 18A and 18B show the arrangements of samples of audio ECC blocks. In FIGS. 18A and 18B, although an inner code parity is omitted, 10 bytes (PV0 to PV9) of an outer code parity are shown. FIG. 18A shows an ECC block composed of even numbered samples of audio data for one field. FIG. 18B shows an ECC block composed of odd numbered samples of audio data for one field. As shown in FIGS. 18A and 18B, the number of samples in one field varies corresponding to the frame frequency. As is clear from FIGS. 17A, 17B, 17C, 17D, 18A, and 18B, the number of outer code parities (=10) and the number of inner code parities (=12) do not vary corresponding to the frame frequency.

Next, the format of audio data will be described in detail. In this example, the audio data is non-compressed data. One sample is composed of 16 bits. The sampling frequency is 48 kHz. The AUX data is composed of 12 bytes per field. Next, the structures of ECC blocks at individual frame frequencies will be described.

[59.94 Hz]: 48 k/59.94 Hz×16 bits/8=1602 bytes+Aux data of 12 bytes→1614 bytes: 2 ECC blocks 102×8×2=1632 bytes

[50 Hz]: 48 k/50 Hz×16 bits/8=1920 bytes+Aux data of 12 bytes→1932 bytes: 2 ECC blocks 122×8×2=1952 bytes

[29.97 Hz]: [59.94 Hz]×2→3228 bytes: 4 ECC blocks

102×8×4=3264 bytes

[25 Hz]: [50 Hz]×2→3864 bytes: 4 ECC blocks

102×8×4=3904 bytes

Figures 19A, 19B, 19C, 19D, 19E:
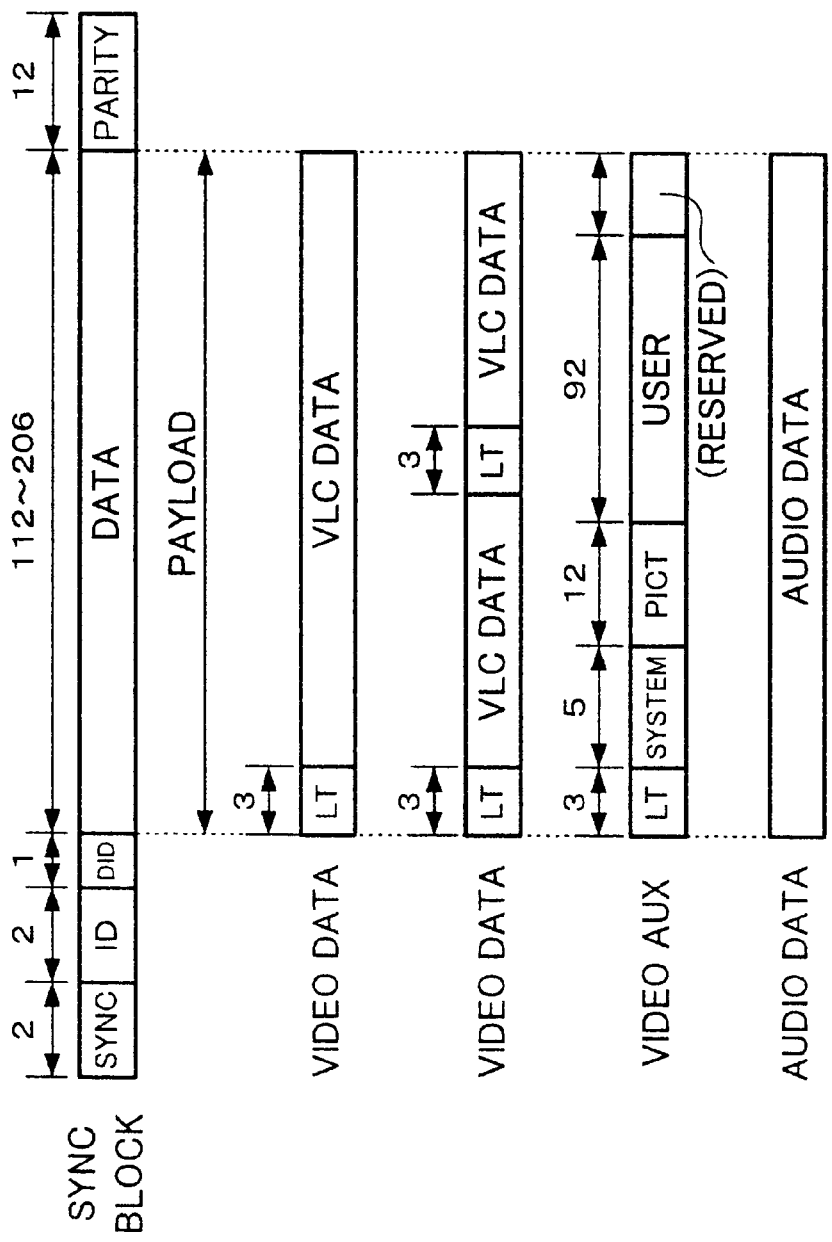
FIGS. 19A, 19B, 19C, 19D, and 19E are schematic diagrams showing a plurality of examples of structures of sync blocks.

[23.976 Hz]: 48 k/23.976 Hz×16 bits/8=4004 bytes+Aux data of 12 bytes×2→4028 bytes: 4 ECC blocks 126×8×4=4032 bytes Next, with reference to FIGS. 19A, 19B, 19C, 19D, and 19E, the structures of sync blocks will be described. According to the embodiment of the present invention, one sync block corresponding to the format of video data that is recorded contains data of one or two macro blocks (VLC data). The size of one sync block depends on the format of a video signal that is used. As shown in FIG. 19A, one sync block is composed of a sync pattern of two bytes, an ID of two bytes, a DID of one byte, a data area in the range from 112 bytes to 206 bytes, and a parity (that is a inner code parity) of 12 bytes that are successively arranged. The data area is also referred to as payload.

The sync pattern of two bytes is used to detect a synchronization. The sync pattern has a predetermined bit pattern. By detecting a sync pattern corresponding to a predetermined pattern, a synchronization is detected.

FIG. 20A shows examples of bit assignments of ID0 and ID1. ID1 contains important information unique to the current sync block. The data size of each of ID0 and ID1 is one byte. ID0 contains identification information (that is a sync ID) for identifying a sync block in one track. The sync ID is a serial number of a sync block of the sector. The sync ID is composed of eight bits. A sync block of video data and a sync block of audio data are designated different sync IDs.

ID1 contains track information against the current sync block. When the MSB side and the LSB side are bit 7 and bit 0, respectively, bit 7 represents whether the current sync block is present on the upper side or the lower side of the track. Bits 5 to 2 represent a segment on the track. Bit 1 represents a track number corresponding to the track azimuth. Bit 0 represents whether the current sync block is video data or audio data.

FIG. 20B shows an example of the bit assignment of the DID in the case that the data area of the current sync block is video data. The DID contains information of the payload of the current sync block. The contents of the DID depend on the value of bit 0 of the ID1. When bit 1 of the ID1 represents video data, bits 7 to 4 of the DID are reserved. Bits 3 and 2 of the DIC represent the mode of the payload. The mode is for example the type of the payload. Bits 3 and 2 of the DID represent auxiliary information. Bit 1 of the DID represents whether the payload stores one or two macro blocks. Bit 0 of the DID represents whether or not video data stored in the payload is an outer code parity.

FIG. 20C shows an example of the bit assignment of the DID in the case that the data area of the current sync block is audio data. Bits 7 to 4 of the DID are reserved. Bit 3 of the DID represents whether data stored in the payload of the current sync block is audio data or conventional data. When the payload stores compression-encoded audio data, bit 3 of the DID represents data. Bits 2 to 0 of the DID stores information of NTSC five-field sequence. In other words, in the NTSC standard, when the sampling frequency is 48 kHz, one field of a video signal is equal to 800 samples or 801 samples of an audio signal. This sequence is completed every five fields. Bits 2 to 0 of the DID represents the position of the sequence.

FIGS. 19B to 19E show examples of the payload. In FIGS. 19B and 19C, the payload stores video data of one or two macro blocks (as variable length data), respectively. In FIG. 19B, the payload stores one macro block. In this case, the first three bytes of the payload contains data length mark LT that represents the length of the macro block that follows. The data length mark LT may or may not contain the length thereof. In FIG. 19C, the payload stores two macro blocks. In this case, the data length mark LT of the first macro block, the first macro block, the data length mark LT of the second macro block, and the second macro block are successively disposed. The data length mark LT is required to depack a macro block.

FIG. 19D shows the case that the payload stores video AUX (auxiliary) data. In FIG. 19D, at the beginning of the payload, data length mark LT is disposed. The data length mark LT represents the length of video AUX data. The data length mark LT is followed by system information of five bytes, PICT information of 12 bytes, and user information of 92 bytes. The remaining area of the payload is reserved.

FIG. 19E shows the case that the payload stores audio data. Audio data can be packed in all the length of the payload. The audio signal is for example a PCM signal that is not compressed. Alternatively, the audio signal may be compression-encoded corresponding to a particular method. The data length mark LT is not placed for audio data.

According to the embodiment, the length of the payload that is a data storage area of each sync block is optimized depending on whether the sync block is a video sync block or an audio sync block. Thus, the length of the payload of each video sync block is not equal to that of each audio sync block. In addition, the length of each video sync block and the length of each audio sync block are optimally set corresponding to the signal format for use. Thus, a plurality of different signal formats can be integrally handled.

According to the embodiment of the present invention, signals are recorded on a magnetic tape by helical scan method. In the helical scan method, inclined tracks are formed by magnetic heads disposed on a rotating head. A plurality of heads are disposed at opposite positions on the rotating drum. In the case that a magnetic tape is wound to the rotating head with a winding angle of around 180°, when the rotating head is turned by 180°, a plurality of tracks can be formed at a time. Two magnetic heads with different azimuths are disposed as one set on the rotating drum so that adjacent tracks have different azimuths.

Figure 23:
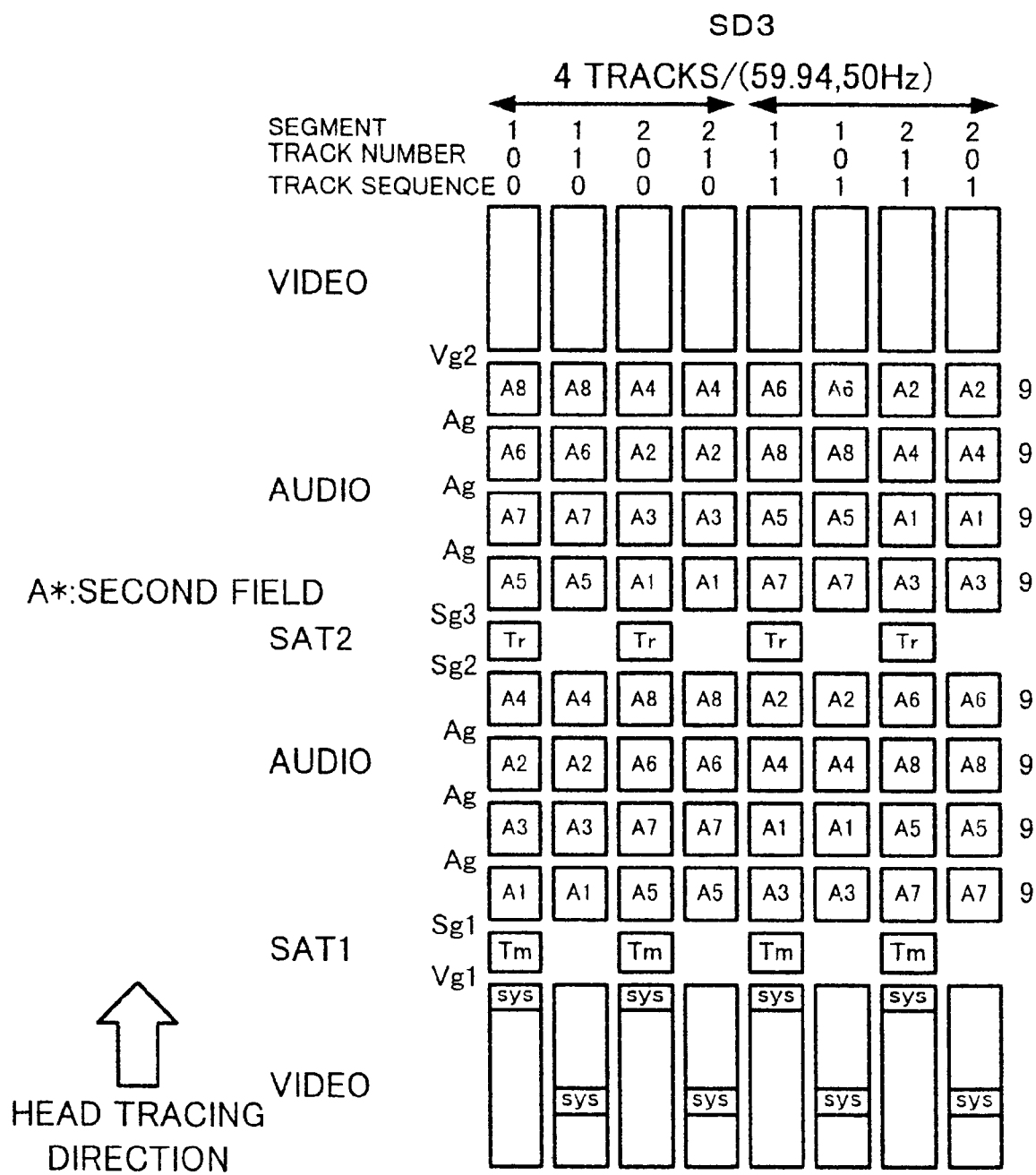
FIG. 23 is a schematic diagram showing a third tape format.
Figure 24:
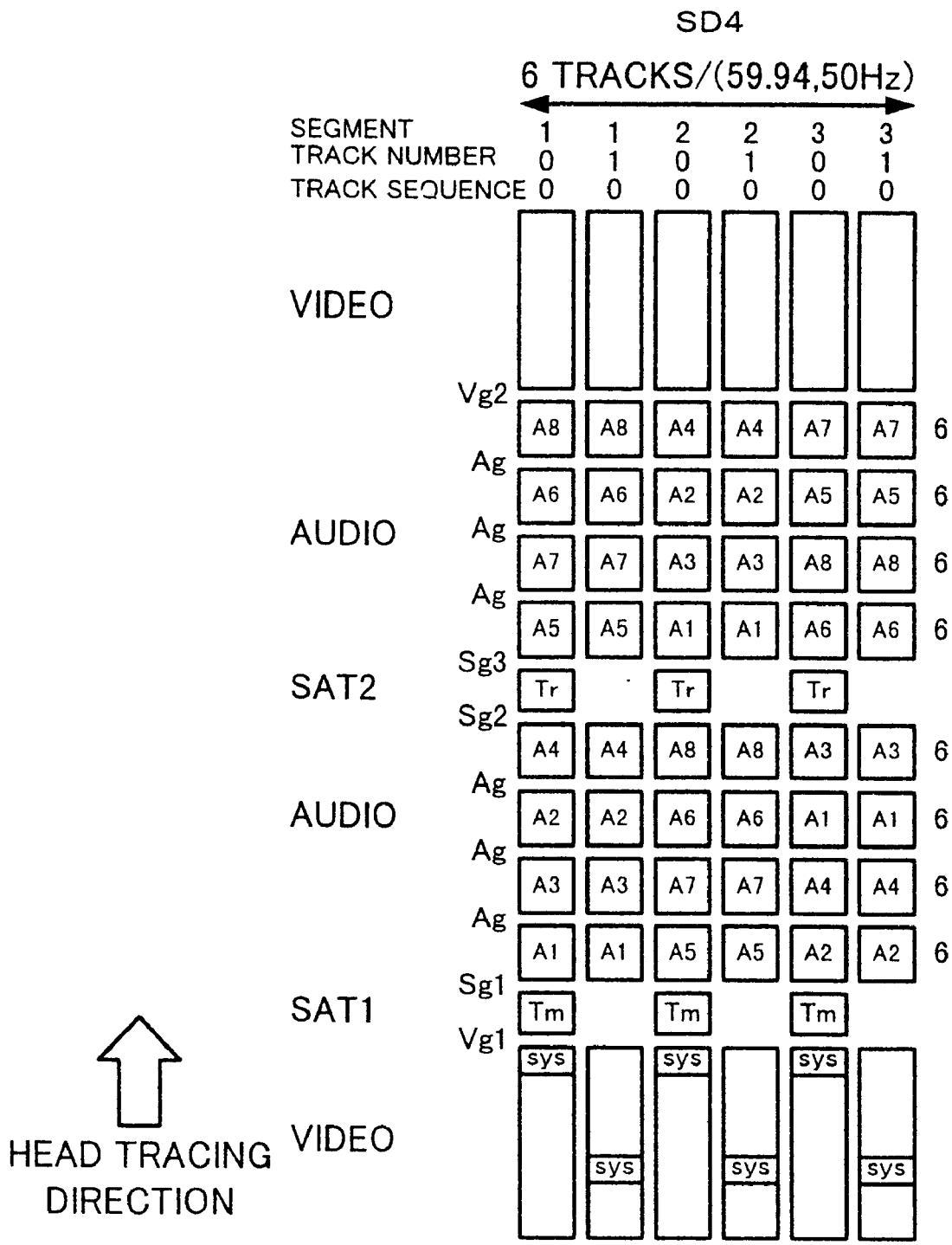
FIG. 24 is a schematic diagram showing a fourth tape format.
Figure 25:
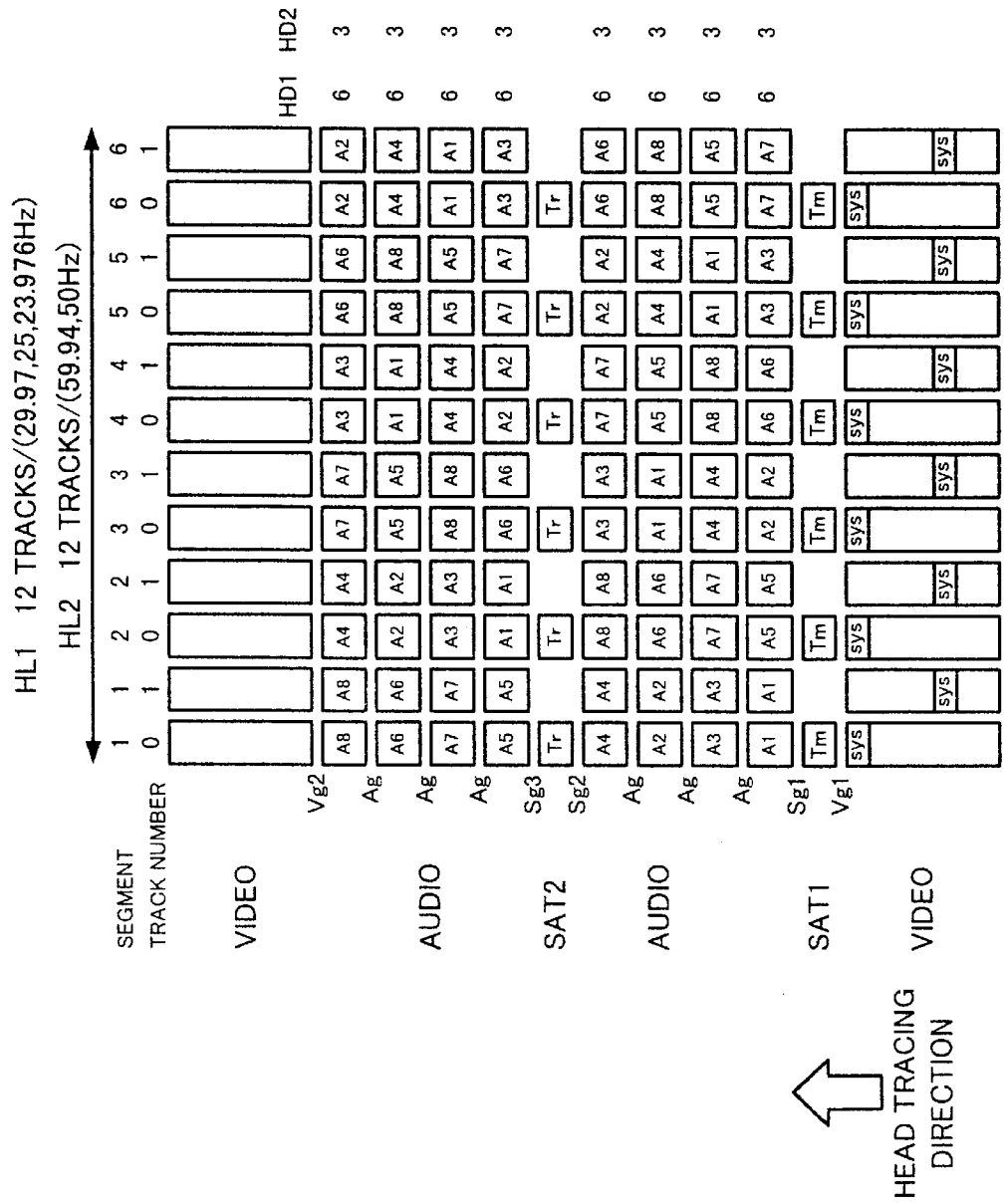
FIG. 25 is a schematic diagram showing a fifth tape format.
Figure 26:
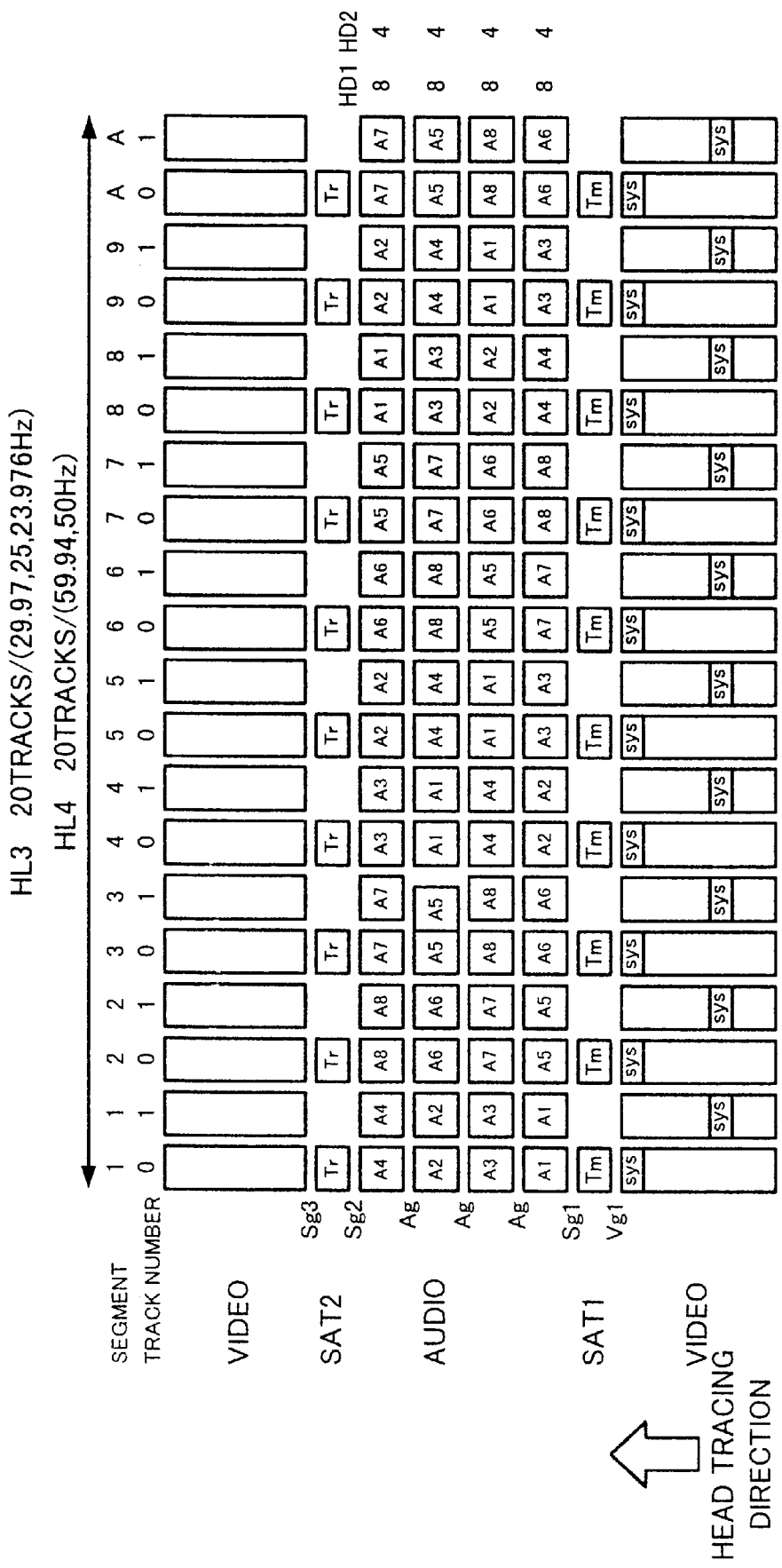
FIG. 26 is a schematic diagram showing a sixth tape format.

FIGS. 21 to 24 show track formats in the SD mode. FIGS. 25 and 26 shows track formats in the HL mode. In the SD mode, two video sectors, eight audio sectors, and two SATs are formed on one track. In these drawings, SAT1 (Tr) and SAT2 (Tm) represent areas in which servo lock signals are recorded. Gaps (Vg1, Sg1, Ag, Sg2, Sg3, and Vg2) having predetermined sizes are formed between adjacent record areas.

Figure 21:
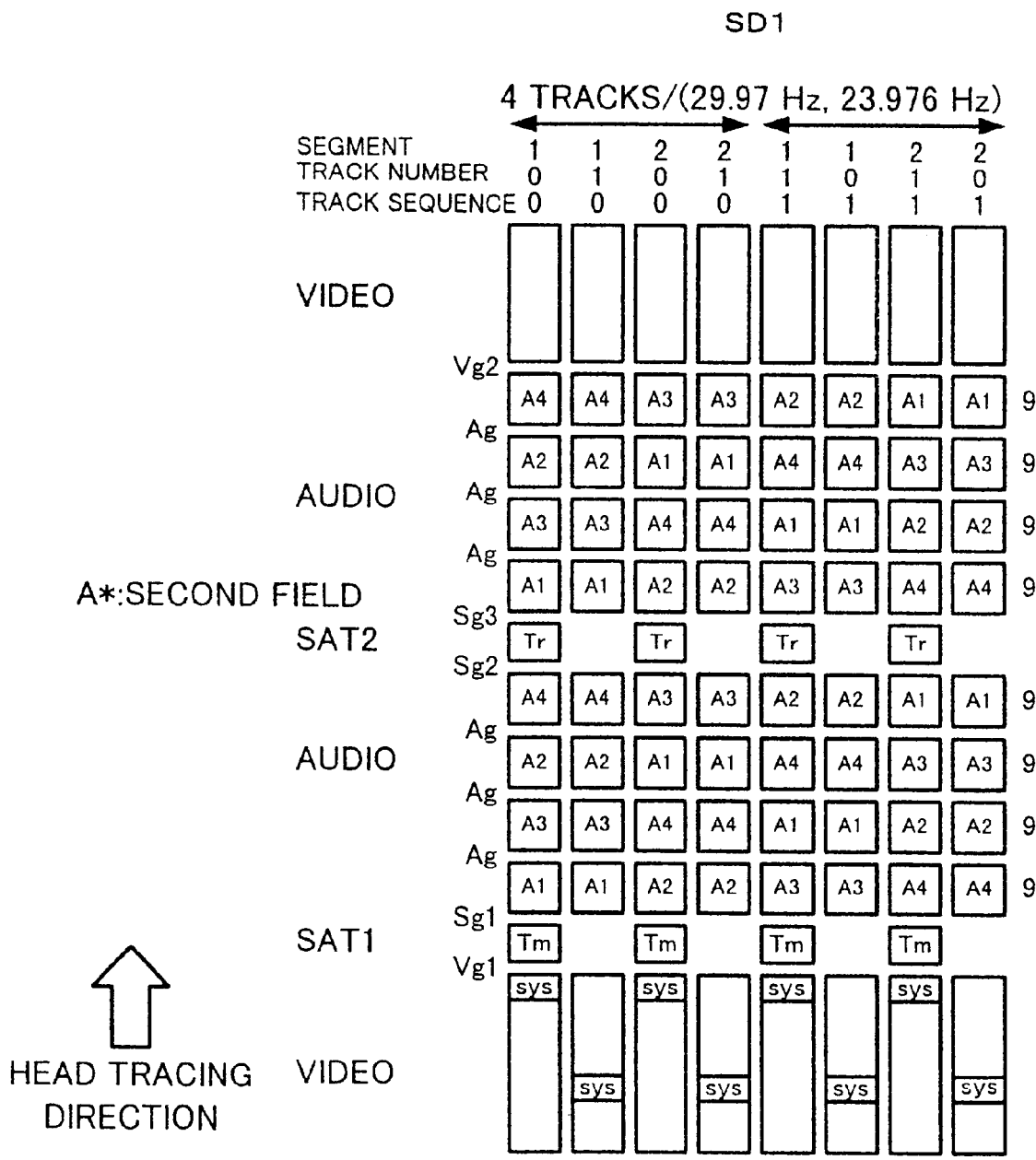
FIG. 21 is a schematic diagram showing a first tape format.
Figure 22:
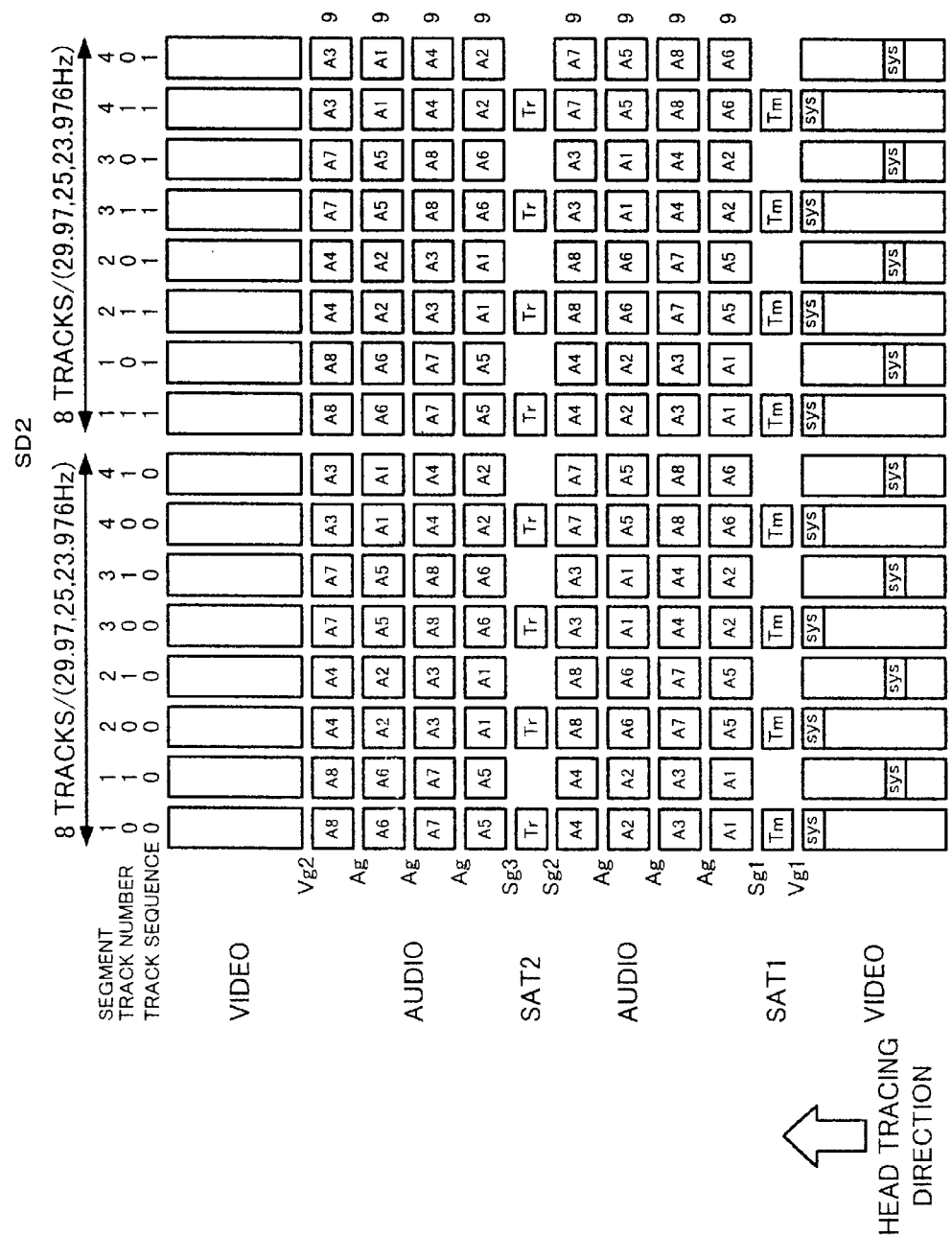
FIG. 22 is a schematic diagram showing a second tape format.

FIG. 21 shows the track format in the SD1 mode. FIGS. 22, 23, and 24 show the track formats in the SD2 mode, the SD3 mode, and the SD4 mode, respectively. In the SD1 mode, the number of audio channels is four. In the other modes, the number of audio channels is eight. As shown in FIG. 15, in the SD1 mode, video data and audio data per frame are recorded on four tracks. In the SD2 mode, video data and audio data per frame are recorded on eight tracks. In the SD3 mode, video data and audio data per frame (progressive frame) are recorded on four tracks. In the SD4 mode, video data and audio data per frame (progressive frame) are recorded on six tracks.

In the SD2 mode, an interlace signal (480$i$ signal) and an audio signal are recorded. The 480$i$ signal is a signal of which the frame frequency is 29.97 Hz, the data rate is 50 Mbps, the number of effective lines is 480, and the number of effective horizontal pixels is 720. In the SD2 mode, an interlace signal (576$i$) signal and an audio signal are recorded. The 576$i$ signal is a signal of which the frame frequency is 25 Hz, the data rate is 50 M bps, the number of effective lines is 576, and the number of effective horizontal pixels is 720.

One segment is formed of two tracks with different azimuths. In other words, in the SD2 mode (see FIG. 22), eight tracks are composed of four segments. A pair of tracks that form a segment are designated track number [0] and track number [1] corresponding to azimuths. In the example shown in FIG. 22, the track numbers of the first eight tracks are different from those of the second eight tracks. A unique track sequence is assigned to each frame. Thus, even if one of paired magnetic heads cannot read a signal due to clogging or the like, data of the preceding frame can be used. Thus, the influence of the error can be minimized.

In each of these track formats, video sectors are formed on both edge sides in the longitudinal direction of each track. An audio sector for audio data is formed between the video sectors. In the SD2 mode, audio data of eight channels can be handled. A1 to A8 represent sectors of audio data of channels 1 to 8, respectively. The positions of audio data of individual channels are varied segment by segment. In audio data, audio samples (800 samples or 801 samples in the case that the sampling frequency is 48 kHz) generated in one field period are separated into even-numbered samples and odd-numbered samples. These sample groups and AUX data compose one error correction block as a product code.

In the SD2 mode, data for one field is recorded on four tracks. Thus, two error correction blocks per channel of audio data are recorded on four tracks. Data of the two error correction blocks (including an outer code parity) are divided into four sectors. As shown in FIG. 22, the divided data is dispersedly recorded on the four tracks. A plurality of sync blocks contained in the two error correction blocks are shuffled. For example, four sectors with for example reference number Al form two error correction blocks of channel 1.

In this example, data of four error correction blocks per tack is shuffled (interleaved) and recorded to an upper side sector and a lower side sector. A system area (sys) is formed at a predetermined position of each lower side video sector. The SD4 mode is a format of six tracks per frame. In this example, the track sequence is only [0].

FIG. 25 shows the track format in the HL1 mode and the HL2 mode. In the HL1 mode, video data and audio data per frame are recorded on 12 tracks. In the HL2 mode, video data and audio data per progressive frame are recorded on 12 tracks. FIG. 26 shows the track format in the HL3 mode and the HL4 mode. In the HL3 mode, video data and audio data per frame are recorded on 20 tracks. In the HL4 mode, video data and audio data per progressive frame are recorded on 20 tracks.

According to the present invention, as described above, to deal with the multi-format, the video data packet length and the audio data packet length are not the same, but optimally designated. The audio data packet length is designated corresponding to only the frame frequency. As shown in FIGS. 18A and 18B, the arrangement of audio samples of an ECC block does not vary corresponding to the frame frequency. Only the data packet length varies corresponding to the frame frequency. The sync block length of audio data is designated regardless of the sync block length of video data. In addition, since the relation between an ECC block and audio samples is fixed, the encoder and the decoder can use a common signal processing circuit to handle various formats having different video rates. Thus, the circuit scale can be remarkably reduced.

In addition, as shown in FIG. 19C, VLC data packets for two macro blocks can be placed in one sync block. Thus, when video data at a low data rate is recorded or reproduced, the data redundancy can be suppressed from becoming high.

Next, video data will be described. According to the embodiment, MPEG2 standard is used as the video data compressing system. A macro block is a set of 8×8 DCT blocks. "Sync number" represents the number of sync blocks in which relevant data is placed. In the following description, these symbols are used.

Fq: 59.94/50/29.97/25/23.976 Hz

Video MB: Number of video macro blocks

[625/50] 720×608→1710 macro blocks

[525/60] 720×512→1440 macro blocks

Ecc nb: Number of ECC blocks interleaved in one track

SYS SYNCnb: Number of SYNCs (system syncs) in which
   system data per data edit unit is placed packet length: Data packet length Tr nb: Number of tracks per data edit unit VLC SYNCnb: Number of SYNCs placed in VLC packets per data edit unit VSYNCnb: Number of total sync blocks of video data per data edit unit Heade SYNCnb: Number of sync blocks in which user data is placed Null SYNCnb: Number of null syncs (other than VLC syncs, header syncs, and system syncs)

In the MPEG2 compressing method, unless at least macro blocks are arranged, they cannot be decoded as video data. In the shuttle reproducing mode, data is updated with each sync block. Thus, to improve the update ratio of a picture, data of a macro block should be placed in the same sync block as the relavant macro block information. To do that, DCT coefficients are rearranged. A block containing macro block information and components that have been arranged in the order of importance is referred to as VLC packet. When one VLC packet is updated, a DC component and frequency components of a picture contained in the packet are updated. In addition, as described above, the packing process is performed for the VLC packet. Null syncs are used to pack data that is not placed in sync blocks. The data rate of video data is controlled so that the total amount of video data is packed. By adding a synchronous pattern, a block ID, and an error correction parity to the packet, one sync block is formed.

Assuming that Header SYNCnb=1, Ecc nb=4, and SYS SYNCnb=Tr nb, when the following condition is satisfied $$\text{VLC SYNCnb=Video MB} \quad (3)$$

the number of syncs Vd of one ECC block is given by the following formula:

$$Vd=(int) \; (\text{VLC SYNCnb+SYS SYNCnb+Header SYNCnb})/\text{Ecc nb/Tr nb+1}) \quad (4)$$

The total number of null syncs per data edit unit is given by the following formula:

$$\text{VSYNBnb=Vd} \times \text{Ecc nb} \times \text{Tr nb} \quad (5)$$

The number of null syncs is given by the following formula:

$$\text{Null SYNCnb=VSYNCnb-VLC SYNCnb-SYS SYNCnb-Header SYNCnb} \quad (6)$$

The number of null syncs is selected so that the number of sync blocks becomes proper corresponding to the number of tracks and the structure of the ECC block. On the other hand, the average bit rate of video data is given by the following formula:

$$\text{Avr bit rate=(VLC SYNCnb+Null SYNCnb+Header SYNCnb)} \times \text{Fq} \times 8 \text{ bits} \times \text{packet length} \quad (7)$$

Formula (7) shows that the average bit rate of video data is proportional to packet length (data packet length). In other words, by adjusting the packet length of video data (namely, the sync block length of video data), a desired bit rate of video data can be obtained. In this example, since the packet length of video data is independent from the packet length of audio data, the bit rate of video data can be adjusted without need to change the signal process of audio data.

Since the average bit rate of video data is proportional to the data packet length, when the bit rate is decreased, the data packet length should be proportionally decreased. FIGS. 27A, 27B, 27C, and 27D show the relation between a data packet and a sync block. The redundancy is given by sync block length/packet length×100%.

Figure 27A:
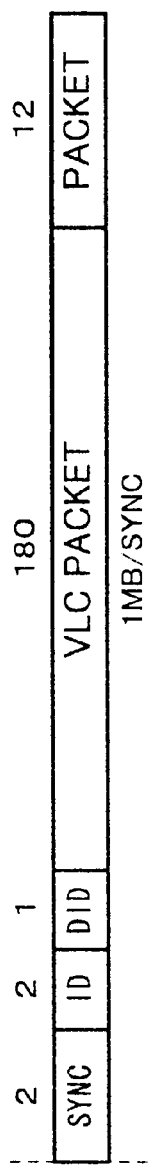
FIGS. 27A, 27B, 27C, and 27D are schematic diagrams for explaining the structures of forming sync blocks.
Figure 27B:
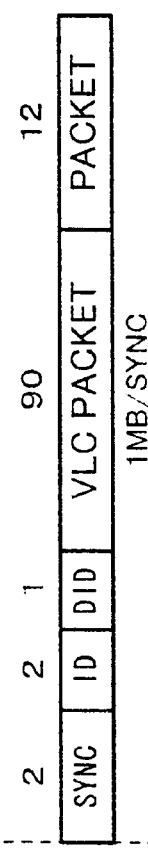
Figure 27C:
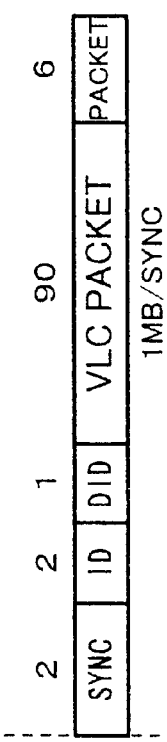

FIG. 27A shows the structure of a sync block in the case that the average bit rate of video data is a normal value. In this example, the data packet length is 180 bytes. The sync block length is 197 bytes. In this case, the redundancy is (197/180)×100=109%. When the average bit rate of the sync block shown in FIG. 27A is halved, a sync block shown in FIG. 27B is formed. Since the lengths of a sync pattern, an ID, and a DID are fixed, the redundancy becomes as large as 118%. To solve such a problem, as shown in FIG. 27C, the number of error correction parities of an inner code can be decreased corresponding to the data packet length.

However, when the number of parities is decreased, the error correction capability is lowered. Data of which the sync pattern of two bytes is removed from the sync block is encoded with an inner code. FIG. 28 shows the error correction capability. In FIG. 28, the horizontal axis and the vertical axis represent the error rate before error correction and the error rate after error correction, respectively. As described above, when the number of parities is halved, the error correction capability denoted by the solid line is lowered as denoted by the dotted line.

Figure 27D:
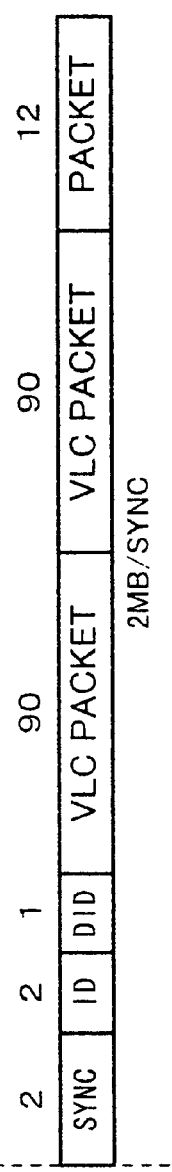

According to the embodiment, to solve such a problem, VPnum (the number of VLC packets per sync block) is defined so as to place a plurality of VLC packets in one sync block. FIG. 27D shows an example of which two VLC packets are placed in one sync block. In this case, the redundancy is 109%. In this embodiment, as described with reference to FIG. 19, the maximum value of VPnum is 2 and data that represents the number of packets per sync block is recorded in the DID. Since a plurality of VLC packets are placed in one sync block, formula (3) can be rewritten as follows:

$$\text{VLC SYNCnb=Video MB/VP num} \quad (8)$$

Since a plurality of VLC packets are placed in one sync block, the redundancy can be lowered. Thus, the record efficiency can be improved.

Figure 29:
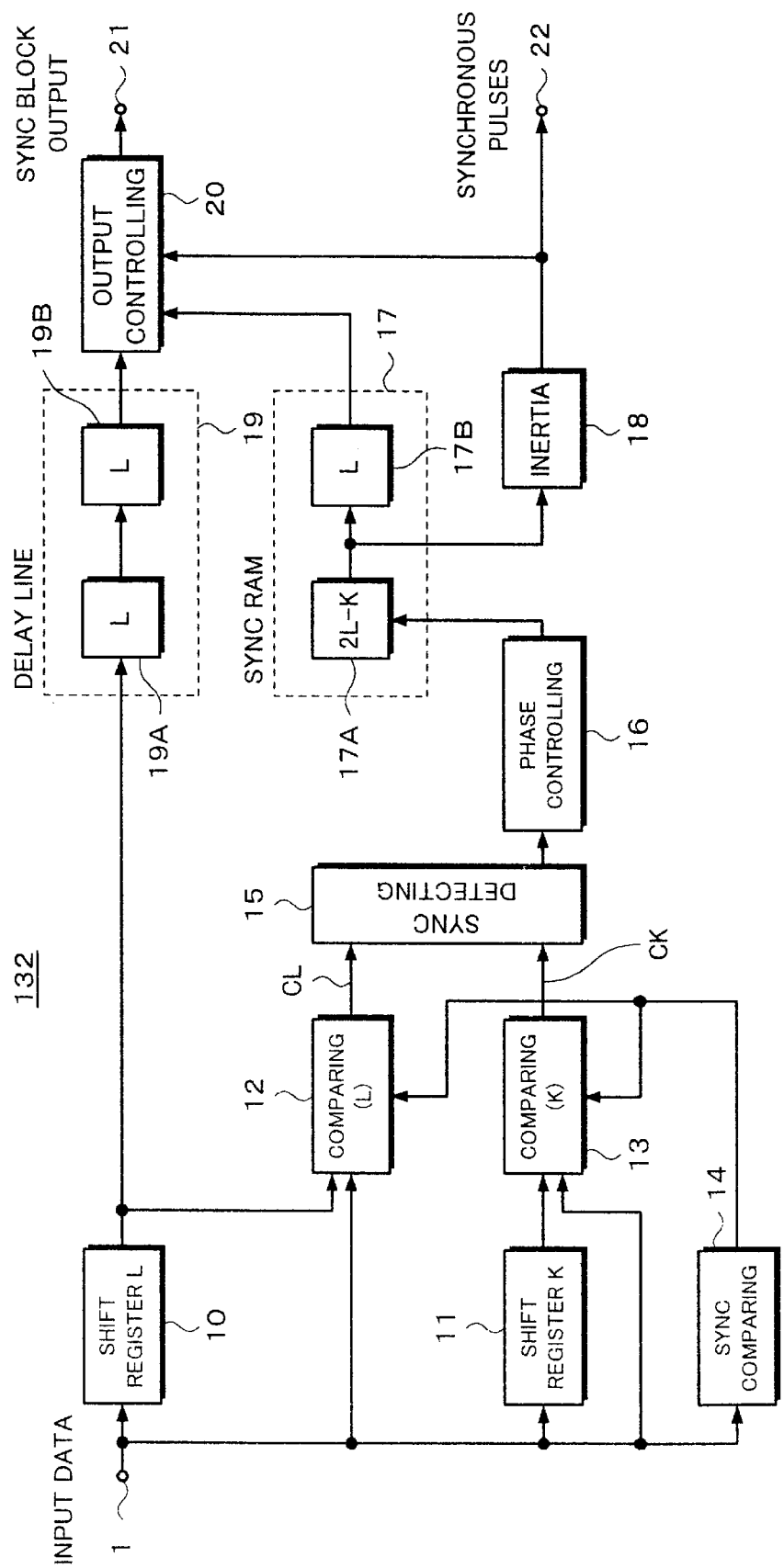
FIG. 29 is a block diagram showing an example of the structure of a synchronization detecting circuit according to the present invention.

Next, the synchronization detecting circuit 132 shown in FIG. 9 will be described in detail. FIG. 29 shows an example of the structure of the synchronization detecting circuit 132 according to the present invention. The synchronization detecting circuit 132 automatically detects sync blocks with different data lengths. The synchronization detecting circuit 132 is one of major features of the present invention.

In the following description, the synchronization detecting circuit 132 detects two types of sync blocks with different data lengths L and K (where L>K and 2K>L). The data lengths L and K are equivalent to L clock periods and K clock periods with a predetermined frequency.

Input data that is a bit serial signal is input to an terminal 1. The input data is supplied to first terminals of a shift register L10, a shift register K11, a comparing (L) circuit 12, and a comparing (K) circuit 13 and an input terminal of a sync comparing circuit 14.

The shift register L10 and the shift register K11 have bit lengths corresponding to the data length L and the data length K, respectively. Output data of the shift register L10 is supplied to a delay line 19 and a second input terminal of the comparing (L) circuit 12. The delay line 19 delays input data for 2L. The comparing (L) circuit 12 corresponds to a synchronous pattern with the length L. Output data of the shift register K11 is supplied to a second input terminal of the comparing (K) circuit 13 that corresponds to a synchronous pattern with the length K. The sync comparing circuit 14 supplies a detected result of a synchronous pattern and bit shift amount information to the comparing (L) circuit 12 and the comparing (K) circuit 13. The bit shift amount information represents the bit match position of the synchronous pattern.

The comparing (L) circuit 12 supplies a detected result and a shift amount as a signal CL to a sync detecting circuit 15. Likewise, the comparing (K) circuit 13 supplies a detected result and a shift amount as a signal CK to the sync detecting circuit 15. The sync detecting circuit 15 detects and holds sync information corresponding to the signal CL or the signal CK. The sync information is supplied to a phase controlling circuit 16. The phase controlling circuit 16 controls the phase of the sync information and writes the resultant data to a RAM 17. The sync information starting at the position equivalent to the length (2L−K) is read from the sync RAM 17. The read sync information is supplied to an inertia circuit 18.

On the other hand, sync information that has been delayed for (3L−K) is supplied from the sync RAM 17 to an output controlling circuit 20. In addition, synchronous pulses generated by the inertia circuit 18 are supplied to the output controlling circuit 20. Corresponding to the supplied sync information and synchronous pulses, the input data is read from the delay line 19. The read data i s supplied as a sync block to an output terminal 21. The synchronous pulses generated by the inertia circuit 18 are also supplied to the output terminal 22.

Next, a process performed by the synchronization detecting circuit 132 will be described in detail. As described above, each sync block contains a synchronous pattern (at the first two bytes), an ID number (IDO) (at the third byte), and additional information (ID1) (at the fourth byte). The additional information represents the data type of the current sync block.

Since each sync block is used for one byte data of which serial data reproduced from a record medium is converted into parallel data at intervals of eight bits. Thus, data of an original sync block is input in a bit-shifted state. FIGS. 30A, 30B, and 30C show the bit-shifted state of input data. As shown in FIG. 30A, input data is treated as eight-bit (one octet) data. As shown in FIG. 30B, the end of each data unit of input data does not always match the end of each data unit of original (record) data. As shown in FIG. 30C, each data unit of input data is shifted by three bits from each data unit of the original data.

The bit shift amount between the input data and the original data is determined based on the predetermined synchronous pattern. In this example, it is assumed that the bit shift amount of the input data sequence is 0 and the input data sequence synchronizes with the original data sequence. In this example, the input data and data delayed by L clock periods and K clock periods against the input data are referenced. It is determined whether or not the bit-shifted value matches the predetermined synchronous pattern the continuity of ID numbers and the identify of the ID information. When they matche, a synchronous pattern is detected.

Figures 32A, 32B:
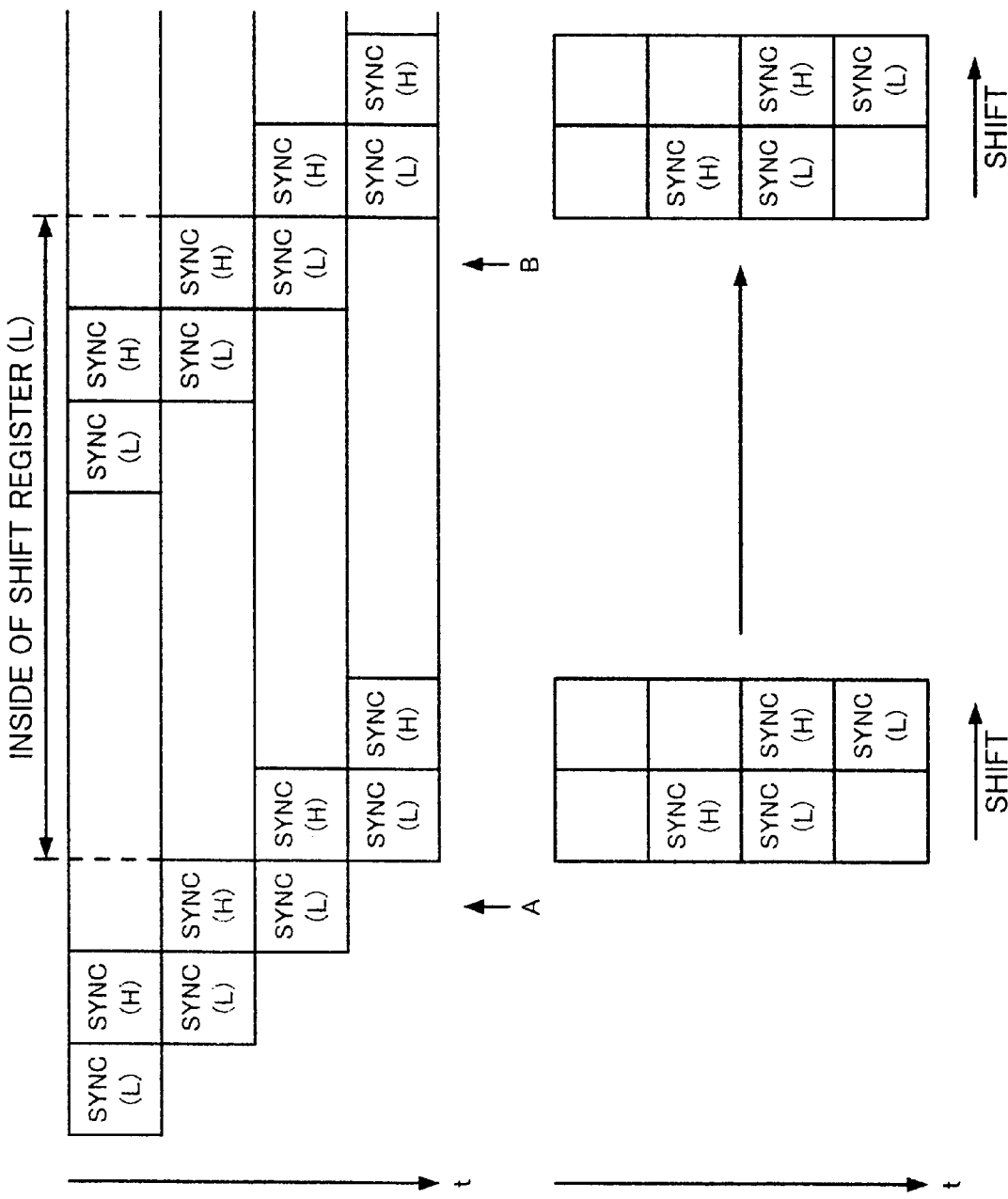
FIGS. 32A and 32B are schematic diagrams for explaining a synchronization detecting process using a shift register.

FIG. 31A shows an example of input data that is received from the input terminal 1. The length of each sync block that has a sync pattern at the beginning is L. The input data is successively supplied to the shift register L 10 and the shift register K 11. The input data is successively stored in the shift register L 10 as shown in FIG. 32A. In FIG. 32A, SYNC (L) and SYNC (H) represent the first eight bits and the second eight bits of a synchronous pattern, respectively.

The input data received from the input terminal 1 is supplied to the first input terminal of the comparing (L) circuit 12. The output data of the shift register L 10 is supplied to the second input terminal of the comparing (L) circuit 12. For example, data supplied to the first input terminal of the comparing (L) circuit 12 is data at position "A" shown in FIG. 32A. Data supplied to the second input terminal of the comparing (L) circuit 12 is data at position "B" shown in FIG. 32A.

Figure 33:
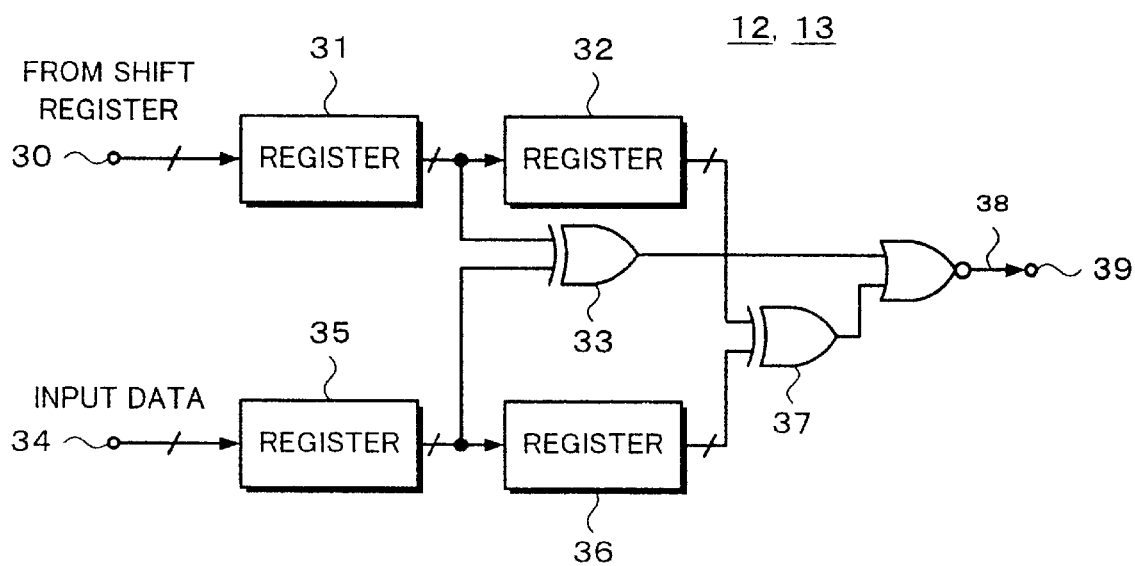
FIG. 33 is a block diagram showing an example of the structure of a comparing circuit (L) and a comparing circuit (K)

FIG. 33 shows an example of the structure of the comparing (L) circuit 12. The structure of the comparing (K) circuit 13 is the same as that of the comparing (L) circuit 12. Data received from the shift register L 10 through a terminal 30 is stored to eight-bit parallel registers 31 and 32. The eight-bit parallel registers 31 and 32 store eight bits each. Likewise, input data received from the input terminal 1 through a terminal 34 is stored to eight-bit parallel registers 35 and 36. The eight-bit parallel registers 35 and 36 store eight bits each. With EXOR circuits 33 and 37 and an NOR circuits 38, it is determined whether or not data stored in the registers 31 and 32 match data stored in the registers 35 and 36 as shown in FIG. 32B. The compared result is supplied from the NOR circuit 38 to an output terminal 39.

Figure 34:
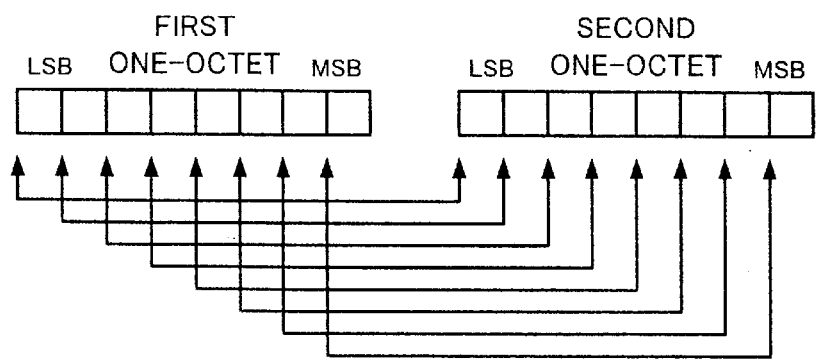
FIG. 34 is a schematic diagram for explaining a synchronous pattern detecting process of a sync comparing circuit.

The sync comparing circuit 14 determines whether or not input data matches a synchronous pattern and supplies the determined result to the comparing (L) circuit 12 and the comparing (K) circuit 13. As shown in FIG. 34, the sync comparing circuit 14 compares latched input data with an eight-bit synchronous pattern at each bit position. When the sync comparing circuit has detected a sync pattern, it supplies the detected result of the synchronous pattern and a bit shift amount that represents the bit match position of the synchronous pattern to the comparing (L) circuit 12 and the comparing (K) circuit 13.

Thus, when synchronous patterns are input at intervals corresponding to the data length L, the comparing (L) circuit 12 can detect a sync pattern at the same bit position as the sync comparing circuit 14. The detected result and the bit shift amount are output as a signal CL. Thus, the positions of individual sync blocks shown in FIG. 31A can be detected.

Since the bit length of the shift resister K 11 is smaller than the number of bytes of each input sync block, the detecting circuit cannot detect synchronous patterns in the state shown in FIG. 32A.

Likewise, when sync blocks whose data length is K each are successively input, since the shift register K 11 and the comparing (K) circuit 13 are in the states shown in FIG. 32A and 32B, a match of a synchronous pattern can be detected. In contrast, since the shift register L 10 and the comparing (L) circuit 13 are not in the states shown in FIGS. 32A and 32B, a match of a synchronous pattern cannot be detected.

Thus, the circuit shown in FIG. 29 can detect a plurality types of sync blocks without need to place data length information contained in input data. Theoretically, with shift registers and comparing circuits corresponding to individual data lengths of sync blocks, the number of data lengths that can be detected at a time can be increased.

Next, a method for generating a synchronous pulse that represents the start position of a sync block that is output will be described. As shown in FIG. 31A, data that is handled by the synchronization detecting circuit 132 is sync blocks that are successively input. However, due to an error that takes place in the recording system and the transmitting system, a part or a particular region of data may be lost. Since the data portion of a sync block (namely, a data packet) is composed of an error correction code, even if a part of data including a synchronous pattern is lost, the error may be corrected. However, to perform the error correcting process, it is necessary to correctly detect the beginning of the error correction code (namely, the start position of a sync block).

When sync blocks with the same length are successively recorded in the same sector, once a synchronous pattern with a particular data length is detected, it is supposed that sync blocks are arranged at intervals corresponding to a data length at the point. Thus, even if a synchronous pattern is not detected, when synchronous pulses that have been detected successively output until a synchronous pattern is detected, data may be reproduced corresponding to the synchronous pulses. For example, as shown in FIG. 31C, sync block pulses can be correctly reproduced corresponding to synchronous pulses with a sync block length.

To do that, once a synchronous pattern is detected, pulses are output at predetermined intervals corresponding to the beginning of output data. This process is performed by a circuit equivalent to the above-described inertia circuit 18.

Figure 35:
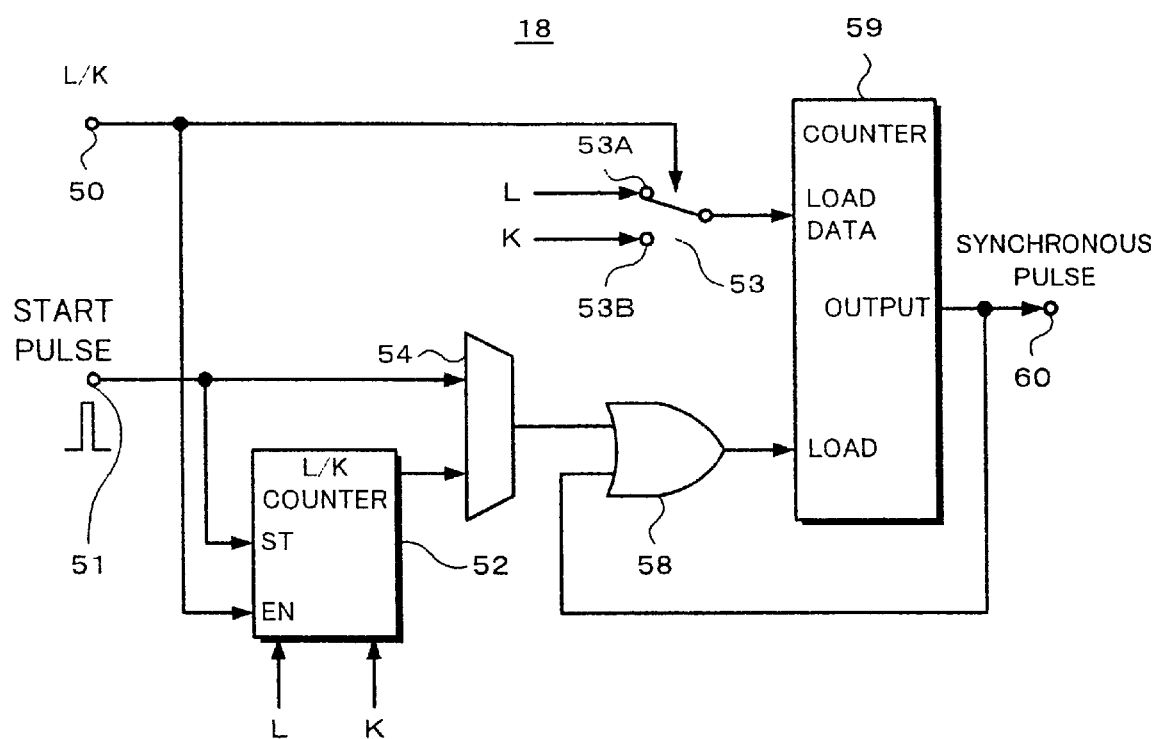
FIG. 35 is a block diagram showing an example of the structure of an inertia circuit according to the present invention.

FIG. 35 shows an example of the structure of the inertia circuit 18. The inertia circuit 18 deals with two types of data lengths L and K. An identification signal L/K that identifies the data length L or K is supplied to a terminal 50. The identification signal L/K represents whether or not a synchronous pattern has been detected by the shift register L 10 or the shift register K 11. In addition, a signal (that is a start pulse) corresponding to the detection of a synchronous pattern is supplied to a terminal 51.

The start pulse is supplied to a start terminal ST of an L/K counter 52. In addition, the start pulse is supplied to a first input terminal of an OR circuit 58 through a switch circuit 54 connected to the terminal 51 as the initial terminal position. Output data of the OR circuit 58 is supplied to a load input terminal of a counter 59 (that will be described later).

The identification signal L/K received from the terminal 50 is supplied to an enable terminal EN of the L/K counter 52. In addition, the identification signal L/K is used as a selection control signal for the switch circuit 53. The switch circuit 53 selects an input terminal 53A or 53B corresponding to the value of the identification signal L/K. Corresponding to the selection of the input terminal 53A or 53B, an initial value corresponding to the data length L or K is supplied and loaded from for example a system controller (not shown) to the load data terminal of the counter 59.

The counter 59 counts down from the loaded initial values corresponding to a predetermined clock signal. When the count value becomes [0], the synchronous pulses corresponding to one clock period are output. The output synchronous pulses are supplied to an output terminal 80. In addition, the output synchronous pulses are supplied to a second input terminal of the OR circuit 58. Thus, an initial value is loaded through the switch circuit 53. Thus, the counter 59 resumes counting down.

The counter 59 starts counting down with a pulse received from the OR circuit 58. In other words, the counter 59 starts counting down with the start pulse received from the terminal 51 or the synchronous pulse received from the counter 59. While the counter 59 is counting down, when a pulse is supplied from the OR circuit 58 to the counter 59, an initial value is loaded from the load data terminal. The counter 59 starts counting down from the initial value. Thus, even if the detected position of a synchronous pattern of input data is varied, since an initial value is loaded while the counter is counting down, synchronous pulses corresponding to input data can be output. The switch circuit 54 selects the terminal 53A or 53B corresponding to the operation of the circuit 18. The switch circuit 54 operates corresponding to an output signal of the L/K counter 52 (that will be described later).

Figure 36:
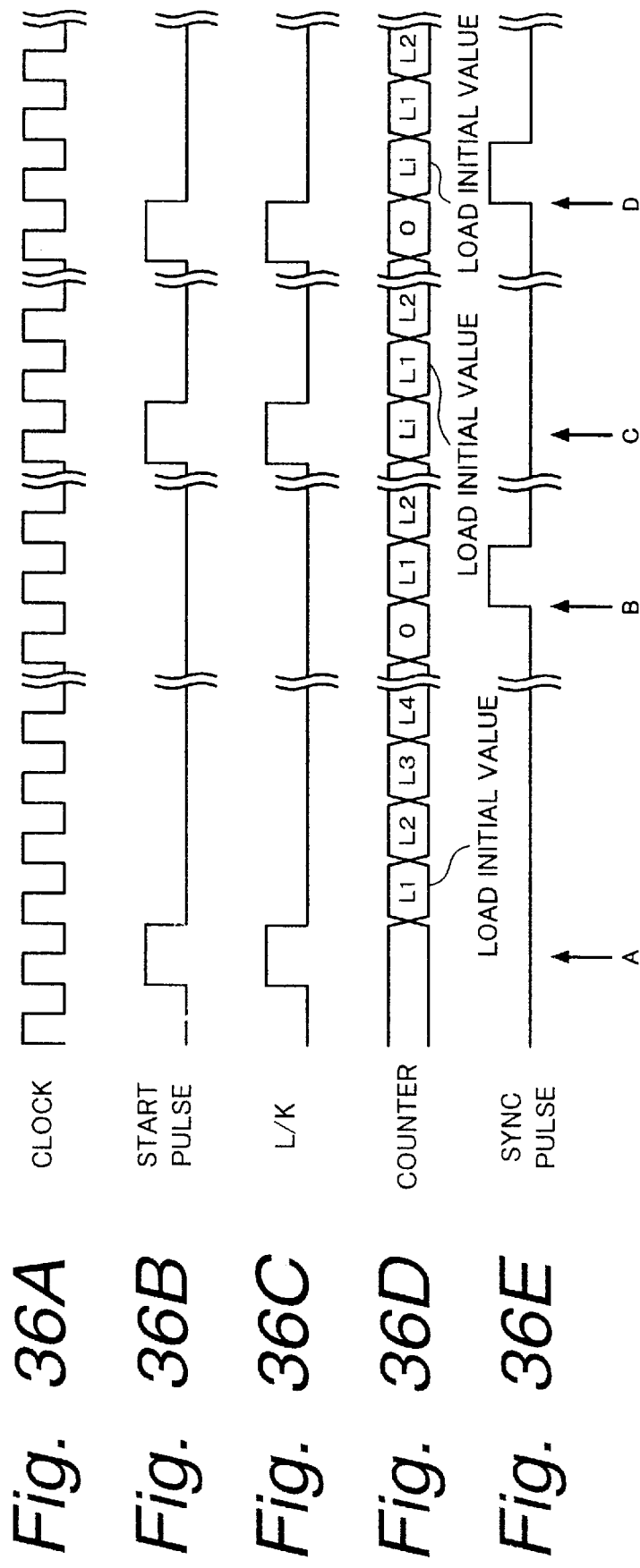
FIGS. 36A, 36B, 36C, 36D, and 36E are timing charts showing an example of operation timings of the inertial circuit.

FIG. 36 shows an example of an operation timing of the inertia circuit 18 in the case that the data length of each sync block is L. The counter 59 counts down corresponding to a clock signal shown in FIG. 36A. At timing A, the start pulse and the identification signal L/K are input (see FIGS. 36B and 36C). At the next clock period, the initial value corresponding to the data length L is input from the load data terminal. The counter 59 starts counting down from the initial value (see FIG. 36D). When the count value becomes [0] (at timing B), even if a start pulse is not input, synchronous pulses are output as shown in FIG. 36E. Thus, once the counter 59 starts, the synchronous pulses are output at predetermined intervals.

In addition, at timing C, when a start pulse is input while the counter 59 is counting down, the initial value is loaded. At timing D, when the count value becomes [0] and the start pulse is input, the initial value is loaded as with the timing B.

Thus, after the start pulse is input and then L clock periods are generated, a synchronous pulse is output. On the other hand, even if the data length is K, the inertia circuit 18 adjusts a delay for (L−K) clock periods as will be described later. Thereafter, the counter 59 starts counting down. Thus, the output data (sync blocks) should be delayed for L clock periods. The output data is delayed with a delay device 19B of the delay line 19 shown in FIG. 29.

Figure 37:
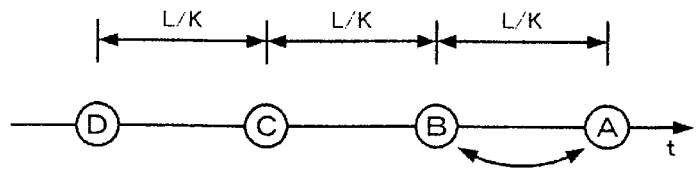
FIG. 37 is a schematic diagram for explaining a method for supplying the detected result of a synchronous pattern to the inertia circuit.

Next, with reference to FIGS. 37 to 39, a method for supplying the detected result of a synchronous pattern to the inertia circuit 18 will be described. Next, with reference to FIG. 38, the case that the data length is L will be described. In FIG. 37, timing A represents the latest timing. Synchronous patterns are input to the input terminal 1 in the order of timings D, C, B, and A. Sync blocks corresponding to synchronous patterns that are input at timings A, B, C, and D are referred to as sync blocks A, B, C, and D, respectively.

Figure 38:
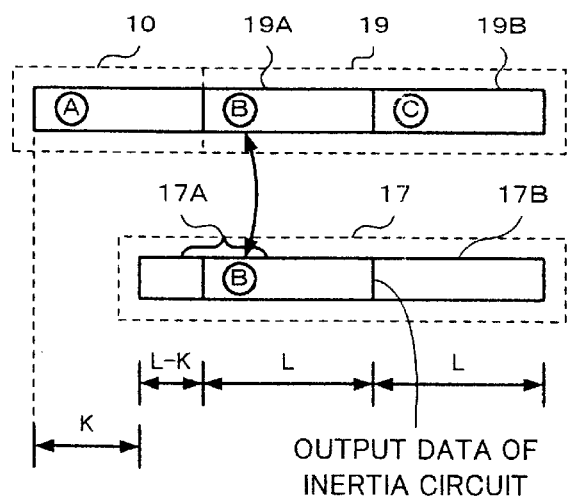
FIG. 38 is a schematic diagram for explaining a method for supplying the detected result of a synchronous pattern to the inertia circuit.

When synchronous patterns are detected at timings A and B, the shift register L 10 and the delay line 19 store data as shown in FIG. 38. In other words, the sync block C is stored in the delay device 19B of the delay line 19. The sync block B is stored in the delay device 19A. On the other hand, the sync block A is stored in the shift register L 10.

The inertia circuit 18 should be operated for the sync block B. The storage position of the sync RAM 17 against the beginning of the sync block B is the position (L−K) of the sync RAM 17. In other words, the position (L−K) is a position traced back from the last output position of the sync RAM 17 by 2L. The sync RAM 17 stores synchronous pattern detection information, sync block length, and bit shift amount for each sync block. From the storage position tracked back from the last output position by L clock periods, the synchronous pattern detection information is output to the inertia circuit 18. The synchronous pattern detection information is for example the identification signal L/K.

Figure 39:
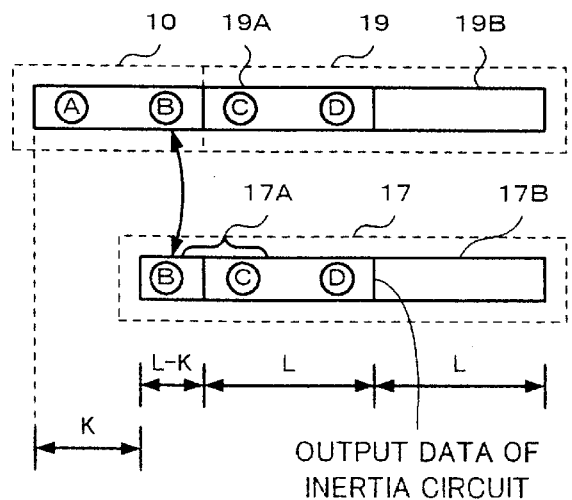
FIG. 39 is a schematic diagram for explaining a method for supplying the detected result of a synchronous pattern to the inertia circuit.

FIG. 39 shows the case of which the data length is K. In this case, the same operation as the case of which the data length is L is performed. When the data length is K, the synchronous pattern detection information for the sync block B is placed at the beginning of the sync RAM 17 (namely, the position traced back from the last output position by (3L−K)). Thus, the timing of the sync block B in the delay line 19 is the same as the timing of the relevant data in the sync RAM 17.

The output position of data supplied from the sync RAM 17 to the inertia circuit 18 is the position traced back from the last output position of the sync RAM 17 by L clock periods regardless of the sync block length is L or K. On the other hand, when the sync block length is K, since the inertia circuit 18 outputs synchronous pulses at intervals of K clock periods, the phase of synchronous pulses deviates from the phase of sync block data of the delay line 19 by (L−K) clock periods.

To solve such a problem, the L/K counter 52 of the inertial circuit 18 is used (see FIG. 35). The L/K counter 52 is a counter that counts the difference between the data length L and the data length K. The L/K counter 52 counts down only when the sync block length is K corresponding to the identification signal L/K supplied from the terminal 50 to the enable terminal EN. The system controller (not shown) supplies the data lengths L and K as initial values to the L/K counter 52. The L/K counter 52 stars counting down with a start pulse received from the start terminal ST through the terminal 51. The L/K counter 52 counts down from (L−K). When the count value of the L/K counter 52 becomes [0], the L/K counter 52 outputs pulses for one clock period.

When the data length of output data supplied to the inertia circuit 18 of the sync RAM 17 is the sync block length K, the switch circuit 54 selects output data of the L/K counter 52. The output pulses of the L/K counter 54 are supplied to the load terminal of the counter 59 through the switch circuit 54 and the OR circuit 58. Thus, the counter 59 reads an initial value from the load data terminal and resumes counting down. Since the L/K counter 52 causes the counter 59 to delay the re-counting operation, the timing of the output of the synchronous pulses of the inertia circuit 18 is matched with the timing of the output data of the delay line 19 and the sync RAM 17.

The phase controlling circuit 16 controls the writing operation against the sync RAM 17. When the comparing (L) circuit 12 or the comparing (K) circuit 13 supplies the detected result of the synchronous pattern to the sync detecting circuit 15, it supplies the detected timing of the synchronous pattern (namely, information that represents the detected result of the comparing (L) circuit 12 or the comparing (K) circuit 13) to the phase controlling circuit 16.

Corresponding to the received information, the phase controlling circuit 18 obtains a write address of the sync RAM 17 and creates write data for the sync RAM 17. As described above, the sync detection flag block length information (L/K) and the bit shift amount are written to the sync RAM 17. The sync detection flag block length information (L/K) and the bit shift amount are generated by the phase controlling circuit 16. As described with reference to FIGS. 38 and 39, when the data length of the sync block B processed by the inertia circuit 18 is K, the sync block B is written from the beginning of the sync RAM 17. When the data length of the sync block B is L, the sync block B is written from the position delayed from the beginning of the sync RAM 17 by (L−K) clock periods.

Before a data sequence is recorded to a record medium, identification information that identifies the data length and a sync block may be stored to data of a sync block. Thus, when data is reproduced, the validity of the data length and the sync block type can be checked. Consequently, a process of application software can be prevented from being improperly performed.

As an application example of the embodiment, the sync block lengths of video data and audio data is pre-designated. Only when an audio/video flag of the ID information (ID1) matches the data length of the detected sync block, it is presumed that a correct synchronous pattern has been detected.

As such identification information, for example, an ID1, a DID, and length information LT of a sync block can be used.

According to the embodiment, the sync detecting circuit 15 performs such a checking process. When the sync detecting circuit 15 determines that a detected sync pattern is improper as the result of the checking process, the sync detecting circuit 15 performs a process as if it has not detected a sync pattern and does not supply such information to the phase controlling circuit 18.

The sync detection information is affected to output data. In other words, the output controlling circuit 20 on the last output stage shifts output data of the delay line 19 by the bit shift amount corresponding to the output data of the inertia circuit 18 and the detected information of the synchronous pattern and thereby restores the-original data byte by byte.

FIG. 40 shows an example of data that is output from the output controlling circuit 20. In this example, the data length L is [6]. All operations are performed corresponding to a clock signal shown in FIG. 40A. Input data received from the input terminal 1 is composed of a sync block A with a data length [6], a data gap with a data length [4], and a sync block C with a data length [6]. In such a manner, a synchronous pattern is detected from the input data. The counter 59 starts counting down from the data length L. When the count value of the counter 59 becomes [0], synchronous pulses are generated and thereby data is output. In the case that the data length is [6], even if a data gap with a data length different from [6] (L>) is input, when a normal sync block C is input, before the count value becomes [0], the counter 59 starts counting down from a value corresponding to the data length L. Thus, sync blocks are normally output.

In the above example, a synchronous pattern is referenced at intervals corresponding to the data lengths L and K. However, the present invention is not limited to such an example. In other words, in the process, synchronous patterns can be referenced at intervals of L, 2L, 3L, . . . , nL, K, 2K, 3K, . . . , or mK.

The present invention can be applied for recorde mediums such as optical tapes (other than magnetic tapes) and optical discs (magneto-optical discs and phase change type discs). In addition, the present invention can be applied for the case that data is transmitted through a transmission path.

According to the present invention, since the sync block length of video data is different from the sync block length of audio data, they can be optimally selected. Thus, with one signal processing circuit, an encoding process and a decoding process for various formats with different bits rates of video data can be performed. Consequently, the circuit scale can be remarkably reduced. As a result, the cost of an IC that processes these signals can be reduced. In addition, since audio data does not depend on video rate and picture frame, the bit rate of video data can be adjusted without need to change the signal process of audio data.

According to the present invention, the number of packets of data placed in one sync block is optimally selected corresponding to the bit rate of video data. Thus, since the redundancy becomes low, the record efficiency can be improved.

According to the present invention, when the phase of each sync block is detected from a digital data sequence composed of sync blocks with different lengths, it is not necessary to input an external signal that causes the block length to be changed. Thus, the system structure of the reproducing apparatus can be simplified.

According to the present invention, data is output corresponding to the difference between the lengths of input sync blocks. Thus, data can be prevented from being lost at a point of which the length of a sync block is changed.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A digital data reproducing apparatus for reproducing data blocks from a record medium, the data blocks having at least two data lengths, the data blocks each having a synchronous pattern for detecting synchronization, comprising:

synchronous pattern detecting means for detecting a synchronous pattern of the synchronous signal from the reproduced data;

first memory means for successively storing the reproduced data as data blocks with a predetermined data length and outputting stored data as data blocks with the predetermined data length in the order of order data blocks, said first memory means having a first data length;

first comparing means for determining whether or not both data that is input to said first memory means and data that is output therefrom match the synchronous pattern corresponding to the detected result of said synchronous pattern detecting means;

second memory means for inputting the reproduced data that is the same as the reproduced data that is input to said first memory means, storing the reproduced data as data blocks with the predetermined data length, and outputting stored data as data blocks with the predetermined data length in the order of older data blocks, said second memory means having a second data length K, the second data length K being smaller than the first data length L, the second data length K not being any integer times the first data length L;

second comparing means for determining whether both data that is input to said second memory means and data that is output therefrom match the synchronous pattern corresponding to the detected result of said synchronous pattern detecting means; and output means for outputting the reproduced data as data blocks with a data length corresponding to said first comparing means or said second comparing means that has detected a match of the synchronous pattern.

2. The digital data reproducing apparatus as set forth in claim 1, wherein the first data length L and the second data length K have the relations of L>K and 2K>L.

3. The digital data reproducing apparatus as set forth in claim 1, further comprising:

delaying means for delaying the reproduced data;

synchronous signal generating means for outputting a synchronous signal at intervals corresponding to the data length of which synchronization has been detected; and output controlling means for outputting data received from said delaying means in synchronization with the synchronous signal generated by said synchronous signal generating means, wherein when said second comparing means detects a match of the synchronous pattern, said synchronous signal generating means delays the synchronous signal by a time period corresponding to the difference between the first data length and the second data length.

4. The digital data reproducing apparatus as set forth in claim 1, wherein identification information corresponding to the first data length and the second data length is stored in the data blocks with the first data length and the second data length, the data blocks being output from said output means, the identification information being compared with the detected result of the synchronization.

5. A synchronization detecting apparatus for detecting a synchronous pattern from each of data blocks with at least two data lengths, the data blocks each having a synchronous pattern for detecting synchronization, the apparatus comprising:

synchronous pattern detecting means for detecting a synchronous pattern from input data;

first memory means for successively storing the input data as data blocks with a predetermined data length and outputting stored data as data blocks with the predetermined data length in the order of order data blocks, said first memory means having a first data length;

first comparing means for determining whether or not both data that is input to said first memory means and data that is output therefrom match the synchronous pattern corresponding to the detected result of said synchronous pattern detecting means;

second memory means for inputting the input data that is the same as the input data of said first memory means, storing the input data as data blocks with the predetermined data length, and outputting stored data as data blocks with the predetermined data length in the order of older data blocks, said second memory means having a second data length K, the second data length K being smaller than the first data length L, the second data length K not being any integer times the first data length L; and second comparing means for determining whether both data that is input to said second memory means and data that is output therefrom match the synchronous pattern corresponding to the detected result of said synchronous pattern detecting means, wherein when a match of the synchronous pattern is detected in one of said first comparing means and said second comparing means, it is supposed that a synchronous pattern has been detected.

6. The synchronization detecting apparatus as set forth in claim 5, wherein the first data length L and the second data length K have the relations of L>K and 2K>L.

7. The synchronization detecting apparatus as set forth in claim 5, further comprising:

delaying means for delaying the input data;

synchronous signal generating means for outputting a synchronous signal at intervals corresponding to the data length of which synchronization has been detected; and output controlling means for outputting data received from said delaying means in synchronization with the synchronous signal generated by said synchronous signal generating means, wherein when said second comparing means detects a match of the synchronous pattern, said synchronous signal generating means delays the synchronous signal by a time period corresponding to the difference between the first data length and the second data length.

8. The synchronization detecting apparatus as set forth in claim 5, wherein identification information corresponding to the first data length and the second data length is stored in data blocks with the first data length and the second data length, the identification information being compared with the detected result of the synchronization.

9. A synchronization detecting method for detecting synchronization of each of data blocks with at least two data lengths, the data blocks each having a synchronous pattern for detecting synchronization, the method comprising the steps of:

(a) successively storing input data as data blocks with a predetermined data length to a first memory and outputting data as data blocks with the predetermined data length from the first memory in the order of older data blocks, the first memory having a first data length;

(b) inputting the input data to a second memory, storing the input data as data blocks with the predetermined data length, and outputting stored data as data blocks with the predetermined data length in the order of older data blocks, the input data being the same as the input data of the first memory, the second memory having a second data length K, the second data length K being smaller than the first data length L, the second data length K not being any integer times the first data length L;

(c) detecting a synchronous pattern from the input data;

(d) determining whether or not both the data that is input to the first memory and the data that is output therefrom match the synchronous pattern corresponding to the detected result at step (c); and (e) determining whether or not both the data that is input to the second memory and the data that is output therefrom match the synchronous pattern corresponding to the detected result at step (c), wherein when a match of the synchronous pattern is detected at one of step (d) and step (e), it is supposed that the synchronization is detected.

\* \* \* \* \*